US010760259B2

(12) United States Patent
Bright

(10) Patent No.: US 10,760,259 B2
(45) Date of Patent: Sep. 1, 2020

(54) PHOTOINITIATION-BASED DEPLOYABLE STRUCTURES

(71) Applicant: Helios Applied Science Inc., Hyde Park, MA (US)

(72) Inventor: Alfram V. Bright, Medford, MA (US)

(73) Assignee: HELIOS APPLIED SCIENCE INC., Hyde Park, MA (US)

( * ) Notice: Subject to any disclaimer, the term of this patent is extended or adjusted under 35 U.S.C. 154(b) by 0 days.

(21) Appl. No.: 16/799,308

(22) Filed: Feb. 24, 2020

(65) Prior Publication Data

US 2020/0190787 A1    Jun. 18, 2020

Related U.S. Application Data

(63) Continuation of application No. 16/317,500, filed as application No. PCT/US2017/042100 on Jul. 14, 2017, now Pat. No. 10,570,605.

(60) Provisional application No. 62/362,354, filed on Jul. 14, 2016.

(51) Int. Cl.
| | |
|---|---|
| *E04H 15/20* | (2006.01) |
| *E04B 1/16* | (2006.01) |
| *E04G 11/04* | (2006.01) |
| *B64G 1/22* | (2006.01) |
| *E04B 1/35* | (2006.01) |

(52) U.S. Cl.
CPC .............. *E04B 1/169* (2013.01); *B64G 1/222* (2013.01); *E04B 1/35* (2013.01); *E04G 11/045* (2013.01); *E04H 15/20* (2013.01); *E04H 2015/206* (2013.01)

(58) Field of Classification Search
CPC . E04B 1/169; E04B 1/35; E04H 15/20; E04H 2015/206; B64G 1/222; E04G 11/045
See application file for complete search history.

(56) References Cited

U.S. PATENT DOCUMENTS

| 2,969,211 A | 1/1961 | Saurma |
| 2,979,287 A | 4/1961 | Ross |
| 3,163,113 A | 12/1964 | Davis |

(Continued)

FOREIGN PATENT DOCUMENTS

| EP | 1416107 A1 | 5/2004 |
| EP | 2548921 A2 | 1/2013 |

(Continued)

OTHER PUBLICATIONS

Fredrickson, "A Self-Erecting Method for Wind Turbines. Phase 1: Feasibility and Preliminary Design", submitted by D.H. Blattner & Sons., Inc., to Xcel Energy Renewable Development Fund, Contract #BW06, May 2003 (19 pages).

(Continued)

*Primary Examiner* — Patrick J Maestri
(74) *Attorney, Agent, or Firm* — Wilmer Cutler Pickering Hale and Dorr LLP

(57) ABSTRACT

The present disclosure relates to deployable structures and methods of use thereof. In particular, deployable structures with non-cylindrical or irregular shapes and methods of use thereof are disclosed. Non-cylindrical combustion elements can be used to rigidize such non-cylindrical or irregular shapes. The use of gaseous oxidizers along with deployable structures is also disclosed.

24 Claims, 39 Drawing Sheets

(56) References Cited

U.S. PATENT DOCUMENTS

| | | |
|---|---|---|
| 3,180,770 A | 4/1965 | Mills |
| 3,273,499 A | 9/1966 | Proell |
| 3,399,621 A | 9/1968 | Schillreff |
| 3,465,883 A | 9/1969 | Jumper |
| 3,680,484 A | 8/1972 | Stetter |
| 4,405,689 A | 9/1983 | Watanabe |
| 4,725,021 A | 2/1988 | Priddy |
| 5,166,007 A | 11/1992 | Smith et al. |
| 5,420,768 A | 5/1995 | Kennedy |
| 5,527,001 A | 6/1996 | Stuart |
| 5,579,609 A | 12/1996 | Sallee |
| 5,651,848 A | 7/1997 | Cohee et al. |
| 5,854,298 A | 12/1998 | McNay et al. |
| 5,893,237 A | 4/1999 | Ryon et al. |
| 6,193,874 B1 | 2/2001 | Chern |
| 6,463,699 B1 | 10/2002 | Bailey et al. |
| 6,508,036 B1 | 1/2003 | Cadogan et al. |
| 6,568,640 B1 | 5/2003 | Barnett |
| 6,633,042 B1 | 10/2003 | Funken et al. |
| 6,897,832 B2 | 5/2005 | Essig, Jr. et al. |
| 6,910,308 B2 | 6/2005 | Cadogan |
| 7,140,576 B2 | 11/2006 | Logosz |
| 7,185,851 B2 | 3/2007 | Elam |
| 7,321,004 B2 | 1/2008 | Melikechi et al. |
| 7,735,265 B2 | 6/2010 | Tinker et al. |
| 9,216,813 B2 | 12/2015 | Bright et al. |
| 2002/0016378 A1 | 2/2002 | Jin et al. |
| 2004/0046085 A1* | 3/2004 | Veal .................. B64G 1/222 244/172.6 |
| 2004/0148901 A1* | 8/2004 | Cadogan .............. E04H 15/20 52/646 |
| 2004/0235977 A1 | 11/2004 | Bulluck et al. |
| 2005/0052747 A1 | 3/2005 | Bruns |
| 2006/0094795 A1 | 5/2006 | Bulluck et al. |
| 2007/0066698 A1 | 3/2007 | Yang et al. |
| 2009/0255680 A1 | 10/2009 | Maxwell |
| 2010/0166988 A1 | 7/2010 | Defoort et al. |
| 2010/0260941 A1 | 10/2010 | Bushmire et al. |
| 2012/0064274 A1 | 3/2012 | Cai et al. |
| 2012/0325965 A1 | 12/2012 | Bright et al. |
| 2013/0269159 A1 | 10/2013 | Robitaille et al. |
| 2014/0077420 A1 | 3/2014 | Fang et al. |
| 2014/0370206 A1 | 12/2014 | Head et al. |
| 2015/0314540 A1 | 11/2015 | Hesse |
| 2016/0068251 A1* | 3/2016 | Bright .................. B64C 3/30 264/494 |

FOREIGN PATENT DOCUMENTS

| | | |
|---|---|---|
| JP | 2001-208091 A | 8/2001 |
| JP | 2004221899 | 8/2004 |
| WO | WO-00/61894 A2 | 10/2000 |
| WO | WO-03006766 A1 | 1/2003 |
| WO | WO-2006136675 A1 | 12/2006 |

OTHER PUBLICATIONS

Global Energy Concepts, LLC, "Addendum to WindPACT Turbine Design Scaling Studies Technical Area 3—Self-Erecting Tower and Nacelle Feasibility", National Renewable Energy Laboratory, Subcontractor Report, NREL/SR-500-29493A, Oct. 2002 (9 pages).

Griffin, "WindPACT Turbine Design Scaling Studies Technical Area 1—Composite Blades for 80-to 120-Meter Rotor", National Renewable Energy Laboratory, Subcontractor Report, NREL/SR-500-29492, Apr. 2001 (44 pages).

International Search Report and Written Opinion issued by the U.S. Patent and Trademark Office as International Searching Authority, in International Application No. PCT/US17/42100, dated Nov. 21, 2017 (21 pages).

European Extended Search Report issued in EP17828520.1, dated Apr. 17, 2020 (20 pages).

\* cited by examiner

PHOTOINITIATION-BASED DEPLOYABLE STRUCTURES

CROSS-REFERENCE TO RELATED APPLICATIONS

This application is a continuation of U.S. patent application Ser. No. 16/317,500, entitled "PHOTOINITIATION-BASED DEPLOYABLE STRUCTURES", filed Jan. 11, 2019 which is a national stage application of International Application No. PCT/US2017/042100 entitled "PHOTOINITIATION-BASED DEPLOYABLE STRUCTURES", filed Jul. 14, 2017, which claims priority to U.S. Provisional Application No. 62/362,354 entitled "PHOTOINITIATION-BASED DEPLOYABLE STRUCTURES", filed Jul. 14, 2016, the disclosures of which are hereby incorporated by reference in their entirety.

INCORPORATION BY REFERENCE

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

The present disclosure relates generally to deployable structures and methods of manufacture and use thereof. In particular, in some embodiments, the present disclosure relates to inflatable and rigidizable support elements and methods of manufacture and use thereof.

BACKGROUND

Building materials in general, and support elements in particular, are often large, heavy, costly, difficult to transport, difficult to erect, and/or difficult to deploy. Building projects and/or other endeavors (e.g., military, infrastructure, and/or humanitarian projects) at remote locations can be inhibited by difficult terrain, climate, or distance from large civil infrastructure. Lightweight and/or collapsible materials and support elements are more easily transported, but suffer from decreased stability and/or strength.

The availability of sustainable energy, particularly electricity, has been limited in remote locations such as small villages or scientific research sites due to terrain, climate, or distance from large civil infrastructure. Wind turbines are frequently used for producing electrical power, however, they usually require heavy and bulky towers in order to expose the turbine to higher wind velocities (Griffin, "WindPACT Turbine Design Scaling Studies Technical Area 1—Composite Blades for 80- to 120-Meter Rotor," 21 Mar. 2000-15 Mar. 2001. 44 Pp, 2001, herein incorporated by reference in its entirety). The mass of the tower and the equipment required for its installation increases exponentially with height (G. E. Concepts, LLC, "Addendum to WindPACT Turbine Design Scaling Studies Technical Area 3—Self-Erecting Tower and Nacelle Feasibility," 2002, herein incorporated by reference in its entirety). This limits the installed power at any location with rudimentary roads to the carrying capacity of people and/or light transportation equipment (D. Blattner and I. Sons, "A Self-Erecting Method for Wind Turbines. Phase 1: Feasibility and Preliminary Design", herein incorporated by reference in its entirety). Additional technologies to address these and other deficiencies in the field are needed.

Deployable wings allow for specialized aircraft to be easily transported to locations where the craft will be used. Deployable wings have been devised using various design concepts over a period of many years. The most notable technologies have been mechanically hinged wings, pressurized inflatable fabric wings and post-rigidized inflatable wings. Mechanical hinging is the simplest and most common method for folding a traditional aircraft wing. This design has the advantage of simplicity and ease of adaptation to thin chord wings. However, each mechanical hinge can only reduce the wingspan by a maximum of 50%, therefore each additional reduction in stowed length doubles the number of hinged joints, resulting in an exponential increase in mass and complexity. This exponential increase in mass causes structural deficiencies and leads to reliability problems. Inflatable wings solve the mass problems of mechanically hinged wings. Inflatable wings are composed of flexible fabric material that is fabricated into a segmented compartmentalized structure and is pneumatically inflated to extend to its full size, supported entirely by internal pressure. Since inflatable wings are made of fabric, they are capable of high length and volume reduction ratios. Their low mass allows them to be deployed in seconds or less. Like the hinged wing, inflatable wings are re-stowable and re-deployable. While inflatable wings have very high deployment reliability, continuous positive pressure is preferred to maintain structural integrity of the wing. This results in a vulnerability to loss of pressure from leaks or punctures. In addition, inflatable fabric wings have a significantly lower buckling moment compared to rigid wings. The two fundamental disadvantages of positively inflated wing structures are stiffness (i.e., resistance to buckling) and vulnerability to pressure loss. Both can be improved upon by rigidizing (e.g., chemical post-rigidizing) the flexible wing fabric shortly after inflation. By encapsulating the fabric fibers in a rigidizable matrix and curing the matrix after the wings have been deployed, the fabric wing becomes a structural composite. Current structures have two main disadvantages: (1) slow matrix curing speed, and (2) lack of a lightweight and convenient mechanism for activation of matrix curing. Additional technologies to address these and other deficiencies in the field are needed.

SUMMARY OF THE INVENTION

The present disclosure provides various configurations for deployable structures, and methods of manufacture and use thereof.

Buildings, large tents, towers, cranes, bridges, habitation volumes, piping systems and other civil structures that incorporate tubular beam, truss type or flat panel support elements are often large, heavy, costly, difficult to transport, difficult to erect, and/or difficult to deploy particularly in regions that are remote, suffering from natural disaster or war, in space or on other planets. Current lightweight and/or collapsible structures and support elements are more easily transported than conventional structures and support elements, but either suffer from low compaction ratio or decreased stability and/or stiffness or require continuous maintenance by personnel.

The construction of wind turbines either in metropolitan areas or in remote locations away from civil infrastructure is challenging due to the difficulty to transporting the tall tower and long blades from the manufacturing plant to the installation site. There is a need for onsite construction of the very large and cumbersome tower and blade elements which could be solved with deployable tower and turbine blade components.

Many space satellites require large structures such as solar arrays, antennas, instrument trusses and booms, optical arrays, sunshades, solar sails etc. These large structures must be folded within the small confines of the rocket launch vehicle fairing followed by deployment in orbit. Current deployable space instrument trusses and booms can have a high linear compaction ratio but are challenged by low stiffness and high thermal expansion ratios which make precise alignment difficult and can cause issues with satellite stability. In addition, many current deployable trusses contain many individual links, hinges and latches which increase the chances for deployment failures. There is a current need for deployable space booms/trusses which have a high compaction ratio, have adequate stiffness and thermal stability all while providing high deployment reliability.

Some embodiments discussed herein relate to deployable space booms/trusses having a high compaction ratio, adequate stiffness, and thermal stability, that provide high deployment reliability.

Medical stretchers and field splints for broken, sprained, dislocated arms and legs require one or more long rigid members for structural support. Existing stretchers and splints are cumbersome for transport, particularly when individuals are on foot in remote areas or confined spaces. Medical personnel, military, forest service members, etc. have a need for easily transportable and deployable types of medical equipment when operating away from existing medical infrastructure.

Some embodiments discussed herein relate to easily transportable and deployable types of medical equipment that may be used while operating away from existing medical infrastructure.

Some embodiments discussed herein relate to unmanned aerial vehicle (UAV) aircraft wings that can be rapidly deployed and that meet mechanical loading specifications similar to rigid wing UAVs.

Some embodiments disclosed herein relate to using deployable structures that form a flat combustion element including a textured outer jacket of combustible material. In some embodiments, the outer jacket may be braided, woven, crocheted, perforated, stamped, or etched metal sheet. In some embodiments, the outer jacket may be sintered or printed from metal powder. In some embodiments, the outer jacket may be formed into a hollow oval or ellipsoid cross-section. In some embodiments, the wire jacket may be filled with solid oxidizer, e.g., powdered and/or granulated solid oxidizer. In some embodiments, the wire jacket is wrapped with a thin polymer film, e.g., where the polymer film serves as a barrier. In some embodiments, the flat combustion element provides a radiative emission pattern that varies in intensity depending on angle from the perpendicular surface of the flat element.

In some embodiments, the flat combustion element may be woven or braided as a non-hollow flat tape. In some embodiments, the combustible (or consumable) metal component may be arranged as a continuous sheet of foil. In some embodiments, a powdered oxidizer may be coated on an exterior of the braid. In some embodiments, the powdered oxidizer may be wrapped with a thin polymer film to contain the granules and/or powder of the solid oxidizer. In some embodiments, a flexible polymer resin binder is used to contain the oxidizer granules and/or powder.

In some embodiments, the flat combustion element may be twisted into another configuration, e.g., into a helix.

In some embodiments, using a flat combustion element allows obtaining a non-uniform light emission pattern. In some embodiments, the non-uniform light emission pattern can be used for the process of photocuring in which a photo activated adhesive that encapsulates structural fibers is activated and cured into a rigid state under the chemical action of UV and/or visible light photons. These photocuring materials can be interchangeably known as either photo curing structural composites or photocomposites. These photocomposites can be used in non-round beams, including sectioned tubes, C-channels and I-beams.

In some embodiments, using a flat combustion element provides an added benefit of compactness. In some embodiment, the flat combustion element may be rolled up or otherwise folded into very tight arrangements.

In some embodiments, a gaseous oxidizer is used for the combustion. In some embodiments, the gaseous oxidizer is stored in a compressed tank. In some embodiments, the gaseous oxidizer is generated using a generator. In some embodiments, using a gaseous generator results in a more stable combustion process. In some embodiments, using a gaseous oxidizer allows for precise control over the combustion process.

In some embodiments, a combustible (or consumable) outer film that ducts a gaseous oxidizer is used. In some embodiments, the combustible (or consumable) outer film may be flexible and may fold for storage together with the combustion element. In some embodiments, the consumable outer film is impermeable to gas.

In some embodiments, a gas generator for combustion is used. In some embodiments, the deployment of a deployable structure is accomplished using gas created on-site, e.g., from a chemical reaction.

In some embodiments, a photocuring panel is pneumatically deployed by attaching an inflatable structure to the photocuring panel. In some embodiments, a pneumatic tubular beam contains a linear combustion element located coaxially along the tubular beam's axis. In some embodiments, a non-structural illumination tube is used to generate illumination to cure photochemical components external to the combustion tube. The combustion element in the combustion tube may be supported within the illumination tube pressure bladder by a scaffold, e.g., a polymer scaffold. In some embodiments, the illumination tube assembly is located proximate a photocuring composite surface. In some embodiments, the illumination tube can be used to deploy and support adjacent structures.

In some embodiments, a plurality (e.g., 2 or more, 3 or more, 4 or more, 5 or more, etc.) of pneumatically deployed combustion illumination tubes adjacent to one or more photocuring composite panels, such that the illumination generated by the tubes cures the photocuring composite panels. The tubes can serve to unfold and deploy the one or more photocuring composite panels followed by their emission of photoactive light. In some embodiments, the photocuring composite panel may have any desired shape (e.g., depending on the particular use). In some embodiments, some of the plurality of the tubes include a photopolymer and light resistant layer, and some of the plurality of the tubes do not include a photopolymer and light resistant layer. In some embodiments, all of the plurality of the tubes include a photopolymer and light resistant layer. In some embodiments, each of the plurality of the illumination tubes is a thin pressure bladder tube with a combustion element and a support within it. In some embodiments, the combustion element is not placed within the illumination tubes, and is placed alongside the illumination tubes. In some embodiments, some illumination tubes include a combustion element within the tubes, and some illumination tubes include a combustion element alongside (and not within) the tubes. In some embodiments, the pressure bladder may be filled with an inert gas. In some embodiments, each of the plurality of illumination tubes is identical. In some embodiments, at least one or more of the plurality of illumination tubes is different from at least one or more other illumination tubes of the plurality of illumination tubes. In some embodiments, the photocuring composite panel may have an external light blocking film to prevent external light from curing the photocuring composite material. In some embodiments, the photocuring composite panel includes an internal film (e.g., internal polymer film) to prevent the uncured photocuring composite material from adhering to other components in the assembly, e.g., when stowed in a tight configuration. In some embodiments, the photocuring composite panel has an external film (e.g., external polymer film) that serves as a constraint layer to prevent the pneumatically inflated photocuring composite panel from overexpanding, e.g., due to lack of structural stiffness due to the fabric of the panel not yet being rigidized.

In some embodiments, a composite tube may be inflated using liquid inflation, e.g., in a submerged environment, e.g., in a deep sea environment. In some embodiments, the liquid may be water or another non-combustible fluid. In some embodiments, the combustion element may use a solid or gaseous oxidizer, and may be coated with a waterproof coating preventing ingress of water (or other liquid(s)) into the combustion element. In some embodiments, illumination produced by the combustion element is transmitted through a liquid, curing an adjacent photopolymer composite. In some embodiments, the combustion element may be ignited with one or more liquid resistant initiators activated by electrical, chemical, or mechanical activators.

In some embodiments, a film of fully or partially cured photopolymer adhesive is used instead of an inflation bladder. In some embodiments, a thin layer of a photopolymer adhesive may be cured such that it becomes a skin on a top surface. In some embodiments, the cured skin is flexible. In some embodiments, the cured skin has a thickness between about 0.1 mm and 10 mm. In some embodiments, a layer of photopolymer adhesive surrounding the structural fiver is exposed to photoactive radiation (e.g., UV, visible, or another type of radiation) that is sufficient to cure a thin portion of the adhesive layer that is closest to the photoactive radiation source. In some embodiments, the curing process cures the exposed layer of the photopolymer adhesive enough to form a thin flexible and gas permeable membrane while leaving the underlying photopolymer adhesive in liquid form.

In some embodiments, a metal powder based combustion element is used. In some embodiments, a flexible combustion element is embedded with discrete solid fuel and solid oxidizer particles. The flexible combustion element can include powdered combustible metals that are encapsulated within a flexible polymer resin binder. In some embodiments, the flexible resin binder is consumed in the combustion reaction.

In some embodiments, a flexible polymer resin element may include solid fuel particles with passages for gaseous oxidizer. In some embodiments, the flexible polymer resin elements include one or more hollow internal fluid carrying channels where a gaseous oxidizer can travel to be introduced to the metal powder near and in the combustion region.

In some embodiments, a gaseous fuel based combustion element may be used. In some embodiments, a flexible combustion element may include one or more passages for gaseous fuel and gaseous oxidizer. In some embodiments, photochemically active illumination is generated using combustion of gaseous fuel with a gaseous oxidizer. In some embodiments, the flexible combustion element may include a flexible tubular device that includes one or more internal fluid carrying channels that separately duct the gaseous fuel and oxidizer to the combustion region. In some embodiments, the flexible tubular device is made of a material that is consumed during combustion at a predetermined rate.

In some embodiments, a structural photocomposite beam having a circular cross-section is used. In some embodiments, a structural photocomposite beam having a non-uniform, e.g., non-circular cross-section is used. In some embodiments, an I-beam, elliptical, or oval sectioned photocomposite beam may be used. In some embodiments, using photocomposite beams having a non-uniform cross-section allows for variability in curing intensity. In some embodiments, using photocomposite beams having a non-uniform cross-section results in the use of less combustible (or consumable) material than when using a combustion element having a round cross-section.

In some embodiments, visible light can be used to cure an adhesive and deploy the structures discussed herein.

In some embodiments, a flexible combustion element support may be used. In some embodiments, the combustion element is supported by a plurality of flexible combustion element support. In some embodiments, the outer periphery of the flexible combustion element support is attached to the pressure bladder of a composite tube. In some embodiments, the inner periphery of the flexible combustion element support is attached to the combustion element. In some embodiments, the flexible combustion element supports are elastically deformable.

In some embodiments, a thread or wire combustion element support may be used. In some embodiments, thread or flexible wire loops may be passed through perforations in the wall of the pressure bladder and composite surface. In some embodiments, the thread or flexible wire loops are encircled around the combustion element and support the combustion element in tension.

In some embodiments a scaffold material that is both non-combustible and non-consumable in the thermal environment experienced in the combustion region can be arranged in a suspension type device that supports the combustion element in tension.

Elements of embodiments described with respect to a given aspect of the disclosure may be used in various embodiments of another aspect of the disclosure. For example, it is contemplated that features of dependent claims depending from one independent claim can be used in apparatus and/or methods of any of the other independent claims.

One aspect of the invention includes a rapid deployment structure system including a light-generating component adapted to generate light via a combustion reaction, wherein the light-generating component includes at least one non-cylindrical combustion element; a fluid inflatable chamber, wherein the fluid inflatable chamber has a collapsed configuration and an expanded configuration, the fluid inflatable chamber defines an enclosed volume having an inlet and an outlet, the fluid inflatable chamber has a chamber axis in the expanded configuration, the fluid inflatable chamber has a non-circular cross-section in a plane normal to the chamber axis, and the fluid inflatable chamber is curable by light; and a pressure regulator connected to the outlet of the enclosed volume, wherein the pressure regulator is adapted to vent products from the combustion reaction to a space outside the enclosed volume; wherein the non-cylindrical combustion element has a combustion element axis when the fluid inflatable chamber is in the expanded configuration, the at least one non-cylindrical combustion element produces a non-uniform light emission pattern in a plane normal to the combustion element axis, and the non-uniform light emission pattern has areas of higher light intensity compared to the light intensity in other areas of the non-uniform light emission pattern, and wherein the non-cylindrical combustion element is arranged such that the areas of higher intensity of the non-uniform light emission pattern are directed to areas of the fluid inflatable chamber that require higher light intensity to cure compared to other areas of the fluid inflatable chamber and the areas of lower intensity of the non-uniform light emission pattern are directed to areas of the fluid inflatable chamber which require lower light intensity to cure compared to other areas of the fluid inflatable chamber.

In one embodiment, the fluid inflatable chamber includes a partially cured photopolymer. In another embodiment, the fluid inflatable chamber includes separate polymer materials. In another embodiment, the fluid inflatable chamber has one or more photo-curing structural composite material panels. In some embodiments, the one or more photo-curing structural composite material panels are uncured panels which are deployed into a fixed into position and are cured by the non-uniform light emission pattern.

In other embodiments, the rapid deployment structure system has one or more mounting surfaces, wherein the one or more photo-curing structural composite material panels are located adjacent to one or more of the mounting surfaces. In some embodiments, the mounting surfaces are held apart via one or more illumination tubes. In other embodiments, the combustion elements are located within illumination tubes. In other embodiments, the mounting surfaces are held apart via one or more fluid inflated deployment tubes. In other embodiments, the combustion elements are located external to fluid inflated deployment tubes but within the fluid inflatable chamber. In another embodiment, the mounting surfaces comprise perimeter profiles, and wherein the perimeter profiles of the mounting surfaces define a cross-sectional profile of the one or more photo-curing structural composite material panels. In another embodiment, the perimeter profile of the mounting surfaces may be one or more of flat, convex, concave or any combination thereof. In another embodiment, the one or more photo-curing structural composite material panels are attached to the perimeter edge of the mounting surfaces. In another embodiment, the mounting surfaces may be rigid.

In another embodiment, the in the photo-curing structural composite material panels are curved. In another embodiment, the flat or curved photo-curing structural composite material panels are attached to a portion of the periphery of the mounting surfaces. In another embodiment, the flat or curved photo-curing structural composite material panels are attached to the entire periphery of the mounting surfaces.

In some embodiments, the fluid inflatable chamber may be non-hermetically sealed. In other embodiments, the fluid inflatable chamber may be hermetically sealed. In another embodiment, the hermetically fluid inflatable chamber has an inlet and outlet port for gases and combustion products. In another embodiment, the outlet port contains a pressure regulating device.

In some embodiments, the non-cylindrical cross-section of the fluid inflatable chamber in the expanded configuration is an I-beam. In another embodiment, the I-beam further comprises a center web, wherein the I-beam has an axis extending along the center web, wherein the one or more combustion elements extend parallel along the axis of the I-beam. In another embodiment, the I-beam further comprises a top side and a bottom side connected by the center web, wherein the top side and the bottom side comprise independent inflation bladders.

In some embodiments, a portion of the inflation bladder that is coated with a reflective surface. In another embodiment, the reflective surface comprises a metalized or painted coating. In another embodiment, the metalized or painted coating comprises one or more of aluminum, silver, gold, tantalum, copper, iridium, platinum, tin, titanium. In another embodiment, the metalized or painted coating comprises reflective paint. In some embodiments, the reflected wavelengths are selected from the group consisting of 375-400 nm, 400-425 nm, 425-450 nm, 450-475 nm, 475-500 nm, 500-525 nm, 525-550 nm, 550-575 nm, 575-600 nm, 600-625 nm, 625-650 nm, 650-675 nm, 675-700 nm. In another embodiment, a pigment in the reflective paint comprises one or more of aluminum oxide, titanium dioxide, magnesium oxide, lead oxide, lead carbonate, zinc oxide, barium sulphate, antimony oxide, or zinc sulphide.

In some embodiments, the fluid inflatable chamber having an I-beam cross-section further comprises an outer constraint layer which, when fully tensioned via pneumatic or hydraulic inflation pressure provides a counteracting pneumatic or hydronic force against one or more inner pressure bladders.

In some embodiments, the location of the combustion element comprises a centroid region of the expanded inflation chamber. In another embodiment, the non-cylindrical cross-section of the combustion element is an elliptical cross section, a flat cross-section, or a combination thereof.

In another embodiment, the combustion element comprises a solid fuel. In another embodiment, the solid fuel comprises one or more of metallic magnesium, aluminum, barium, titanium, lithium, potassium or zirconium. In another embodiment, the solid fuel is made from one or more pure metal or alloy metal. In another embodiment, the combustion element comprises a solid fuel and a solid oxidizer. In another embodiment, the solid fuel and solid oxidizer are enrobed in a protective jacket. In another embodiment, the protective jacket comprises one or more of polyester, polyimide, polyethylene, polyethylene terephthalate, silicone, polycarbonate, polypropylene, cellophane, butyl rubber, latex rubber, paper, or polytetrafluoroethylene.

In another embodiment, the combustion element is formed from the solid fuel by the braiding or crocheting of a ribbon or a wire, or the perforation or stamping of a metal sheet or the sintering or printing of a metal powder.

In another embodiment, the rapid deployment structure system has a helical shape in the expanded configuration. In another embodiment, the rapid deployment structure system has a flat single plane configuration in the expanded configuration. In another embodiment, of the rapid deployment structure system the combustion element has a partially flattened tubular cross-section. In another embodiment, the width of the flattened tubular cross section is greater than its height by a multiple of at least 2 times. In another embodiment, the width of the flattened tubular cross section is greater than its height by a multiple of at least 3 times. In another embodiment, the width of the flattened tubular cross section is greater than its height by a multiple of at least 4 times. In another embodiment, the width of the flattened tubular cross section is greater than its height by a multiple of at least 5 times. In another embodiment, the width of the flattened tubular cross section is greater than its height by a multiple of at least 10 times. In another embodiment, the width of the flattened tubular cross section is greater than its height by a multiple of at least 20 times. In another embodiment, the width of the flattened tubular cross section is greater than its height by a multiple of at least 50 times.

In another embodiment, the solid oxidizer comprises one or more of sodium nitrate, sodium chlorate, sodium permanganate, sodium perchlorate, ammonium nitrate, ammonium perchlorate, potassium, nitrate, potassium chlorate, potassium perchlorate, or potassium permanganate. In another embodiment, the solid oxidizer is in powdered, granulated, cast-in, pelletized or extruded form. In another embodiment, the solid oxidizer is stabilized by a binder which could be one or more of gum Arabic, red gum, asphalt, polysulphide rubber, neoprene, latex, butyl, silicone, or buna.

Another aspect of the invention includes a rapid deployment structure system including a light-generating subsystem adapted to generate light via a combustion reaction, the light-generating subsystem including: a combustion element, a source of gaseous oxidizer, a conduit containing the combustion element fluidically coupled to the source of gaseous oxidizer, and a gas flow controller adapted to control an amount of gaseous oxidizer supplied to the combustion element; a support element including a photo-curing structural composite material, wherein the support element has a collapsed configuration and an expanded configuration, the support element defines an enclosed volume having an inlet and an outlet, and the support element defines an axis in the expanded configuration; a scaffold disposed within the enclosed volume, wherein the scaffold supports at least a portion of the light-generating component within the enclosed volume along at least a portion of the axis; an inflation system connected to the inlet of the enclosed volume adapted to supply fluid to the enclosed volume; and a pressure regulator connected to the outlet of the enclosed volume, wherein the pressure regulator is adapted to vent products from the combustion reaction to a space outside the enclosed volume.

In some embodiments, the fluid is a gas. In some embodiments, the inflation system includes a source of compressed gas. In another embodiment, the inflation system includes materials that produce gas by a chemical reaction. In another embodiment, the gas is one or more of carbon dioxide, nitrogen, air, argon, or helium.

In some embodiments, the fluid is a liquid. In another embodiment, the inflation system includes a pump for moving a volume of the liquid. In another embodiment, the pump further is one or more of a piston pump, a centrifugal pump, a solenoid pump, a diaphragm pump, or a Rootes pump. In another embodiment, the pump has an intake and a filter in fluid communication with the intake to reduce particle matter entering the intake. In another embodiment, the inflation system has a source of the liquid. In another embodiment, the pump has an intake in fluid communication with an environment surrounding the rapid deployment structure system. In another embodiment, the liquid comprises one or more of fresh water, salt water, oil, alcohol, or glycol. In some embodiments, the rapid deployment structure system has a liquid resistant jacket around the combustion element to eliminate ingress of liquid into the combustion element. In some embodiments, the liquid resistant jacket is one or more of silicone, asphalt, gum Arabic, red gum, polysulphide rubber, neoprene, or butyl.

In some embodiments, the gaseous oxidizer is oxygen. In some embodiments, the gaseous oxidizer is one or more of nitrous oxide, fluorine, bromine, or chlorine. In some embodiments, the source of gaseous oxidizer includes a pressure vessel, the pressure vessel comprising one or more of a compressed gas, a liquid, or a supercritical fluid. In some embodiments, the source of gaseous oxidizer includes two or more reagents that generate the gaseous oxidizer as the product of chemical reaction.

In another embodiment, the conduit is a membrane. In another embodiment, the combustion element contacts an inner surface of the membrane. In another embodiment, the separation between an inner wall of the membrane and the combustion element is less than about 1 mm. In another embodiment, the separation between an inner wall of the membrane and the combustion element is less than about 2 mm. In another embodiment, the separation between an inner wall of the membrane and the combustion element is less than about 5 mm. In another embodiment, the separation between an inner wall of the membrane and the combustion element is less than about 10 mm. In another embodiment, the separation between an inner wall of the membrane and the combustion element is less than about 20 mm. In another embodiment, the separation between an inner wall of the membrane and the combustion element is less than about 50 mm. In another embodiment, the separation between an inner wall of the membrane and the combustion element is less than about 100 mm. In another embodiment, the thickness of the membrane is less than about 1 m. In another embodiment, the thickness of the membrane is less than about 10 m. In another embodiment, the thickness of the membrane is less than about 100 m, less than about 1 mm. In some embodiment, the membrane is one or more of polyester, polyimide, polyethylene, polyethylene terephthalate, silicone, polycarbonate, polypropylene, cellophane, butyl rubber, latex rubber, paper, or polytetrafluoroethylene.

In another embodiment, the conduit is consumable in combustion. In another embodiment, the linear consumption rate of the conduit is equal to the linear consumption rate of the combustion element. In another embodiment, the scaffold comprises an organic material is consumed with the combustion of the combustion element. In some embodiments, the scaffold is made from one or more of paper, plant fibers, polyester, polycarbonate, polyimide, polyethylene terephthalate, vinyl, nylon, acetal, polyvinylidene fluoride, fluorinated ethylene propylene, or perfluoroalkoxy alkane. In another embodiment, the scaffold comprises a metallic material. In some embodiments, the scaffold is made from one or more of steel, stainless steel, aluminum and aluminum alloys, titanium and titanium alloys, copper and copper alloys, tungsten and tungsten alloys, nickel and nickel alloys, platinum and platinum alloys, and any combination thereof. In another embodiment, the scaffold is made from an inorganic material. In some embodiments, the scaffold is made from one or more of alumina (Al2O3), magnesia (MgO), zirconia (ZrO2), silica (SiO2), chromia (Cr2O3), calcium oxide (CaO), tungsten carbide (CW), silicon carbide (CSi), graphite (C), hafnium carbide (HfC), boron nitride (BN), tantalum hafnium carbide (Ta4HfC5), and any combination thereof. In some embodiments, the scaffold is made from fibrous or wire-like materials, and wherein the scaffold supports the combustion element in tension by one or more opposing fibrous or wire-like materials pulling radially on the combustion element while in the expanded configuration.

Another aspect of the invention includes a rapid deployment structure system including, a photo-curing structural composite skin having a collapsed configuration and an expanded configuration; a plurality of structural elements, wherein the photo-curing structural composite skin is operably linked to at least one structural element; at least one inflation chamber, wherein the at least one inflation chamber is adapted to force the structural elements apart when the at least one inflation chamber is filled with a fluid thereby stretching the photo-curing structural composite skin to its expanded configuration, and wherein the structural elements define the expanded configuration of the photo-curing structural composite skin; and a light-generating component adapted to generate light via a combustion reaction, wherein the light-generating component includes at least one combustion element.

In one embodiment, the light-generating component comprises a metal powder. In another embodiment, the light-generating component element comprises a gaseous fuel.

In another embodiment, the fluid is a liquid. In another embodiment, the liquid is one or more of fresh water, salt water, oil, alcohol, or glycol. In another embodiment, the rapid deployment structure system includes a liquid resistant jacket around the combustion element to eliminate ingress of liquid into the combustion element. In another embodiment, the liquid resistant jacket is made from one or more of silicone, asphalt, gum Arabic, red gum, polysulphide rubber, neoprene, or butyl.

In another embodiment, the fluid is a gas. In another embodiment, the inflation system includes a source of compressed gas. In another embodiment, the inflation system includes materials that produce gas by a chemical reaction.

In another embodiment, the rapid deployment structure system includes a source of liquid. In another embodiment, the rapid deployment structure system includes a source of gas. In another embodiment, the rapid deployment structure system includes a pump for moving a volume of the liquid. In another embodiment, the pump is one or more of a piston pump, a centrifugal pump, a solenoid pump, a diaphragm pump, or a Rootes pump. In another embodiment, the pump also has an intake and a filter in fluid communication with the intake to reduce particle matter entering the intake. In another embodiment, the inflation system has a source of the liquid. In another embodiment, the pump has an intake in fluid communication with an environment surrounding the rapid deployment structure system.

Another aspect of the invention includes a method of deploying a fluid inflatable chamber including a) providing, i) a light-generating component adapted to generate light via a combustion reaction, wherein the light-generating component includes at least one non-cylindrical combustion element; ii) a fluid inflatable chamber, wherein the fluid inflatable chamber has a collapsed configuration and an expanded configuration, the fluid inflatable chamber defines an enclosed volume having an inlet and an outlet, the fluid inflatable chamber has a chamber axis in the expanded configuration, the fluid inflatable chamber has a non-circular cross-section in a plane normal to the chamber axis, and the fluid inflatable chamber is curable by light; and iii) a pressure regulator connected to the outlet of the enclosed volume, wherein the pressure regulator is adapted to vent products from the combustion reaction to a space outside the enclosed volume; iv) wherein the non-cylindrical combustion element has a combustion element axis when the fluid inflatable chamber is in the expanded configuration, the at least one non-cylindrical combustion element produces a non-uniform light emission pattern in a plane normal to the combustion element axis, and the non-uniform light emission pattern has areas of higher light intensity compared to the light intensity in other areas of the non-uniform light emission pattern, and wherein the non-cylindrical combustion element is arranged such that the areas of higher intensity of the non-uniform light emission pattern are directed to areas of the fluid inflatable chamber that require higher light intensity to cure compared to other areas of the fluid inflatable chamber and the areas of lower intensity of the non-uniform light emission pattern are directed to areas of the fluid inflatable chamber which require lower light intensity to cure compared to other areas of the fluid inflatable chamber, b) inflating the fluid inflatable chamber; and c) exposing the fluid inflatable chamber to the non-uniform light emission pattern produced by the at least one non-cylindrical combustion element, wherein the light cures the fluid inflatable chamber.

Another aspect of the invention includes a method of deploying a support element including, a) providing i) a light-generating subsystem adapted to generate light via a combustion reaction, the light-generating subsystem including ii) a combustion element, iii) a source of gaseous oxidizer, iv) a conduit containing the combustion element fluidically coupled to the source of gaseous oxidizer, and v) a gas flow controller adapted to control an amount of gaseous oxidizer supplied to the combustion element; vi) a support element comprising a photo-curing structural composite material, wherein the support element has a collapsed configuration and an expanded configuration, the support element defines an enclosed volume having an inlet and an outlet, and the support element defines an axis in the expanded configuration; vii) a scaffold disposed within the enclosed volume, wherein the scaffold supports at least a portion of the light-generating component within the enclosed volume along at least a portion of the axis; viii) an inflation system connected to the inlet of the enclosed volume adapted to supply fluid to the enclosed volume; and ix) a pressure regulator connected to the outlet of the enclosed volume, wherein the pressure regulator is adapted to vent products from the combustion reaction to a space outside the enclosed volume, b) inflating the support element by applying pressurized gas from said inflation system to the enclosed volume via said inlet; and c) exposing the photo-curing structural composite material to light from the combustion element, wherein the light cures the photo-curing structural composite material.

Another aspect of the invention includes a method for deploying an inflation chamber including, a) providing, i) a photo-curing structural composite skin having a collapsed configuration and an expanded configuration; ii) a plurality of structural elements, wherein the photo-curing structural composite skin is operably linked to at least one structural element; iii) at least one inflation chamber, wherein the at least one inflation chamber is adapted to force the structural elements apart when the at least one inflation chamber is filled with a fluid thereby stretching the photo-curing structural composite skin to its expanded configuration, and wherein the structural elements define the expanded configuration of the photo-curing structural composite skin; and iv) a light-generating component adapted to generate light via a combustion reaction, wherein the light-generating component includes at least one combustion element, b) inflating the at least one inflation chamber; and c) exposing the photo-curing structural composite skin to light from the light-generating component, wherein the light cures the photo-curing structural composite skin.

DESCRIPTION OF THE FIGURES

Various objects, features, and advantages of the disclosed techniques can be more fully appreciated with reference to the following detailed description of the disclosed subject matter when considered in connection with the following drawings, in which like reference numerals identify like elements.

Figure 1:
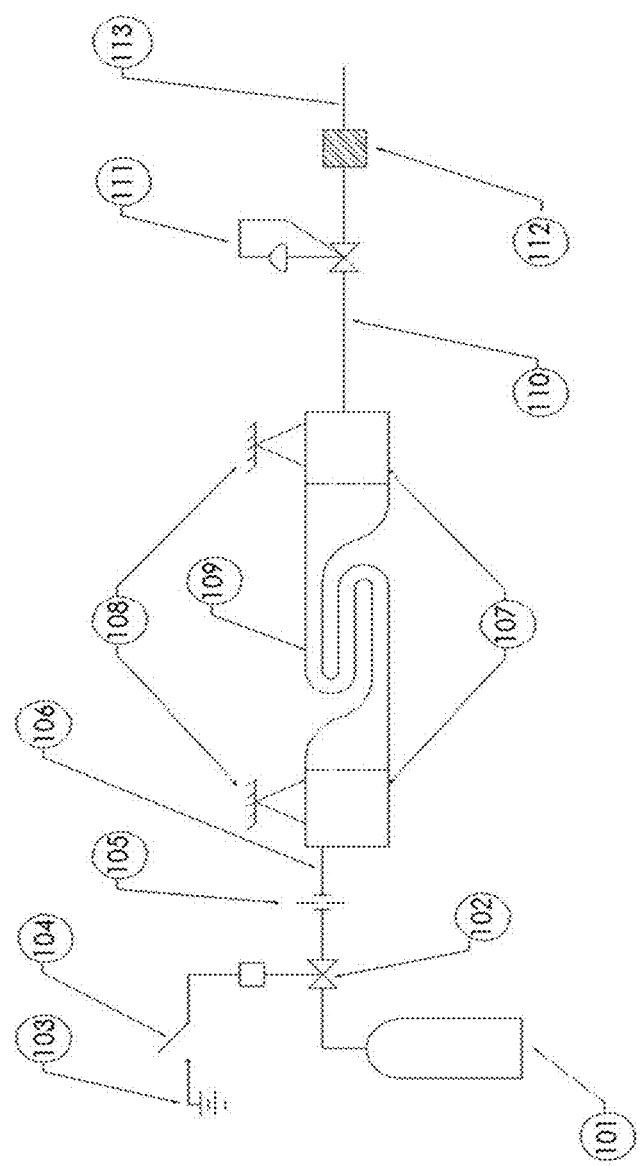
FIG. 1 shows a schematic of a composite tube in a folded configuration.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are exemplary, and that it is contemplated that there are other systems and methods that are within the scope of the disclosed subject matter.

Some embodiments disclosed herein relate to a deployable beam that is a structural tube that includes a photocuring composite rigidized by illumination created by a longitudinal combustion element that is located along the full length of the tube's center axis.

U.S. Pat. No. 9,216,813, titled "Inflatable and rigidizable support element" is incorporated herein by reference in its entirety. FIG. 1 shows a prior art device 100 that consists of a compressed inflation bottle (101 in FIG. 1) that supplies gas to inflate and unfurl the compactly folded composite tube out to its full deployed length. The compressed inflation bottle 101 contains an inert gas such as, for example, helium, argon or nitrogen. The gas may serve at least three functions; a. to inflate, b. to clear combustion byproducts and c. to cool the photocomposite material from the waste heat created during the combustion process. An electrically, pneumatically, pyrotechnically or mechanically actuated inflation gas valve (102 in FIG. 1) enables the gas flow upon command from the control circuit that consists of a stored energy source (103 in FIG. 1) such as an electrical battery, pressurized gas bottle or mechanical spring. The actuation energy is switched (104 in FIG. 1) either manually, electrically or by using other known techniques. Gas flow to the tube is controlled by either an active or passive flow controller (105 in FIG. 1) such as a restrictor orifice, capillary tube, venturi or feedback controlled flow controller. The inflation gas flows through a passage or tubing (106 in FIG. 1) to the composite tube inlet plenum. The composite tube inlet plenum is integrated into the mounting flange (107 in FIG. 1) which attaches the beam to the external structure through a load point (108 in FIG. 1). The composite tube (109 in FIG. 1) is structurally adhered to the inlet mounting flange and also an outlet mounting flange (107 in FIG. 1). The outlet flange contains a second load point (108 in FIG. 1) which attaches the composite beam to the external structure. Also integrated into the output flange is the exhaust gas passage (110 in FIG. 1) that ducts the exhaust products generated during combustion through a gas pressure regulator (111 in FIG. 1) and through a filter (112 in FIG. 1) to remove particles from the exhaust stream. An exhaust outlet tube (113 in FIG. 1) ducts the remaining exhaust gases to a remote location.

Figure 2:
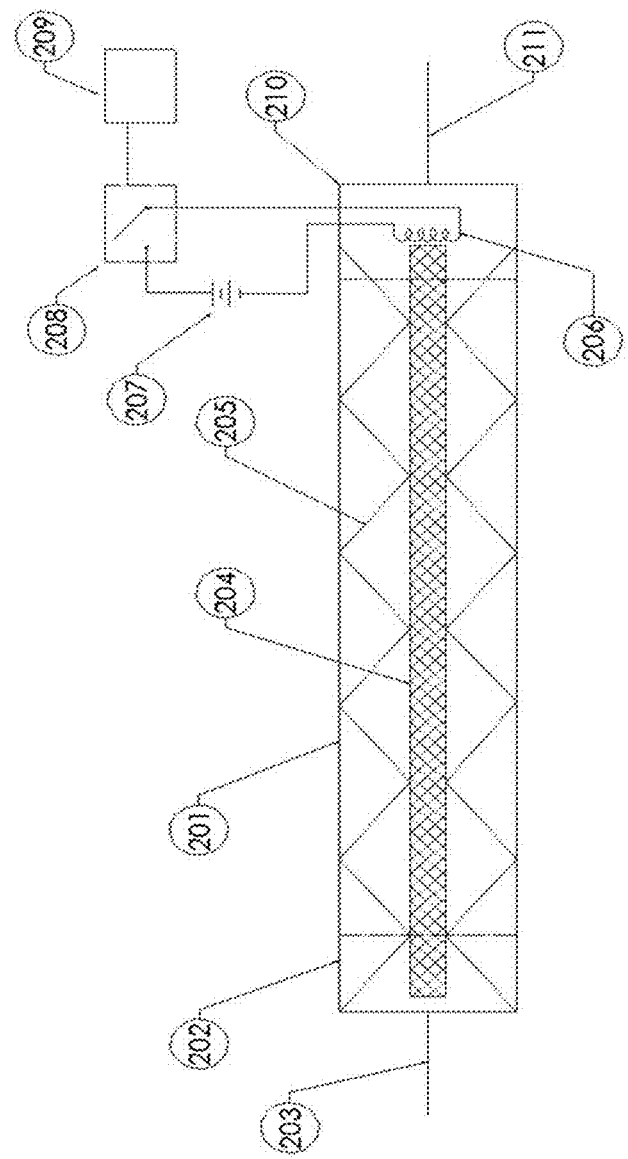
FIG. 2 shows a schematic of a composite tube and ignition element.

Referring now to FIG. 2, a schematic of a composite tube setup 200 is shown. The combustion element (204) is supported concentrically or non-concentrically within the composite tube (201) by a polymer scaffold (205) that is consumed during the combustion process. The combustion element (204) is ignited by an electrical, mechanical or chemically initiated pyrotechnic ignitor (206) or by using other known techniques. The pyrotechnic ignitor (206) is initiated via energy stored in an electrical battery, pneumatic accumulator or mechanical spring (207). Initiation energy is switched through an electrical contactor, pneumatic valve or mechanical catch (208) controlled either manually or electronically (e.g., via a microcomputer (209)).

In the embodiment described above in FIG. 2, the wall of the composite tube (201 in FIG. 2) is structurally adhered to the load bearing inlet structural mount (202) and exhaust structural mount (210). Inflation gas flows from the inlet port (203) through the composite tube (201) to the exhaust port (211). In some embodiments, the gas flow is counter to the direction of combustion in order to sweep the combustion byproducts away from the area of composite that is still unexposed to light. In some embodiments, the gas flow is with the direction of combustion in order to sweep the thermal byproducts along the remaining uncombusted portions of the element.

Figure 3:
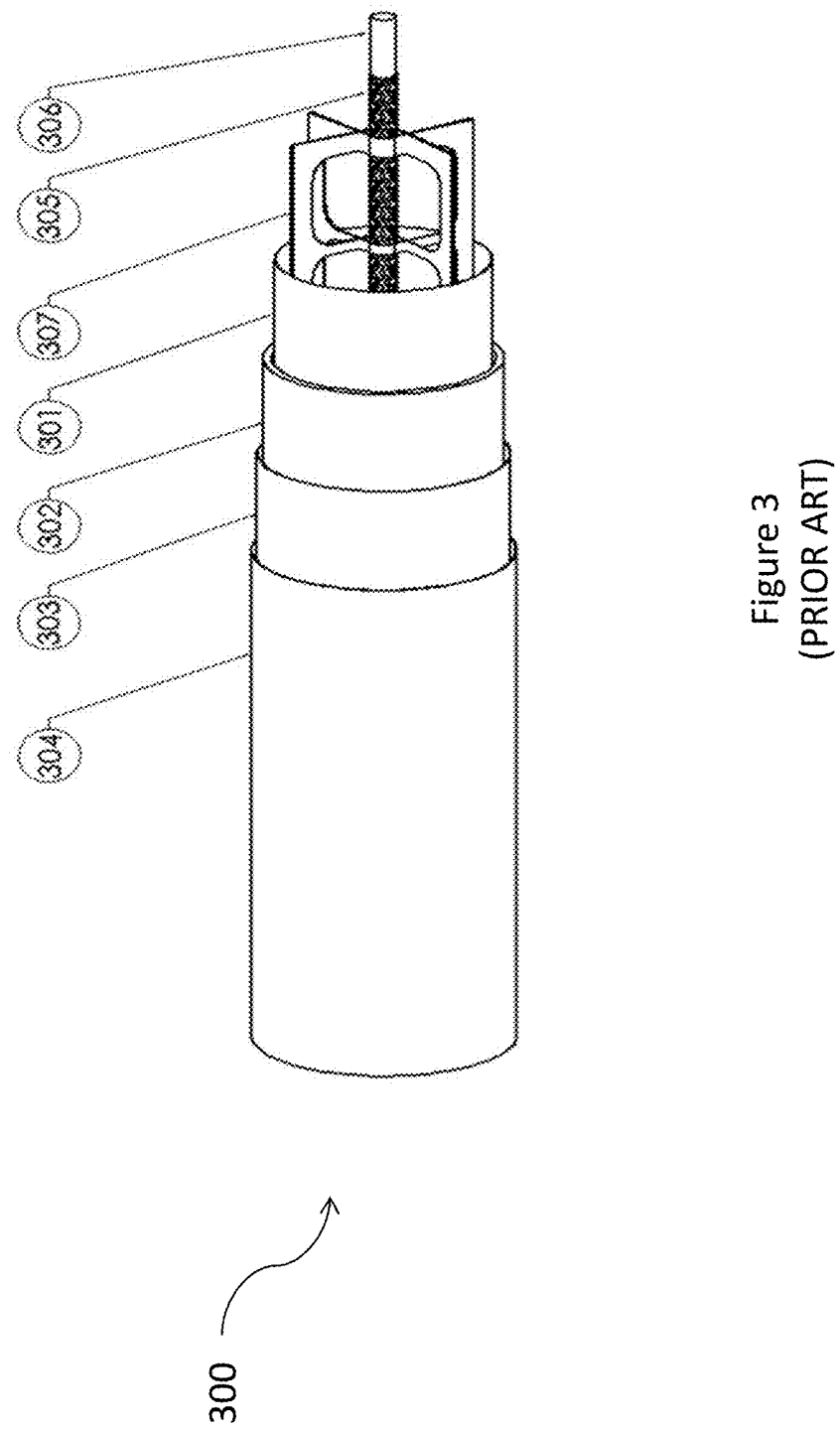
FIG. 3 shows a material diagram of a composite tube.

The deployable tube assembly (300 of FIG. 3 includes an inner pressure bladder (301) made of a thin polymer of low gas permeability and high transparency to UV light, such as polyester film. The inner pressure bladder (301) functions as a sealed pressure membrane to force outward the fibrous fabric walls of the composite tube assembly (300) during inflation. The structural component of the composite tube assembly (300) includes fiberglass or quartz glass fabric that is impregnated with a UV curing polymer (also called "adhesive" herein) (302). Examples of UV curing polymers are acrylates, epoxides, and vinyl ethers. In some embodiments, the structural component of the composite tube assembly (300) includes fiberglass or quartz glass, as well as a small amount of KEVLAR® (e.g., para-aramid synthetic fiber, e.g., poly-paraphenylene terephthalamide) or carbon fibers.

In some embodiments, the para-aramid synthetic fiber is present in an amount between about 1 to about 25% based on total amount of fiber. In some embodiments, various fibers may be added to the structural component of the composite tube assembly (300), including carbon, polyethylene, E-glass, S-glass, boron nitride or other structural fibers. Other examples of fibers include: 1) structural fibers such as E-glass, S-glass, quartz glass, nylon, aramid (trade name Kevlar), Para-aramid (trade name Twaron), carbon fiber, boron nitride, polyester, polyethylene terephthalate (PET), aromatic polyester (trade name Vectran), ultra-high molecular weight polyethylene (UHMW PE) trade names include "Dyneema" and "Spectra", polybenzimidazole, polyphenylenebenzobisozazole, polyimide, polyphenylene sulfide, polytetrafluoroethylene, melamine, basalt, asbestos; 2) light curing adhesives photoinitiator types such as, epoxides, oxetanes, vinyl ethers, benzoin ethers, benzoyl oximes, and acylphosphines, acetophenones, benzophenones, xanthones, quinones, pyridinium, onium salts, ferrocinium salts, organometallic compounds; 3) light curing adhesive oligomers such as acrylated epoxides, acrylated urethanes, acrylated polyethers, or acrylated polyesters; and 4) Light curing adhesive monomers such as epoxide, N-vinylpyrrolidone, styrene, vinyl ethers, N-vinyl carbazoles, lactones, lactams, cyclic ethers, cyclic acetals, and cyclic siloxanes. In some embodiments, a glass component (e.g., fiberglass or quartz glass) is the main component of the structural component of the composite tube assembly (300) because it does not absorb photoactive light. In some embodiments, the fiber components added to the structural component (e.g., other than the glass component), may absorb the photoactive light thereby preventing the photopolymer adhesive from curing. The resin coated fabric tube is constrained from unlimited outward expansion by a tubular film of polymer such as polyester (303). An external protective layer (304) functions as a barrier to external UV light, thermal exposure and mechanical damage. The combustion element of the composite tube assembly 300 consists of a hollow braided metal wire tube (305) in which its center contains a solid oxidizer compound (306). The combustion element (305 and 306) is centered within the composite tube assembly (300) by a polymer scaffold (307).

Flat Combustion Element

In some embodiments, U.S. Pat. No. 9,216,813 discussed above relates to the use of a cylindrical braided combustion element. During combustion, the cylindrical braided combustion element generates a uniform light intensity pattern with respect to its cross-section plane. In some embodiments, a cylindrical cross-section combustion element shown in FIG. 31 (of U.S. Pat. No. 9,216,813) may be ideally suited for illuminating photopolymer material in a surrounding cylindrical tube. However, in some embodiments, a cylindrical combustion element as shown in U.S. Pat. No. 9,216,813 may not be ideal for illumination of non-cylindrical photopolymer tubes or flat or large curved photopolymer surfaces. In some embodiments, a combustion element that is flattened will produce a radiation pattern of higher intensity when viewing its flat surface versus viewing its edge, as shown, for example, in FIG. 20. In some embodiments, using a combustion element that is flattened allows the ability to place photocomposite materials of greater thickness, (thus requiring more total energy to cure) in the areas of greater radiative intensity. In some embodiments, correspondingly thin sections of photocomposite are located in regions of lower radiative intensity. In some embodiments, this allows the most efficient use of the combustion generated illumination while minimizing potential destructive heating from the associated thermal byproducts of combustion.

Figure 4:
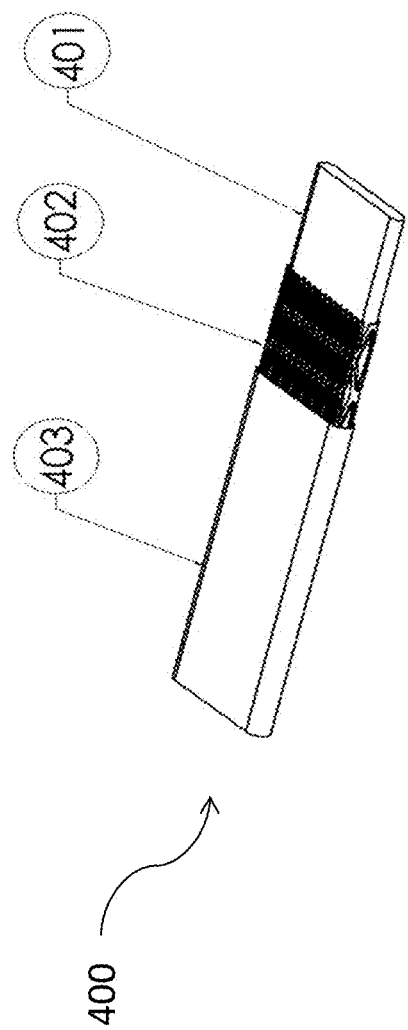
FIG. 4 shows a schematic of a flat combustion element, in accordance with some embodiments of the present disclosure.

In some embodiments, a flat combustion element 400 as shown in FIG. 4, which has a width that is greater than its thickness (e.g., 2 times, 3 times, 4 times, 5 times, greater than 5 times its thickness), can include a braided outer jacket of combustible metal wires such as magnesium, aluminum, iron, zirconium, titanium, lithium, sodium, potassium, etc., including any suitable combination thereof, and other suitable combustible metal materials, either in pure or alloy form. In addition to braiding, metal wires can be woven or crocheted, or the metal can be perforated or stamped or etched metal sheet, or be sintered or printed from metal powder. In some embodiments, the metal wires may be arranged in any suitable manner.

In some embodiments, the wire jacket (402 in FIG. 4) may be manufactured as a cylindrical tubular braid and then formed into a hollow flattened oval or ellipsoid cross-section. The wire jacket (402) may be filled with a powdered or granulated solid oxidizer (401) such as sodium perchlorate, potassium perchlorate, ammonium perchlorate, sodium chlorate, potassium chlorate, sodium nitrate, potassium nitrate, ammonium nitrate, potassium permanganate, etc., including any suitable combination thereof. The wire jacket (402) may be wrapped with a thin polymer film (403) ranging in thickness from about 1 micron to about 2 mm (e.g. about 1-500, 1 250-750, 500-1500, 750-1250, 1000-1500, 1250-1750, 1500-2000 microns) to serve as a barrier to the granules of solid oxidizer stored within the porous tubular braid as shown in FIG. 4. In some embodiments, a flat combustion element assembly (400) will provide a radiative emission pattern that varies in intensity depending on angle from the perpendicular surface of the flat element as shown on the intensity versus angle plot (shown in FIG. 20 below). In other words, in some embodiments, the light intensity may be the highest when looking perpendicularly at the flat combustion element assembly 400, whereas the light intensity may be significantly lower when looking at it from a steep angle. In some embodiments, the flame protrudes from the flat surface causing an opposite effect.

Figure 5:
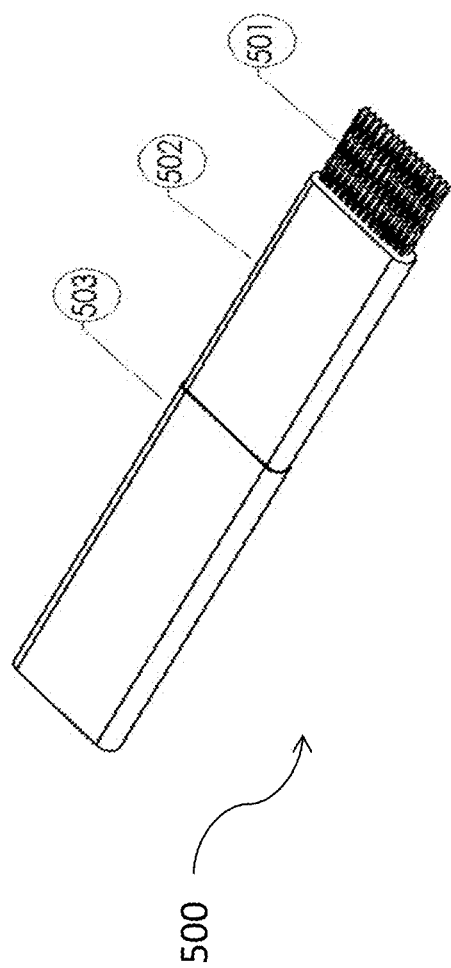
FIG. 5 shows a schematic of a solid braided flat combustion element, in accordance with some embodiments of the present disclosure.

In some embodiments, for example as shown in FIG. 5, the flat combustion element may be woven or braided as a non-hollow flat tape (501). In addition to a woven or braided construction, the combustible (or consumable) metal component may also be a continuous sheet of foil. A powdered oxidizer (502) may be coated on the exterior of the braid. The powdered oxidizer (502) may be wrapped with a thin polymer film (503) to contain the granules/powder of solid oxidizer. In some embodiments, the containing film (503) may be eliminated in lieu of using a flexible polymer resin binder to contain the oxidizer granules/powder. In some embodiments, advantages of containing the solid oxidizer with a flexible binder may include, for example, preventing the migration of solid oxidizer powder due to vibration and/or flexing of the element, as well as ease of application of the mixture during assembly.

Figure 6:
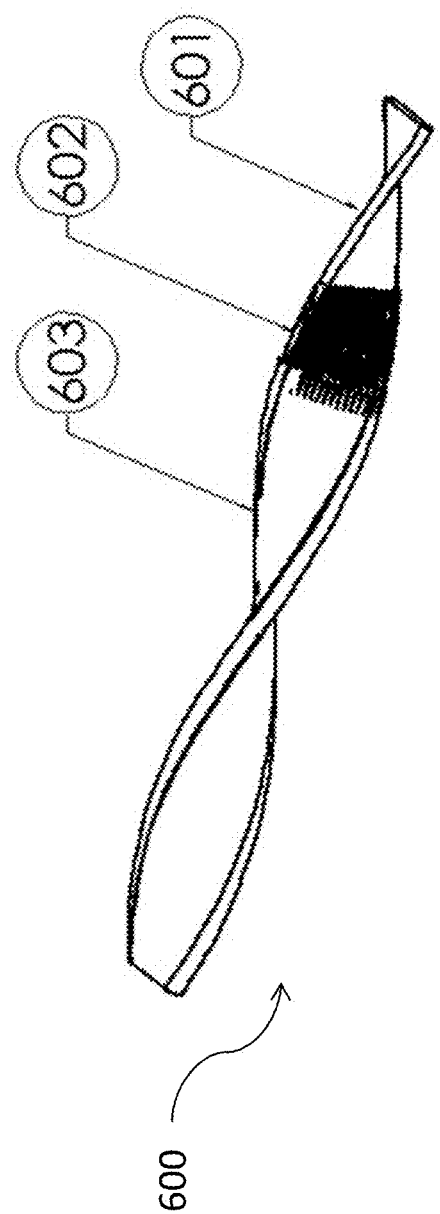
FIG. 6 shows a schematic of a twisted flat combustion element, in accordance with some embodiments of the present disclosure.

In some embodiments, a flat element of either the implementation shown in FIG. 4 or FIG. 5 may be twisted into a helix as shown in FIG. 6 to allow for bending in multiple planes. In addition, its helical radiation emission pattern minimizes the steep intensity vs. angle gradient as viewed by the surrounding photopolymer composite due to the overlapping intensity of light from adjacent regions. The assembly 600 in FIG. 6 includes a hollow braid (602) over a solid oxidizer core (601), all of which are enveloped with an outer protective film (603).

As discussed above, FIGS. 4-6 relate to embodiments using a flat combustion element. A flat combustion element is distinguishable from combustion elements having a circular cross-section that are used, for example, in U.S. Pat. No. 9,216,813. In some embodiments, one advantage of using a flat combustion element as described herein is that its combustion can produce a non-uniform light emission pattern which can be applied to the photocuring of non-round beams such as, for example, rectangular, oval or elliptically sectioned tubes or I-beams.

In some embodiments, a flat combustion element can be made thinner than a round combustion element, therefore a flat combustion element may be used in applications that take advantage of the ease of rolling up a flat tape into a very tight spiral or zigzag configuration (or another suitable configuration).

In some embodiments, the implementations shown in FIGS. 4-6 may be used for a variety of applications, including, for example, but not limited to, space satellite solar sails, instrument booms and trusses, satellite solar panels, satellite telescopes, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers and aerobraking surfaces for rocket boosters, satellite, and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipes, trenchless pipelining, HVAC ducting, electrical conduits, plumbing; emergency equipment such as: life rafts, boat and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application(s) where the structure will be deployed within a liquid environment. In some embodiments, the implementation shown in FIG. 4-6 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the implementations shown in FIGS. 4-6 may be deployed in about a fraction of a second, several seconds (e.g., about 1-60 seconds), several minutes (e.g., about 1-60 minutes), several hours (e.g., about 1-5 hours, 3-10 hours, 5-15 hours, 10-24 hours, etc.), or several days (e.g., 1-5 days, 3-10 days, etc.). In some embodiments, the deployment time is fully customizable depending on the particular application or need.

Gaseous Oxidizer

Figure 7A:
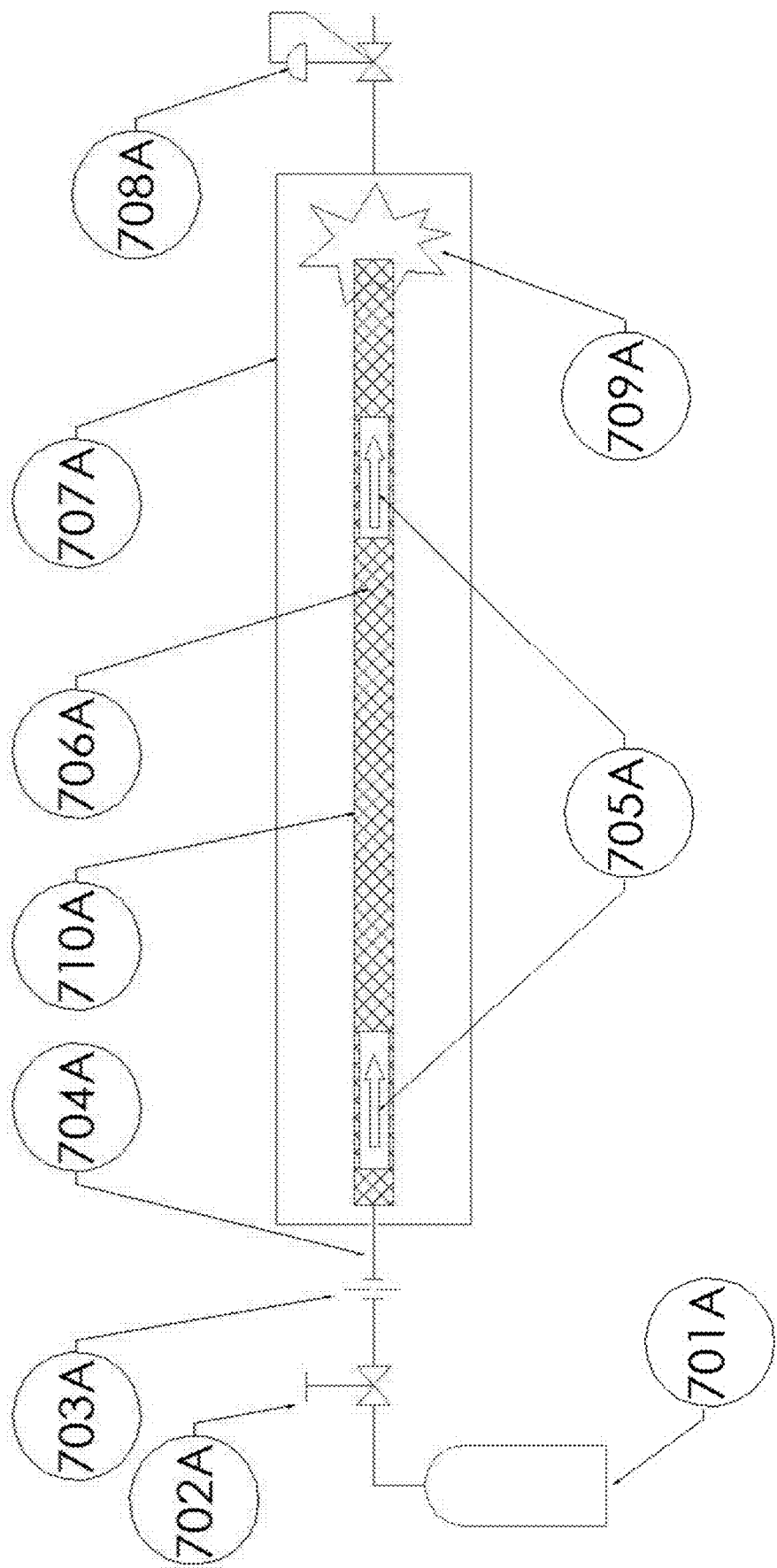
FIG. 7A shows a schematic of a compressed gaseous oxidizer flowing within a combustion element, in accordance with some embodiments of the present disclosure.
Figure 7B:
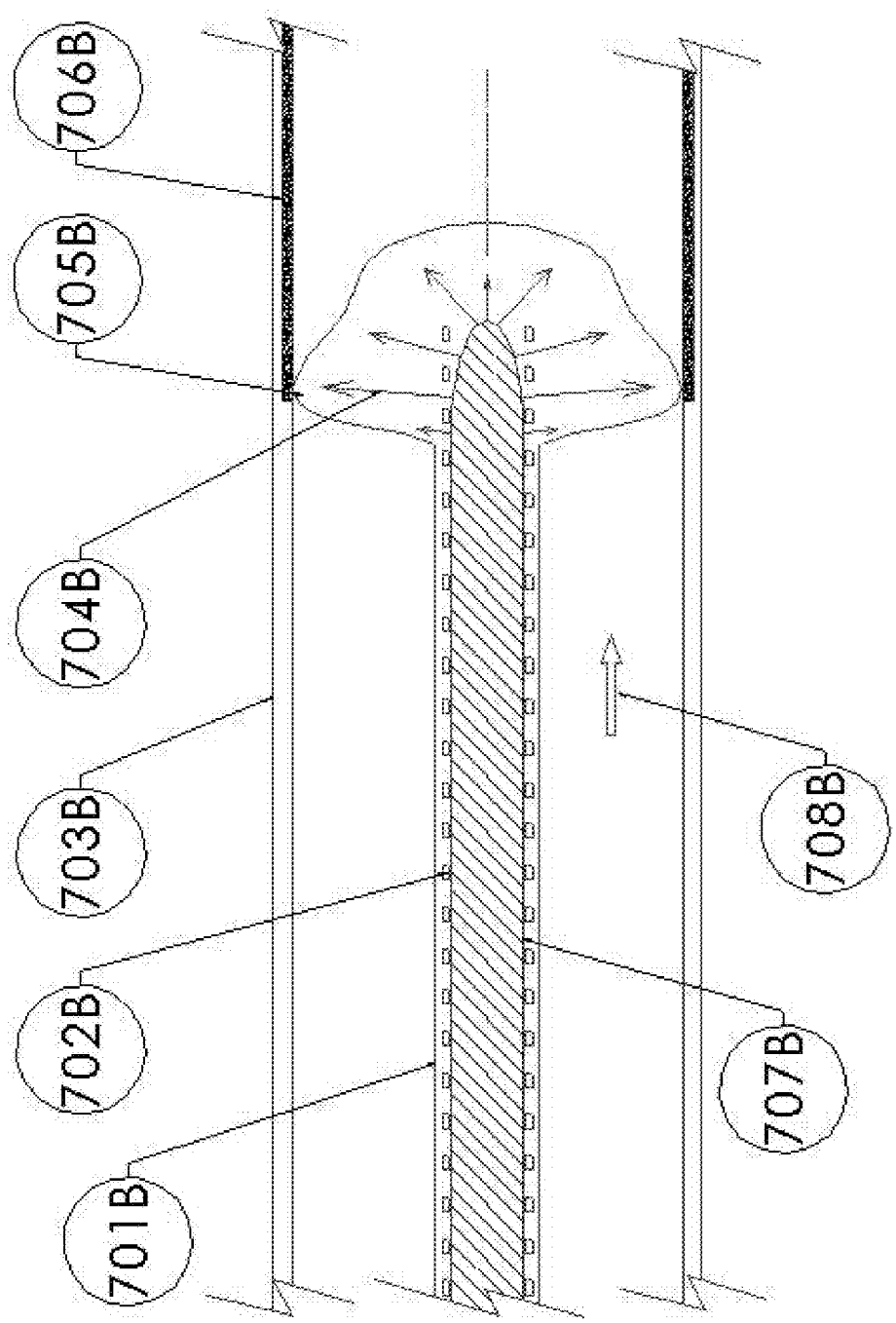
FIG. 7B shows a schematic of a prior art combustion element containing solid oxidizer.
Figure 7C:
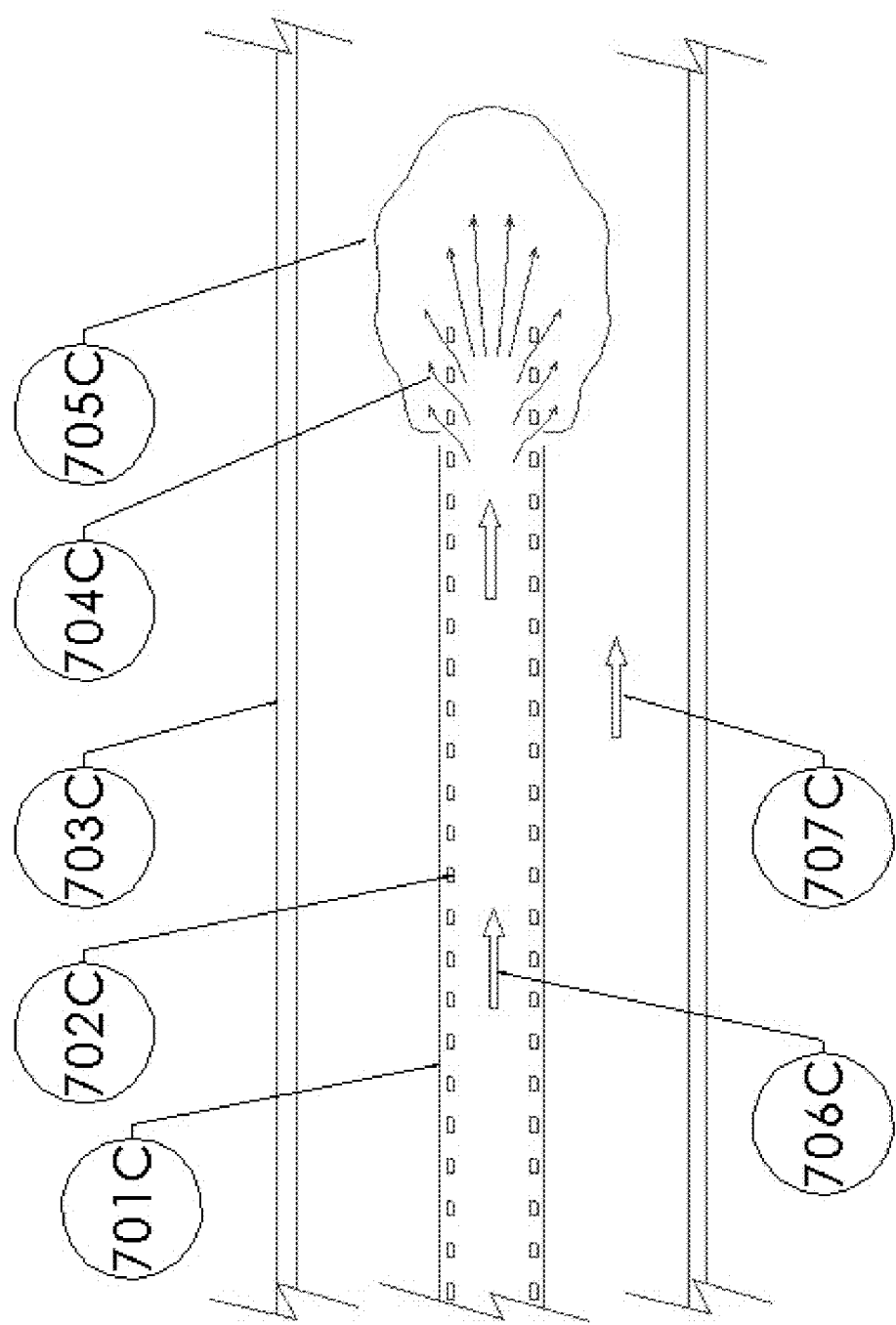
FIG. 7C shows schematic of a system with a gaseous oxidizer, in accordance with some embodiments of the present disclosure.
Figure 7D:
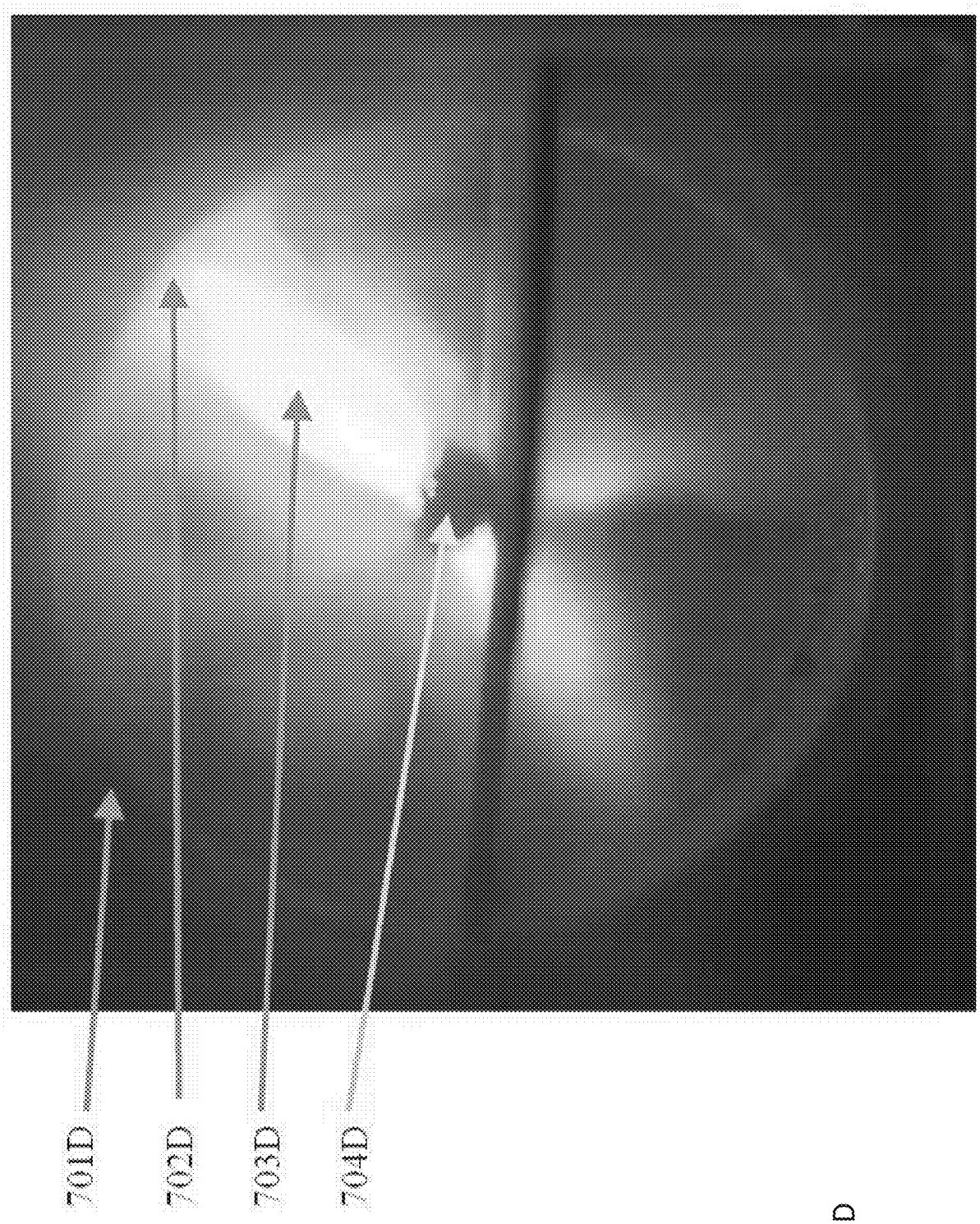
FIG. 7D shows an axial view of a prior art combustion element.
Figure 7E:
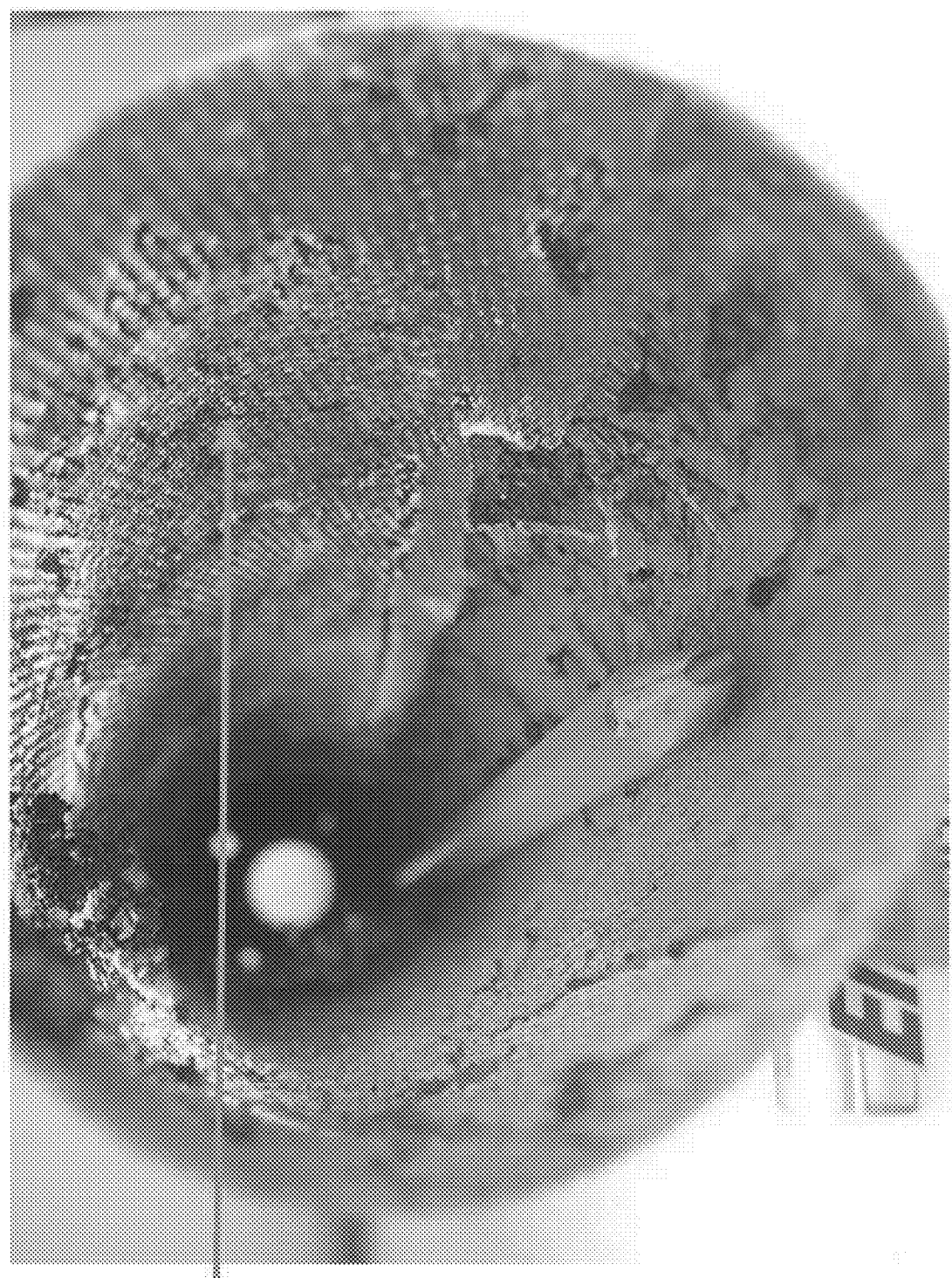
FIG. 7E shows an axial view of large areas of structurally critical thermal damage to the composite from flame contact in prior art systems.
Figure 7F:
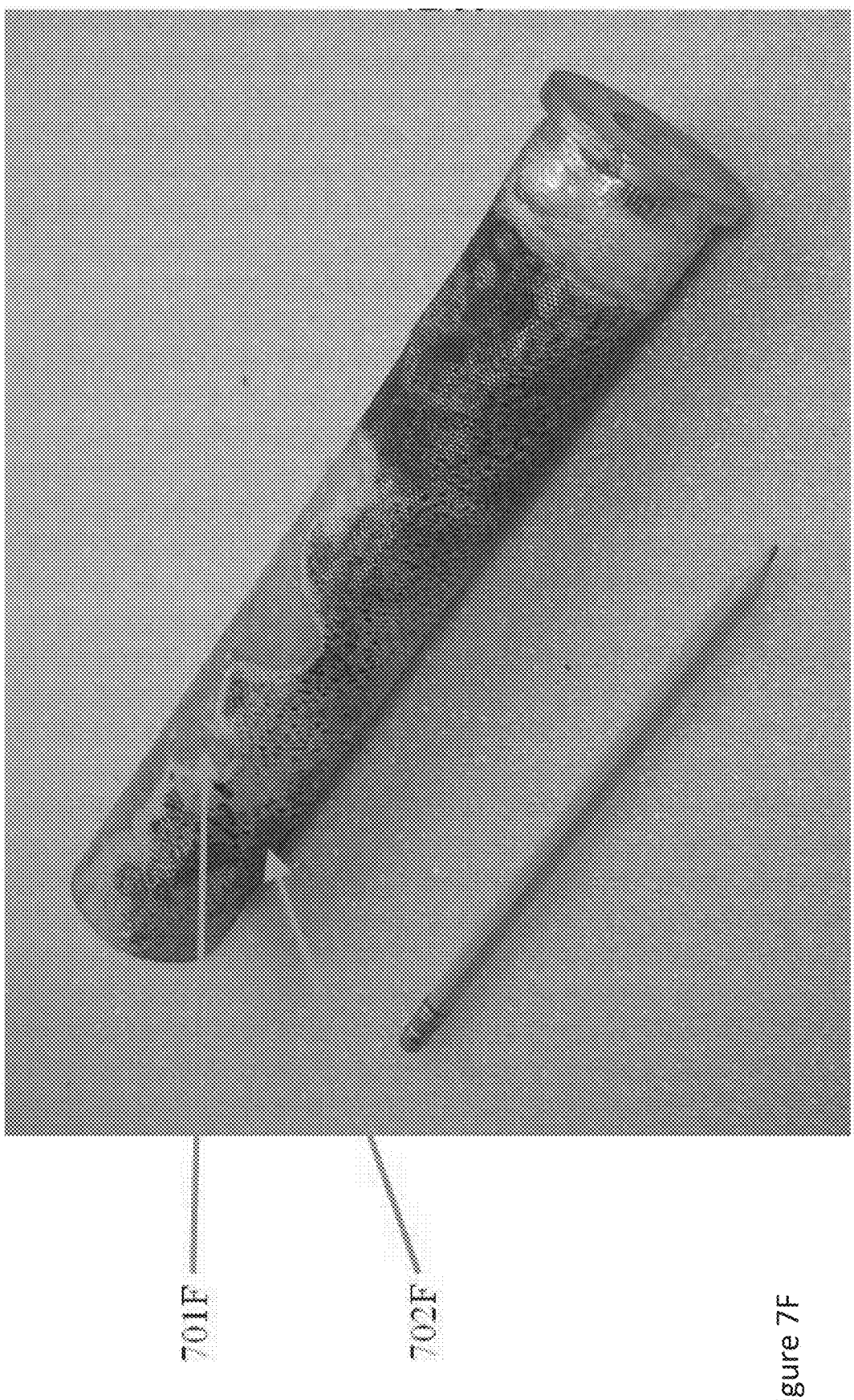
FIG. 7F shows a side view of large areas of structurally critical thermal damage to the composite from flame contact in prior art systems.

Prior art combustion elements are shown in FIGS. 7B, 7D, 7E and 7F. FIG. 7B shows a schematic of a prior art combustion element containing solid oxidizer. FIG. 7D shows an axial view of a prior art combustion element. FIG. 7E shows an axial view of large areas of structurally critical thermal damage to the composite from flame contact in prior art systems. FIG. 7F shows a side view of large areas of structurally critical thermal damage to the composite from flame contact in prior art systems. Prior art combustion elements containing solid oxidizer (707B in FIG. 7B) & (704D in FIG. 7D) exhibited a strongly negative characteristic in which jets of flame (705B in FIG. 7B) & (703D in FIG. 7D), would be projected from the combustion element in a radial direction thus impinge onto the photo-curing structural composite (703B in FIG. 7B) & (702D) & (701F in FIG. 7F). The jets of flame caused moderate to severe damage to the pressure bladder and composite (706B in FIG. 7B). Large areas of structurally critical thermal damage to the composite from flame contact can be seen as brown patches in: (701E in FIG. 7E) & (702F in FIG. 7F). It was determined that in the initial region of the combustion zone the oxidizer gas being released from the thermal decomposition of the solid oxidizer at the core would then travel through gaps in the metallic braid (702B in FIG. 7B) comprising the surface of the combustion element. The jets of oxidizer (704B in FIG. 7B) would entrain and propel the ambient flame in the combustion region radially outwards. These jets of flame would contact the surface of the photo-curing structural composite and cause thermal damage. 708B indicates the direction of flow of the oxidizer gas. 701B, 701C, and 701D indicate the edge of the hollow combustion element.

Figure 7G:
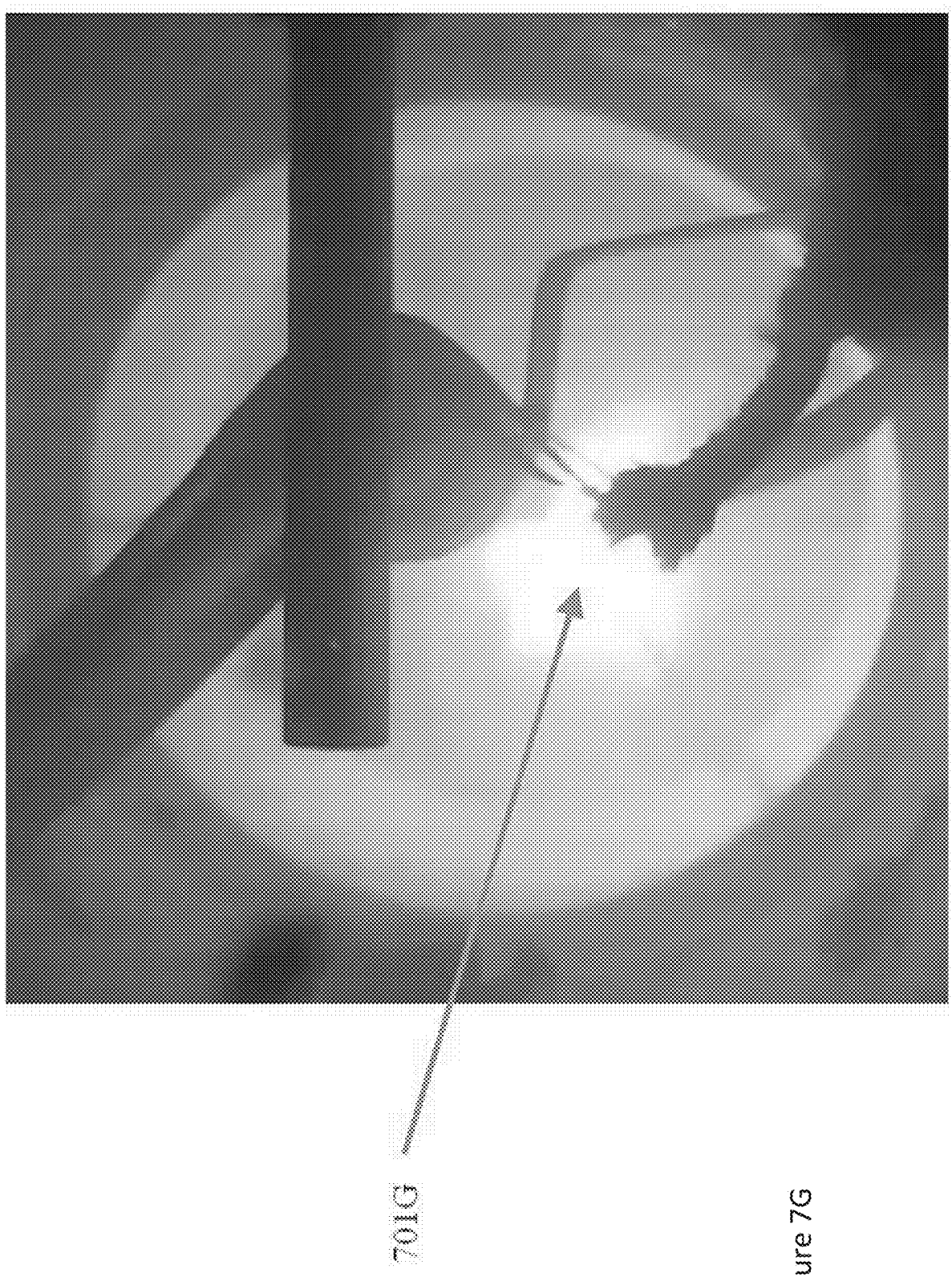
FIG. 7G shows an axial view of a zone of combustion, in accordance with some embodiments of the present disclosure.
Figure 7H:
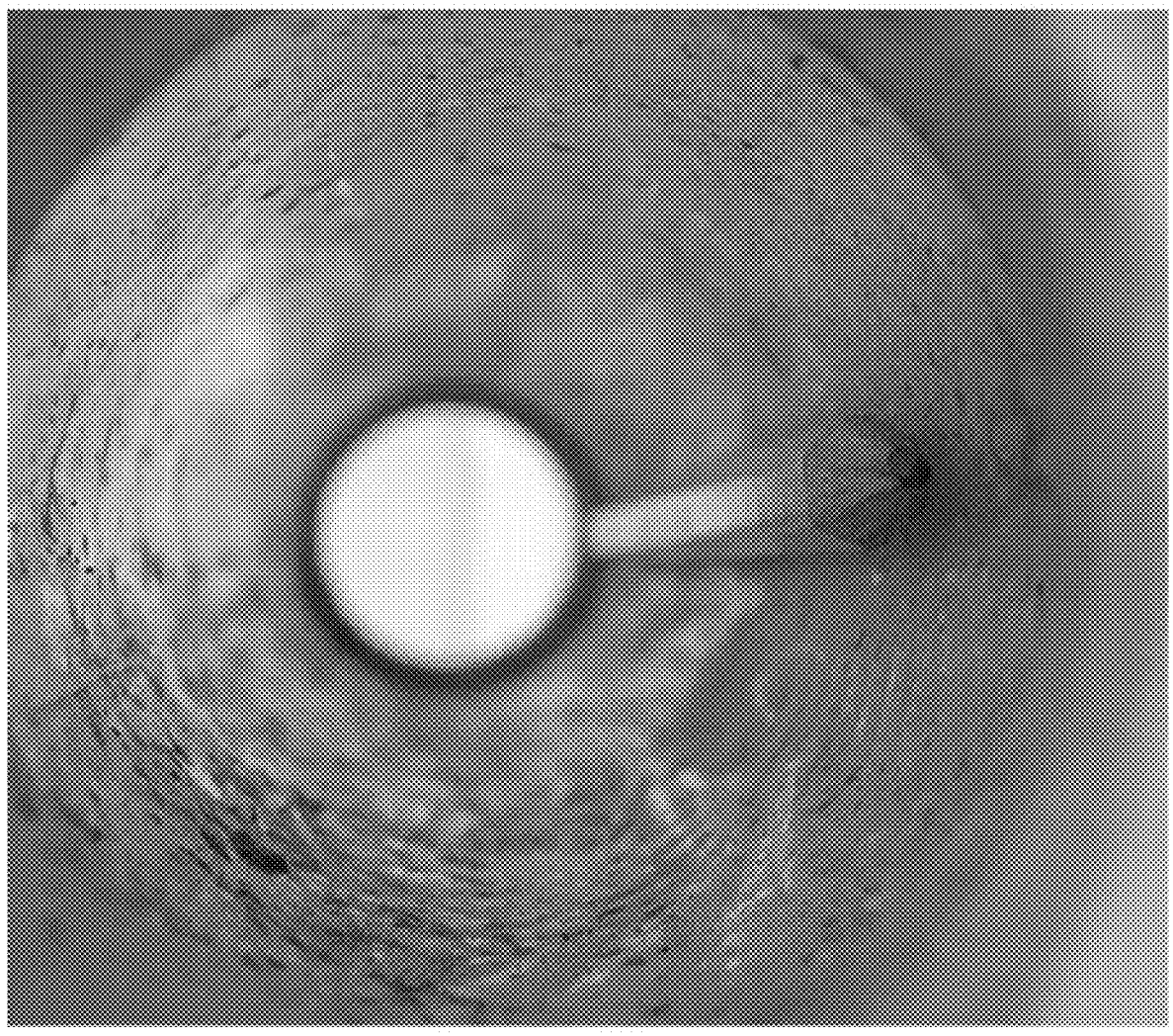
FIG. 7H shows an axial view of a photo-curing structural composite with a lack of thermal damage, in accordance with some embodiments of the present disclosure.
Figure 7L:
FIG. 7I shows photo-curing structural composite with a lack of thermal damage, in accordance with some embodiments of the present disclosure.
FIG. 7J shows photo-curing structural composite with a lack of thermal damage, in accordance with some embodiments of the present disclosure.
Figure 7J:
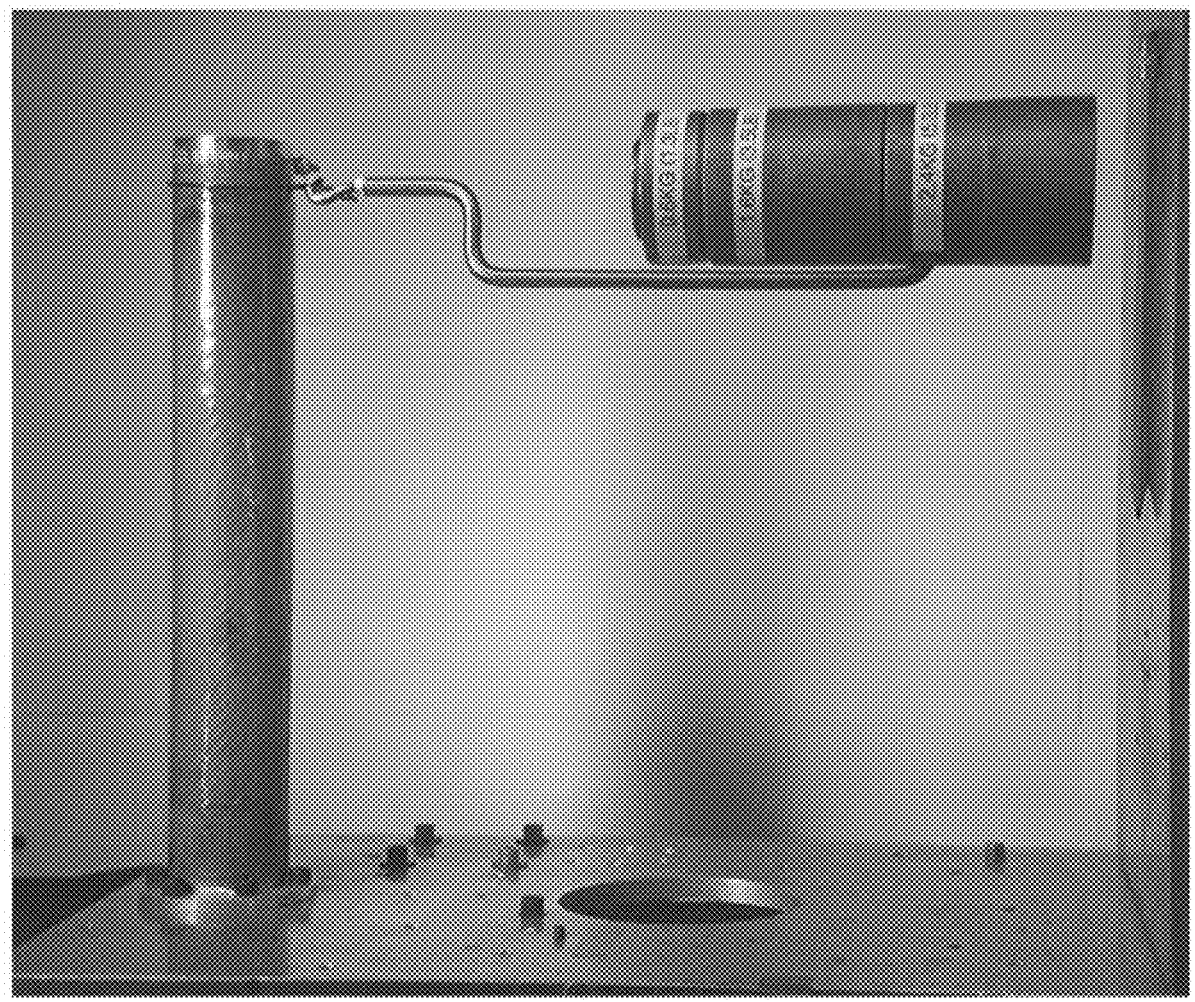

This problem was eliminated by substituting the solid oxidizer with a compressed gaseous oxidizer (706C in FIG. 7C). FIGS. 7G, 7H, 7I, and 7J show embodiments of the invention. FIG. 7G shows an axial view of a zone of combustion, in accordance with some embodiments of the present disclosure. FIG. 7H shows an axial view of a photo-curing structural composite with a lack of thermal damage, in accordance with some embodiments of the present disclosure. FIG. 7I shows photo-curing structural composite with a lack of thermal damage, in accordance with some embodiments of the present disclosure. FIG. 7J shows photo-curing structural composite with a lack of thermal damage, in accordance with some embodiments of the present disclosure. The gaseous oxidizer travels through the hollow central portion of the tubular braided combustion element (702C in FIG. 7C). The oxidizer gas is retained to the core of the combustion element and kept separate from ambient inflation cooling gases (707C in FIG. 7C) by a non-permeable membrane (701C in FIG. 7C). As the gaseous oxidizer (704C in FIG. 7C) enters the combustion region (705C in FIG. 7C) it experiences no solid-gas phase change expansion therefore has minimal expansion in the radial direction. The resulting zone of combustion (705C in FIG. 7C) & (701G in FIG. 7G) is smaller in diameter and contains no significant radial jets of flame. Experiments have successfully shown that this improvement has eliminated thermal damage to the photo-curing structural composite (703C in FIG. 7C) & (700H in FIG. 7H) & (700I in FIG. 7I) & (700J in FIG. 7J).

To minimize or eliminate an uncontrolled fire, in some embodiments, a mechanical means such as a shut off valve or a 3-way valve to stop or divert the flow of gaseous oxidizer from the combustion element is provided.

Figure 8:
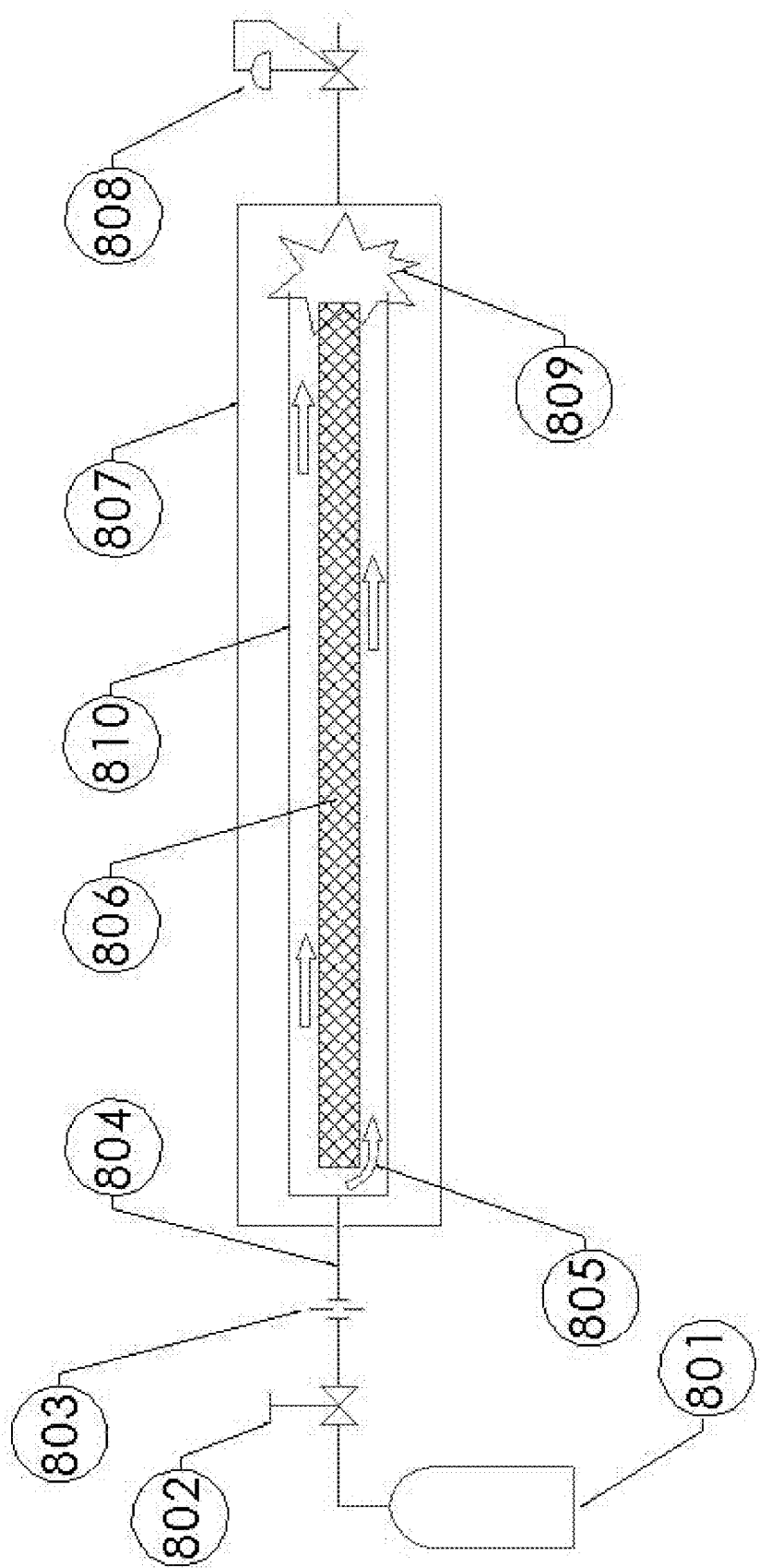
FIG. 8 shows a schematic of a gaseous oxidizer flowing external to a combustion element, in accordance with some embodiments of the present disclosure.

FIGS. 7A and 8 show exemplary combustion element setups 700 and 800, respectively, that include an oxidizer. The oxidizer in gaseous form is provided to the combustion element (e.g., 706 in FIG. 7A, 806 in FIG. 8) when needed (e.g., on demand) in lieu of the solid oxidizer being integrated into the combustion element itself as with some conventional systems. In some embodiments, the use of gaseous oxidizer improves safety. This is so because, if needed, the combustion process can be terminated by shutting off the oxygen supply. In some embodiments, the oxidizer gas (arrows 705A in FIG. 7A) will flow inside the hollow combustion element and be separated from the surrounding inflation gas by a thin, flexible gas-impermeable membrane (710A). In some embodiments the thin, flexible, gas impermeable membrane will conform tightly to the combustion element to maximize surface contact to the exterior of the combustible portion (706A) of the element. In some embodiments, the oxidizer gas (arrows 805 in FIG. 8) will flow outside the hollow combustion element and be separated from the surrounding inflation gas by a thin, flexible gas-impermeable membrane (810). In some embodiments the thin, flexible, gas impermeable membrane will be separated between the exterior of the combustible portion (806) of the element by a gap sufficiently wide enough to allow flow of the oxidizer gas.

In some embodiments, the gaseous oxidizer is stored as a compressed gas in a pressure vessel (701A in FIG. 7A and 801 in FIG. 8). In some embodiments, gas flow is controlled with a valve (702A in FIG. 7A and 802 in FIG. 8). In some embodiments, the valve (e.g., 702A, 802) may be actuated either manually, electrically, mechanically (e.g., spring loaded mechanism), or pyrotechnically. In some embodiments, the gas flow is controlled either by a restricting flow orifice, valve, capillary tube or an electrical or mechanical feedback looped flow controller (703A in FIG. 7A and 803 in FIG. 8). Gas may flow through a supply passage (704A in FIG. 7A and 804 in FIG. 8) to the inlet at the base of the combustion element (706A in FIG. 7A and 806 in FIG. 8). After combustion in the combustion zone (709A in FIG. 7A and 809 in FIG. 8), the oxidized byproducts may mix with the inflation gas and exit the composite tube (707A in FIG. 7A, 807 in FIG. 8) via the exhaust pressure regulator (708A in FIG. 7A and 808 in FIG. 8).

Figure 9:
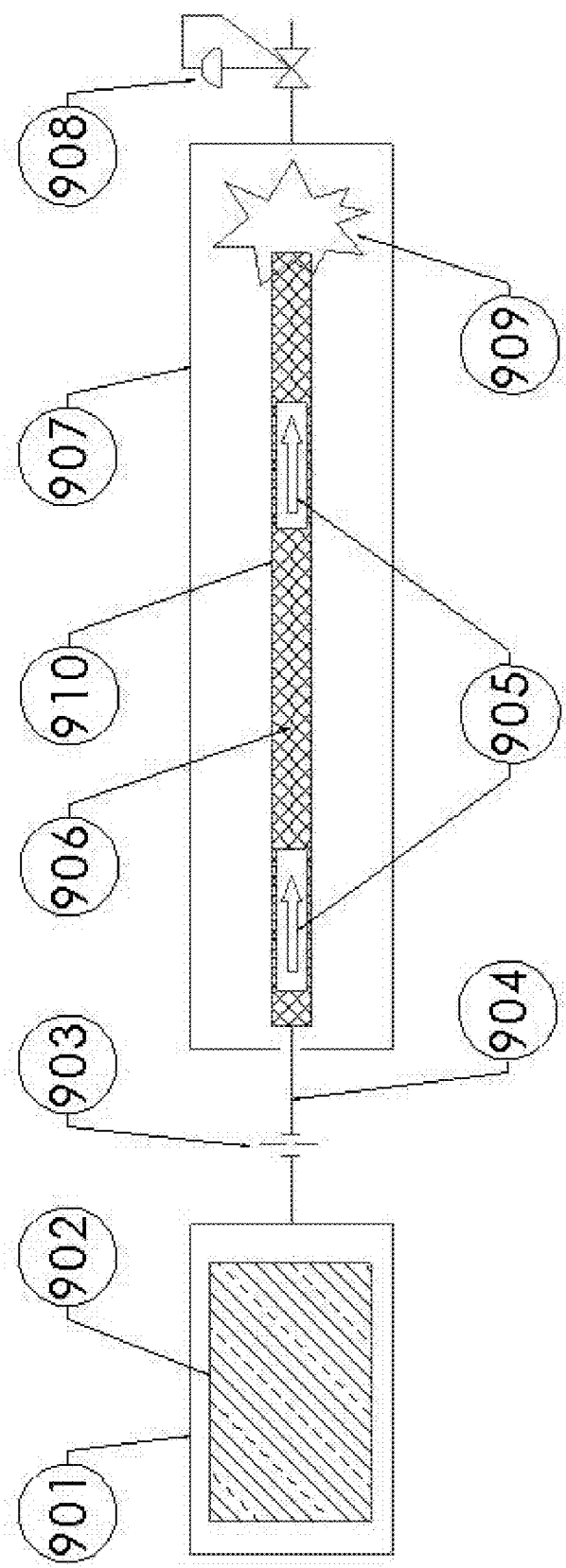
FIG. 9 shows a schematic of an oxidizer generated by external chemical reaction, coupled to a combustion element, in accordance with some embodiments of the present disclosure.

Referring now to FIG. 9, a combustion element setup 900 is shown. In some embodiments, the gaseous oxidizer is generated through a chemical reaction occurring within an oxygen generator (901 in FIG. 9). The chemical generation of oxygen can allow for a more compact, simpler, more reliable and lightweight oxygen supply than by using pressure vessels to contain compressed gas. In some embodiments, the chemical generation of oxygen can result in an overall price decrease of the system. In some embodiments, the chemical generation of oxygen can result in reduced system mass and complexity. In some embodiments, oxygen can be generated via the thermal decomposition of potassium chlorate or sodium chlorate, or another suitable method (902 in FIG. 9). The gas flow may be controlled either by a restricting flow orifice or an electrical or mechanical feedback looped flow controller (903 in FIG. 9). The gaseous oxidizer (arrows 905 in FIG. 9) may flow through a supply passage (904 in FIG. 9) to the inlet at the base of the combustion element (906 in FIG. 9). In some embodiments, the oxidizer gas (arrows 905 in FIG. 9) will flow inside the hollow combustion element and be separated from the surrounding inflation gas by a thin, flexible gas-impermeable membrane (910). After combustion (e.g., in the combustion zone 909 in FIG. 9), the oxidized byproducts may mix with the inflation gas and exit the composite tube 907 via the exhaust pressure regulator (908 in FIG. 9).

Some conventional systems contain the metallic fuel and solid oxidizer directly mixed with one another, such that upon initiation of combustion, the solid oxidizer begins decomposing to produce oxygen gas. In some embodiments, using gaseous oxygen as the oxidizer provides an ability to vary the combustion speed, as well as an ability to extinguish the combustion whenever needed. In some embodiments, using a gaseous oxidizer as described herein allows greater overall control over the combustion process.

In some embodiments, the implementations shown in FIGS. 7-9 may be used for space satellite solar sails, instrument booms and trusses, satellite solar panels, satellite telescopes, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers and aerobraking surfaces for rocket boosters, satellites, and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipes, trenchless pipelining; emergency equipment such as: life rafts, boat and submarine hull breach repair, medical tents, rescue hoists, expeditionary structures, emergency medical splints, field medical stretchers; medical implants for spinal, skeletal and soft tissue support; water, gas, oil, and sanitary piping, towers, underwater applications or any application where the structure will be deployed within a liquid environment. In some embodiments, the implementation shown in FIG. 7-9 may be used for pipelines, including undersea pipelines, undersea construction, salvage and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the oxygen generator shown in FIGS. 7-9 is reusable (e.g., the chemical reaction container, the valving, and the plumbing may be reused).

Consumable Oxidizer Duct

Figure 10:
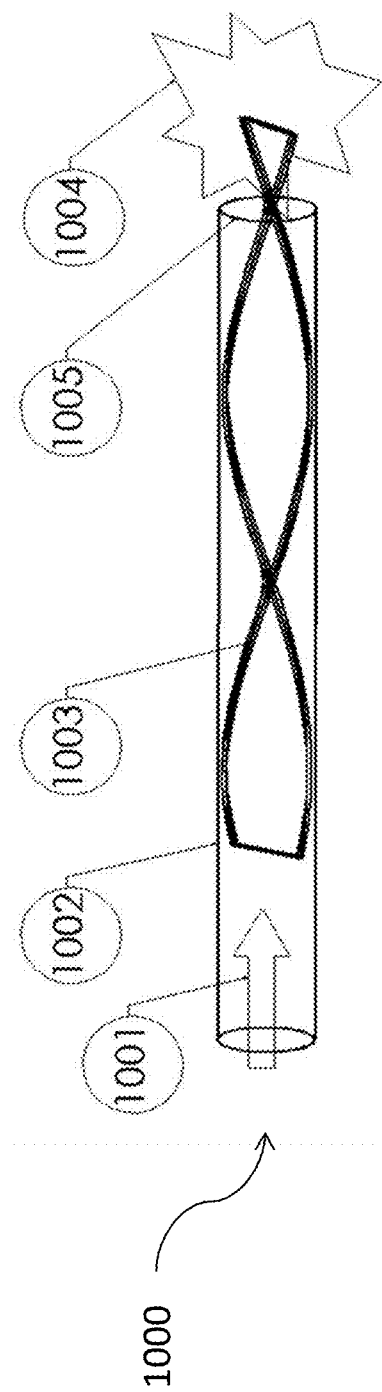
FIG. 10 shows a schematic of a consumable oxidizer duct, in accordance with some embodiments of the present disclosure.

Referring now to FIG. 10, a schematic setup of a combustible (or consumable) element 1000 is shown. The consumable outer film (1002 in FIG. 10) functions to duct gaseous oxidizer such as oxygen gas (flowing in the direction as shown by arrow 1001) supplied from either a compressed oxygen tank or oxygen generator (e.g., as discussed in FIGS. 7-9) to flow over a combustion element (1003) that contains no solid oxidizer. In other words, the schematic setup 1000 may be combined with gaseous oxidizer provided by either a compressed tank/bottle or a chemical oxygen generator. In some embodiments, the consumable outer film (1002) keeps oxidizer gas (1001) in close proximity of the combustion element (1003) and functions as a barrier to the inflation gas(es) surrounding the duct. In some embodiments, the consumable outer film 1002 is impermeable to gas (e.g., inflation gas, outside air). In some embodiments, the consumable outer film (1002) is flexible and folds up along with the combustion element (1003). In some embodiments, the consumable outer film (1002) is thermally consumable such that its open end near the combustion region (1005) will melt/decompose at the same linear rate as the combustion front (proximate the combustion zone 1004) therefore continuously directing the gaseous oxidizer into the combustion zone (1004). The consumable outer film (1002) may include one or more of the following: polyester, polyethylene, polyethylene terephthalate, polycarbonate, polyimide, cellulose, and any combination thereof. In some embodiments, the consumable outer film 1002 is impermeable to gas (e.g., inflation gas, outside air).

In some embodiments, the implementation shown in FIG. 10 may be used for space satellite solar sails, instrument booms and trusses, satellite solar panels, satellite telescopes, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers and aerobraking surfaces for rocket boosters, satellites, and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipes, trenchless pipelining; emergency equipment such as: life rafts, boat and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementation shown in FIG. 10 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the oxygen generator canister may be re-useable.

Solid Propellant Gas Generator for Inflator Deployment

Figure 11:
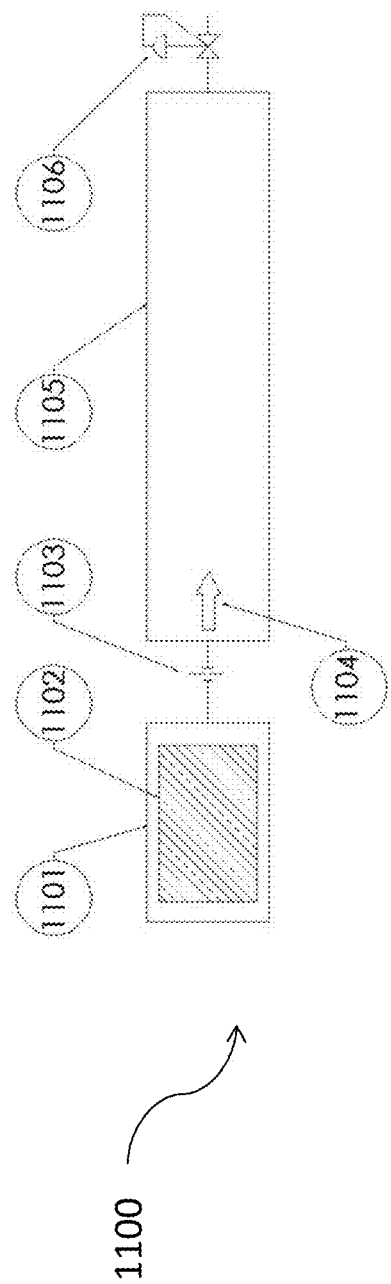
FIG. 11 shows a schematic of a gas generator for inflation gas, coupled to a combustion element, in accordance with some embodiments of the present disclosure.

Referring now to FIG. 11, a schematic setup 1100 of a combustion element and a gas generator 1101 is shown. In some embodiments, the inflation is accomplished using gas created on-site, e.g., from a chemical reaction. In some embodiments, the deployable tube inflation gas such as nitrogen or carbon dioxide is generated through chemical reaction occurring within a solid propellant gas generator. In some embodiments, the chemical generation of gases such as nitrogen or carbon dioxide can allow for a more compact, simpler, more reliable and lightweight inflation gas supply than can be achieved using pressure vessels to contain and supply compressed gas for combustion. In some embodiments, this approach also results in cost savings. In some embodiments, the gas generator (1101) comprises a closed pressure vessel. In some embodiments, nitrogen can be generated via the thermal decomposition of, including but not limited to: sodium azide, viton and/or lithium azides (or other suitable methods) (1102). In some embodiments, the gas flow may be controlled either by a restricting flow orifice or an electrical or mechanical feedback looped flow controller (1103). The inflation gas may then flow (e.g., in direction shown by arrow 1104 in FIG. 11) to inflate and unfold the structural composite or non-structural illuminator tube (1105). In some embodiments, the inflation gas mixes with the byproducts of the combustion element and exits the composite tube via the exhaust pressure regulator (1106).

In some embodiments, the implementation shown in FIG. 11 may be used for space satellite solar sails, instrument booms and trusses, satellite solar panels, satellite telescope, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat and submarine hull breach repair, medical tents, rescue hoists, expeditionary structures, emergency medical splints, field medical stretchers; medical implants for spinal, skeletal, and soft tissue support; water, gas, oil and sanitary piping, towers, underwater applications or any application where the structure will be deployed within a liquid environment. In some embodiments, the implementation shown in FIG. 11 may be used for pipelines, including undersea pipelines, undersea construction, salvage and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the external housing, plumbing and valving, as shown in FIG. 11, can be reused.

Transparent Illuminating Tube Assembly

There is a need to deploy and photochemically rigidize large panels and other shapes that are not attainable with conventional systems, such as systems including one or more tubular beams. Presently, there are no means to expose a large photocomposite panel to illumination of sufficient intensity and total energy to cure it to greater than about 95% cure (e.g., greater than about 96%, 97%, 98%, 99% cure). In some embodiments, a deployed photocomposite panel is exposed to illumination generated by one or more combustion elements each located within a specialized deployable enclosure.

In some embodiments a photocuring panel is pneumatically deployed by affixing an inflatable tubular structure to the panel. In some embodiments, the pneumatic tubular beam itself contains a linear combustion element located coaxially along the tubular beam's axis. In some embodiments, the tubular beam consists of a pressure bladder made of a material that is transparent to the illumination generated by the combustion element contained within.

Some embodiments discussed herein relate to a pneumatically deployable tube that is transparent to the photoactive wavelengths for radiating those photoactive wavelengths to items outside of the deployable tube so that the photoactive wavelengths can be used for: (1) activating photochemical materials (like the photocomposite) that are in view of the illumination tube, and (2) providing illumination for visual or signaling purposes.

Figure 12:
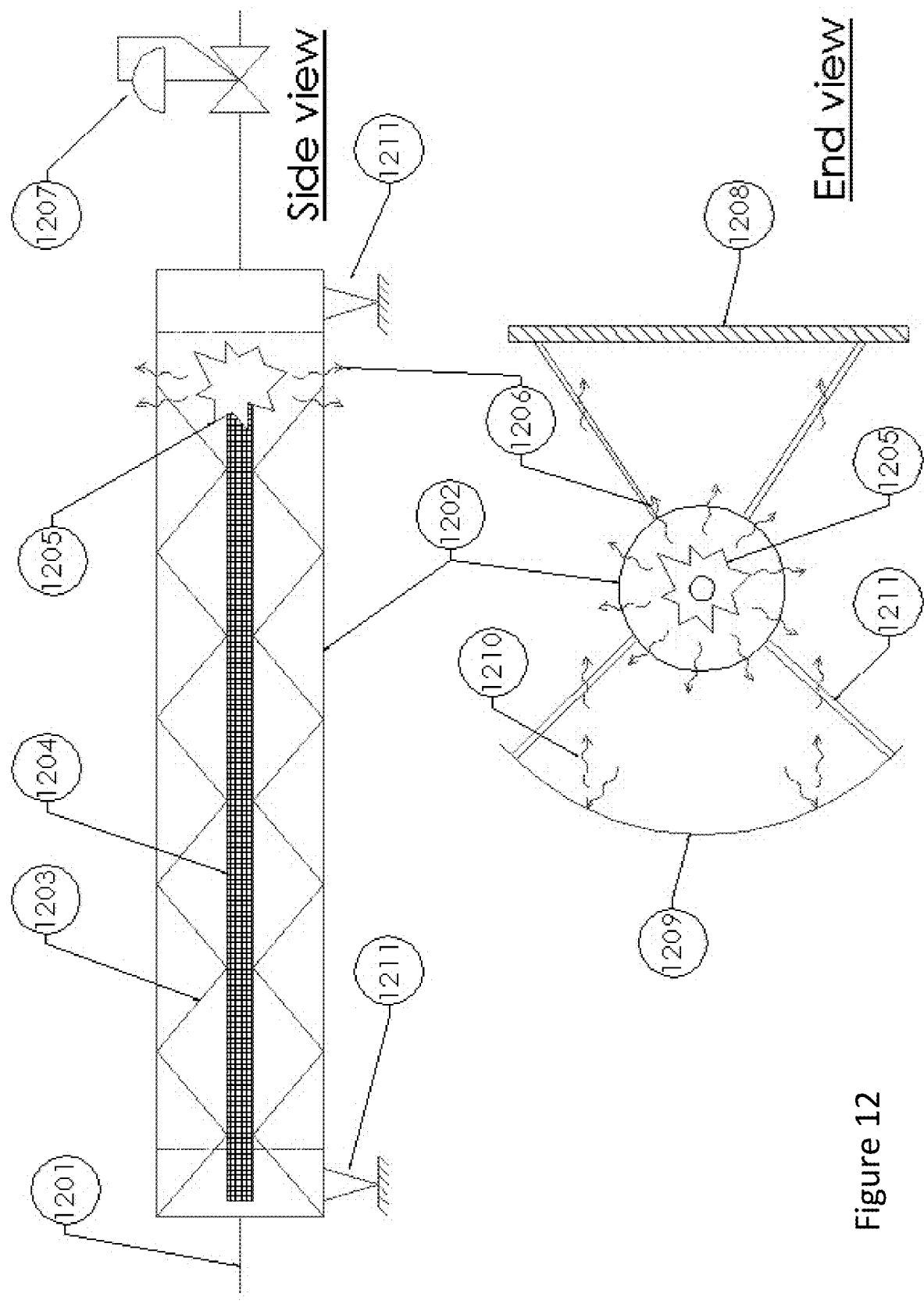
FIG. 12 shows a transparent combustion tube used as a remote illumination/photocuring device, in accordance with some embodiments of the present disclosure.

Referring to FIG. 12, a schematic setup of a transparent illumination tube assembly 1200 is shown. A non-structural (e.g., does not support the primary structural load acting upon the overall composite assembly) illumination tube assembly 1200 can be used to generate illumination in order to cure photochemical components external to the combustion tube assembly 1200. The combustion element (1204) may be supported concentrically or non-concentrically within the illumination tube pressure bladder (1202) by a polymer scaffold (1203). This non-structural tube may contain little or no photochemically active composite within the pneumatically pressurized tube. In some embodiments, photochemical components can include one or more of structural composites, photolithographic objects, and photocuring dyes for information storage. Aside from photocuring, in some embodiments, the combustion tube assembly 1200 can also be used for visual illumination or signaling communications.

The illumination tube assembly 1200 consists of similar architecture as the previously described structural composite tube (e.g., as shown in FIGS. 2 and 3) but does not include the structural composite layer (e.g., does not include element 302 in FIG. 3) and utilizes an inflatable deployable tubular pressure bladder (1202) that is transparent to the wavelengths required to activate the photocuring composite surface (1208). The illumination tube assembly 1200 is located near a photocuring composite surface (1208). Illumination (1206) emitted from the combustion region (1205) of the emissive element irradiates and rigidizes the photocuring composite surface (1208). A deployable reflecting surface (1209) may be used to focus light (1210) onto the surface of the photocuring composite surface (1208).

In some embodiments, the combustion element (1204) may be used for curing a surface other than the cylinder of composite that is concentric to the element (e.g., a composite surface that is entirely separate to the combustion element and the composite tube, e.g., a large flat surface).

In some embodiments, the pneumatic pressure of the illumination tube assembly (1200) can be used to deploy and temporarily support additional structures such as a photocuring composite surface (1208) during the curing and rigidization process. In some embodiments, anchor points (1211) located to various points on the pressure bladder of the illumination tube are attached to supports on the deployable reflecting surface (1209). In some embodiments, anchor points (1211) located to various points on the pressure bladder of the illumination tube are attached to supports on the deployable photo-composite surface (1208). 1207 is the exhaust pressure regulator. 1201 is the gas supply passage.

In some embodiments, the implementation shown in FIG. 12 may be used for space satellite solar sails, instrument booms and trusses, satellite solar panels, satellite telescopes, occulting disks and other optical devices; atmospheric reentry heatshields, support structures for hypersonic, supersonic and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipes, trenchless pipelining; emergency equipment such as: life rafts, boat and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementation shown in FIG. 12 may be used for pipelines, including undersea pipelines, undersea construction, salvage and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications. In some embodiments, the implementation shown in FIG. 12 may be used for illumination for optical signaling. In some embodiments, the implementation shown in FIG. 12 may be used for illumination for emergency situations. In some embodiments, the implementation shown in FIG. 12 may be used for illumination for photolithographic processes. In some embodiments, the implementation shown in FIG. 12 may be used for illumination for construction type settings.

In some embodiments, the implementation shown in FIGS. 7-12 may be deployed in about a fraction of a second, several seconds (e.g., about 1-60 seconds), several minutes (e.g., about 1-60 minutes), several hours (e.g., about 1-5 hours, 3-10 hours, 5-15 hours, 10-24 hours, etc.), or several days (e.g., 1-5 days, 3-10 days, etc.). In some embodiments, the deployment time is fully customizable depending on the particular application or need.

In some embodiments, the transparent tube and the reflector can be reused, while the combustion element (1204) and scaffold (1203) are consumed.

Plurality of Composite or Transparent Non-Structural Tubes for Rigidizing Panels Compared to rigid structures, pneumatically supported structures may have two disadvantages for certain implementations: (1) the fabric in pneumatically supported beams is held in tension only and cannot contribute in compression, therefore, the theoretical bending moment is half that of a rigid beam, (2) pneumatic systems can suffer leaks of which the probability increases with complexity, duration of operation, and external hazards. Rigidizing panels, whether they be flat, simple or compound surfaces, has proven to be a very challenging task in a remote environment away from electrical light sources of sufficient energy and power. With conventional technology, batteries and portable electrical lamps generally cannot be made to contain sufficient energy or power to cure the required amount of photocuring adhesive in the photocomposite.

In some embodiments, a proposed solution is to arrange multiple pneumatically deployed combustion based illumination tubes (e.g., as shown in FIG. 12) adjacent to one or more photocomposite panels such that the illumination generated by the tubes will cure the photocomposite panels. In some embodiments, the pneumatic illumination tubes serve to unfold and deploy the photocomposite panel(s) followed by their emission of photoactive light that rigidizes the photocomposite panel(s). The photocomposite panel can be: (a) open to the environment with pneumatic illumination tubes on one or more sides, or (b) the photocomposite panel(s) can be assembled to surround the illumination tubes while being open to the environment through one or more openings, (c) the photocomposite panel(s) and illumination tube assembly can be arranged to provide a device that is entirely sealed from the outside environment.

Some embodiments discussed herein relate to systems and methods for unfolding and deploying a photocomposite panel and a combustion based light source that can rigidize that panel whether it be a flat, simple curved or compound curved surface. Some embodiments discussed herein relate to (1) using a transparent pneumatic illumination tube with coaxial combustion element to provide illumination to cure a (2) photocomposite panel that is supported nearby in a manner that exposes it to the illumination provided by the illumination tube. Some embodiments discussed herein relate to (3) designing the entire panel surface and mountingplate assembly as a device that is pressure controlled and sealed from the outside atmosphere which allows one or more combustion elements to be supported externally to the pneumatic deployment tube (e.g., as shown in FIG. 13B). In some embodiments, (4) the sealed panel and mountingplate assembly of FIG. 13B may use one or more coaxial combustion element illumination tubes (e.g., as those in FIGS. 12 and 13A). In some embodiments, the sealed panel and mounting plate assembly may also use a combination of one or more illumination tubes as well as one or more pneumatic deployment tube(s) with external combustion element(s). In some embodiments, anchor points (1308A) located at various points on the pressure bladder of the illumination tube are attached to supports on the deployable photo-composite surface (1301A). The photocuring composite material will be attached to some or all of the outer edge of the mounting plate. The mounting plate may have a curved and/or flat profile shape. The photocuring composite material is pulled taught by the mounting plates therefore the fabric will conform to the profile shape of the mounting plate(s). Mounting plates may have similar or different profile shapes.

Figure 13A:
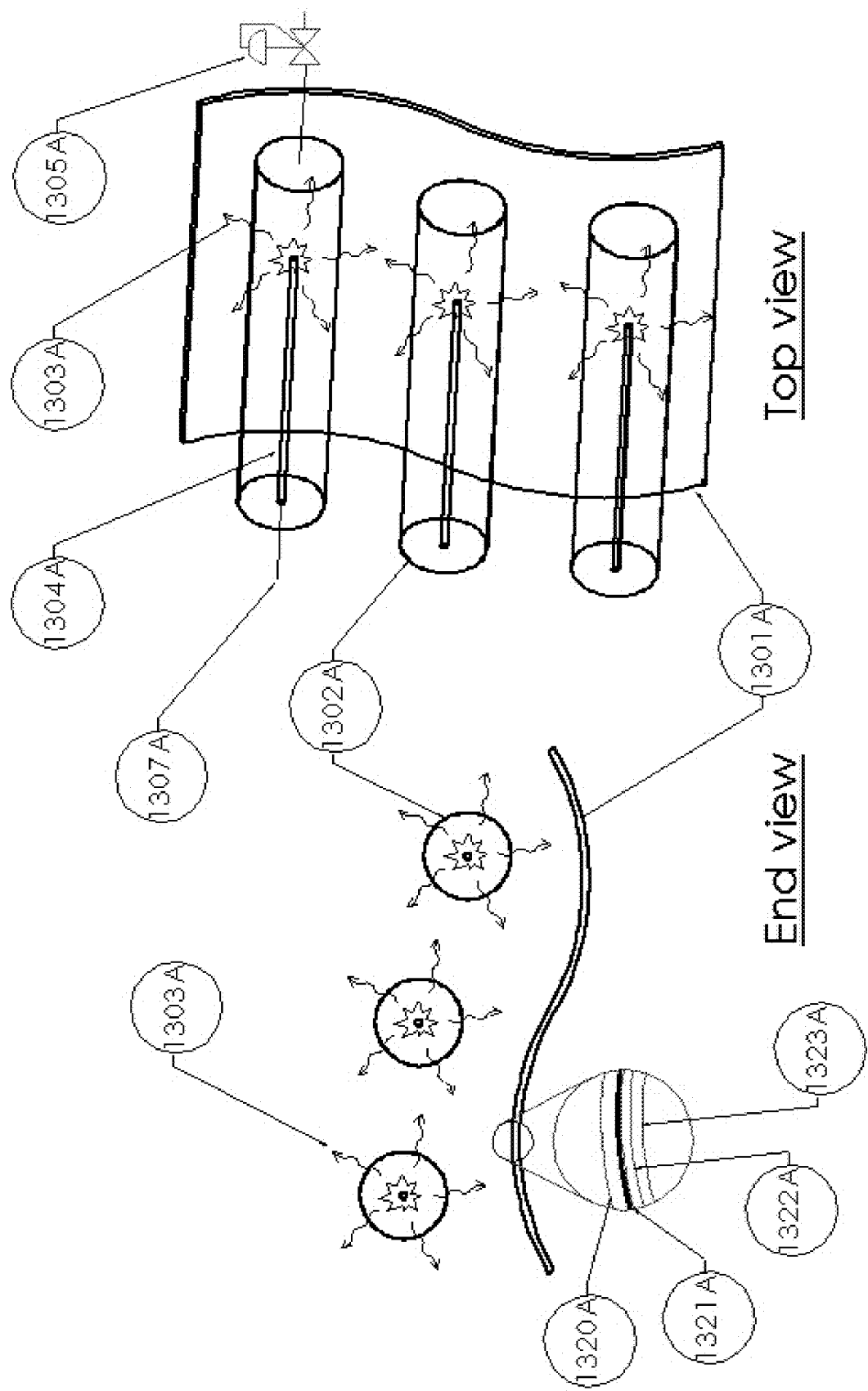
FIG. 13A shows a plurality of transparent combustion tubes illuminating an external photocuring surface, in accordance with some embodiments of the present disclosure.
Figure 13B:
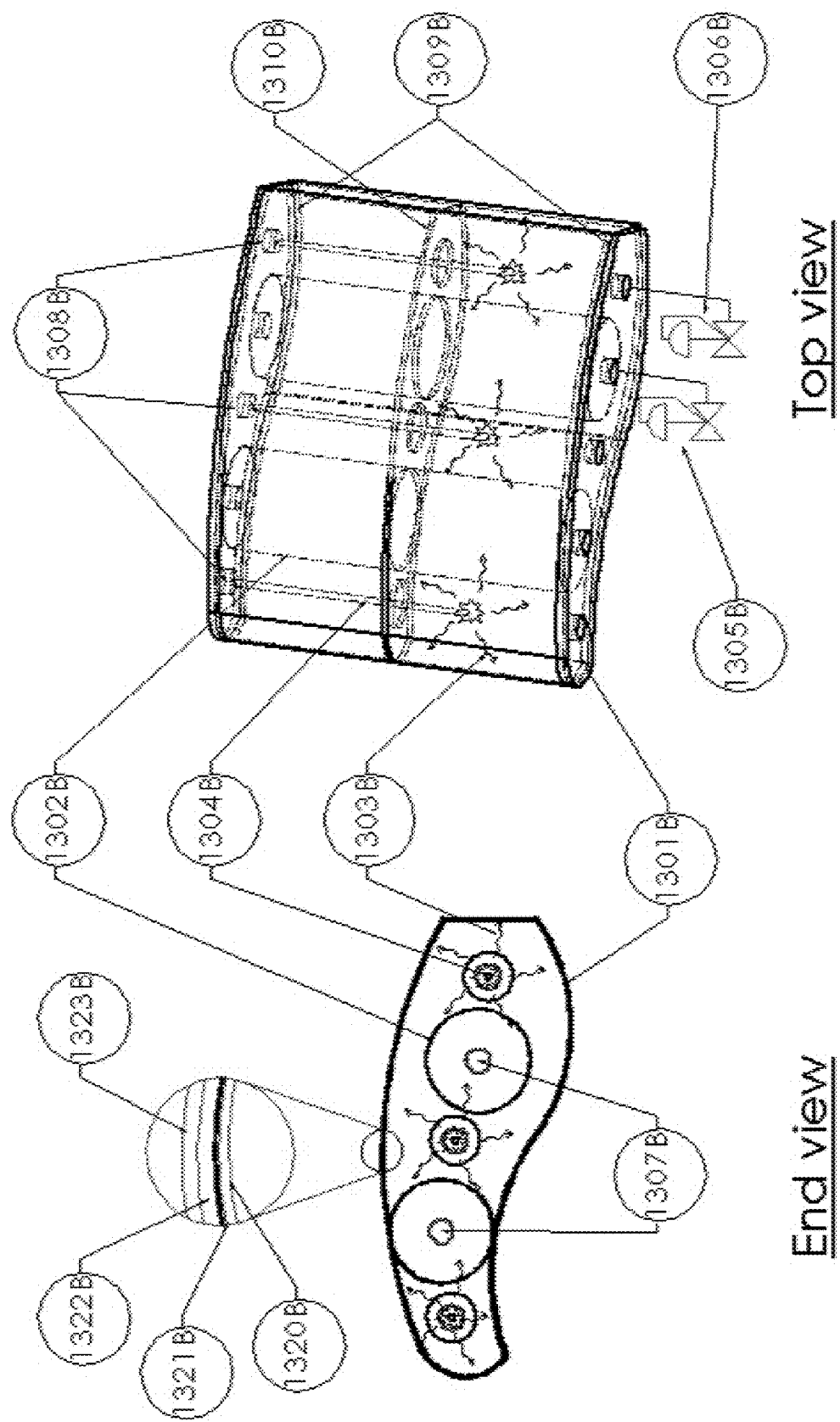
FIG. 13B shows a schematic of a stressed skin type structure, in accordance with some embodiments of the present disclosure.

In some embodiments, multiple illumination tubes can be placed in an array in order to illuminate and rigidize a large flat or curved panel of photocuring composite, for example using the assembly 1300A shown in FIG. 13A.

Referring to FIG. 13A, large and/or complex shaped photocuring composite panel(s) (1301A) are exposed to illumination (1303A) generated by the combustion of the combustion elements (1304A) that are located within one or more transparent illumination tubes (1302A). In some embodiments, each illumination tube (1302A) does not include a photopolymer and light resistant layer (e.g., some of the tubes include a photopolymer and light resistant layer and some do not). In some embodiments, each illumination tube (1302A) includes a photopolymer and light resistant layer. In some embodiments, each illumination tube (1302A) is a thin pressure bladder tube with a combustion element (1307A) and a support within it. In some embodiments, the pressure bladder of the illumination tube is filled with inert gas through an inlet (1307A). In some embodiments, the pressure of the gas exhausting from the pressure bladder (1302A) is regulated by a gas pressure regulator (1305A). In some embodiments, each illumination tube (1302A) is identical. In some embodiments, one or more illumination tube (s) (1302A) is different from one or more other illumination tube(s) (1302A). In some embodiments, the photocuring composite panel(s) have an external light blocking film (1323A) in order to block external light from curing the photocuring composite material. In some embodiments, the photocuring composite panel or panels have an internal polymer film (1320A) in order to prevent the uncured photocomposite material from adhering to other components in the assembly when tightly packed in its stowed configuration. In some embodiments, the photocuring panel(s) have an external polymer film (1322A) functioning as a constraint layer in order to prevent the pneumatically inflated photocuring composite panel from overexpanding due to the lack of structural stiffness caused by the fabric (1321A) not yet being rigidized. In some embodiments the constraint layer may consist of one or more of: Polyimide, polyamide, polyester, polyethylene, Teflon, silicone.

In some embodiments, the implementation shown in FIG. 13A may be used for space satellite solar sails, instrument booms and trusses, satellite solar panels, satellite telescopes, occulting disks and other optical devices; atmospheric reentry heatshields, support structures for hypersonic, supersonic and subsonic parachutes and "ballutes"; booms for servicing existing space satellites, aerobraking surfaces for the deorbiting of retired space satellites, aerodynamic devices such as wings, fins, spoilers and aerobraking surfaces for rocket booster, satellite, and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill piping, trenchless pipelining; emergency equipment such as: life rafts, boat and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementations shown in FIG. 13A may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the transparent illumination tubes and reflector(s) can be reused.

Structural Skin with Combustion Elements External to Pneumatic Inflation Tube(s)

Deployable panel type structures that contain sharp inside edges such as aircraft wings, helicopter rotors, missile and rocket fins and submersible hydrofoils can be effectively rigidized using specialized combustion element architecture using a variation of the techniques shown in FIGS. 12 and 13A. In some embodiments, a variation of the illumination tube assembly 1200 described in connection with FIG. 12 that uses multiple illumination tubes as described in connection with FIG. 13A is a combination of photocomposite panel shapes, pneumatic deployment tube(s), and combustion element(s) assembled into a sealed unit. This sealed unit (1300B) is different from the assemblies shown in FIGS. 12 and 13A in that the combustion element is placed alongside the transparent pneumatic tube, e.g., as opposed to being placed inside the transparent tube. In some embodiments, separating the combustion element from the cylindrical pneumatic tube allows the combustion element to be placed deeper into the inside corner, thus increasing the local intensity of illumination. Due to the low thermal mass and low melting point of the thin polymer envelope of an illumination tube, its radius cannot be made small enough to fit in narrow inside corners without thermal damage from the adjacent flame region of the combustion element. The thermal mass of the thicker photocomposite is significantly higher than that of the thin polymer inflation envelope and suited for the transient thermal peaks of the adjacent combustion region. In order to exhaust the thermal and particulate combustion byproducts generated by the combustion element, the overall photocomposite assembly is closed to the outside environment and flushed with inert gas in a manner similar to that which occurs within the illumination tube assembly of FIG. 12. The photocomposite material is fastened around the perimeter of thin rigid mounting plates which are shaped to the cross-sectional profile of the final rigidized shape. Fluid inflated deployment tubes inflate and push the mountingplates apart, thus deploying the photocomposite material to its fully expanded shape after which the combustion element(s) is/are ignited while inert gas flushes through the interior of the sealed device. The mounting plates may be pushed apart with non cylindrical shaped deployment such as bellows, spheres, balloons or any other inflated volume that exerts a force to press the mounting plates apart.

Referring to FIG. 13B, in some embodiments, a photocuring composite surface can be cured when illuminated by one or more combustion elements. In contrast to the assembly shown in FIG. 13A, the combustion elements of assembly shown in FIG. 13B are external to the transparent inflation tubes. The assembly 1300B may be an envelope that is closed to the outside environment in the same manner as the tubular assembly in FIG. 1. Assembly 1300B includes a photocomposite outer skin (1301B) that is bonded to the perimeter of rigid side mounting plates (1309B) and may also include the perimeter of one or more rigid intermediate mounting plates (1310B). The side mounting plates (1309B) and intermediate mounting plates (1310B) may be shaped to a profile that the final deployed assembly (1300B) will maintain. The flat surfaces of the side mounting plates (1309B) may be attached to each end of the inflation tubes (1302B). Upon deployment, the inflation tubes are inflated with a gas entering through the inlet ports (1307B) which pneumatically forces the side mounting plates (1309B) and intermediate mounting plates (1310B) apart thus stretching and pulling taught the photocomposite outer skin (1301B). In some embodiments, inflation pressure may be regulated by exhausting inflation gas through exit ports into a pressure regulation device (1305B). One or more combustion elements (1304B) may be ignited and may generate the illumination (1303B) required to cure the photocomposite skin (1301B). In some embodiments, inert gas will enter inlet ports (1308B) in order to flush away the thermal and chemical byproducts of combustion. In some embodiments, the byproducts may exit the assembly via exit ports. In some embodiments, if needed the exhaust byproducts flowing through exit ports may be pressure regulated (1306B).

In some embodiments the combustion elements (1304B) will be internal to the pneumatic inflation tube (1302B) similarly to the illumination tube assembly shown in FIG. 13A.

In some embodiments, the photocuring panel(s) have an internal polymer film (13B20) in order to prevent the uncured photocomposite material from adhering to other components in the assembly when tightly packed in its stowed configuration. In some embodiments, the photocuring panel(s) have an external polymer film (1322B) functioning as a constraint layer in order to prevent the pneumatically inflated photocomposite panel from overexpanding due to the lack of structural stiffness caused by the fabric (1321B) not yet being rigidized. In some embodiments, the photocuring panel(s) have an external light-blocking film (1323B) in order to block external light from curing the photocomposite material. In some embodiments, the photocuring composite panel or panels have an internal polymer film (1320A) in order to prevent the uncured photocomposite material from adhering to other components in the assembly when tightly packed in its stowed configuration.

In some embodiments, the implementations shown in FIG. 13B may be used for space satellite solar sails, instrument booms and trusses, satellite solar panels, satellite telescopes, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite, and cargo return to earth or other planetary bodies; kinetic energy absorbing "crush tubes", structures for meteor/asteroid harnessing, manipulation, and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application(s) where the structure will be deployed within a liquid environment. In some embodiments, the implementation shown in FIG. 13B may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the implementations shown in FIGS. 13A and 13B may be deployed in about a fraction of a second, several seconds (e.g., about 1-60 seconds), several minutes (e.g., about 1-60 minutes), several hours (e.g., about 1-5 hours, 3-10 hours, 5-15 hours, 10-24 hours, etc.), or several days (e.g., 1-5 days, 3-10 days, etc.). In some embodiments, the deployment time is fully customizable depending on the particular application or need.

Composite Tube Deployed Via Liquid Inflation.

In some embodiments, deploying a tube or other sealed fabric shape using water or other non-combustible fluids as the filling medium is intended for use of the structure in submerged environments. Conventional systems disclose inflating tubes or other sealed fabric shapes with compressed gas, generated gas, or gas bubble filled foam. This is generally not sufficient when deploying in an environment of high ambient pressure such as under deep water. The higher density of water for every 10 m of water depth results in an ambient pressure increase of 1 atmosphere. Therefore, the inflation pressure required to overcome the ambient pressure and expand the structure is significantly higher than in atmospheric or space vacuum conditions. Further, the additional required volume and pressure of inflation gas and the mass of associated storage volume can easily become prohibitive at great depths (e.g., deep sea). In some embodiments, this can be solved by using a liquid pump to inflate the fabric volume by forcing ambient water (or other suitable liquid) through an optional filter into the interior of the sealed fabric volume. In some embodiments, the pumped water will inflate and deploy the fabric volume. In some embodiments, a waterproof combustion element and ignitor are provided to combust in the high pressure environment.

Figure 14:
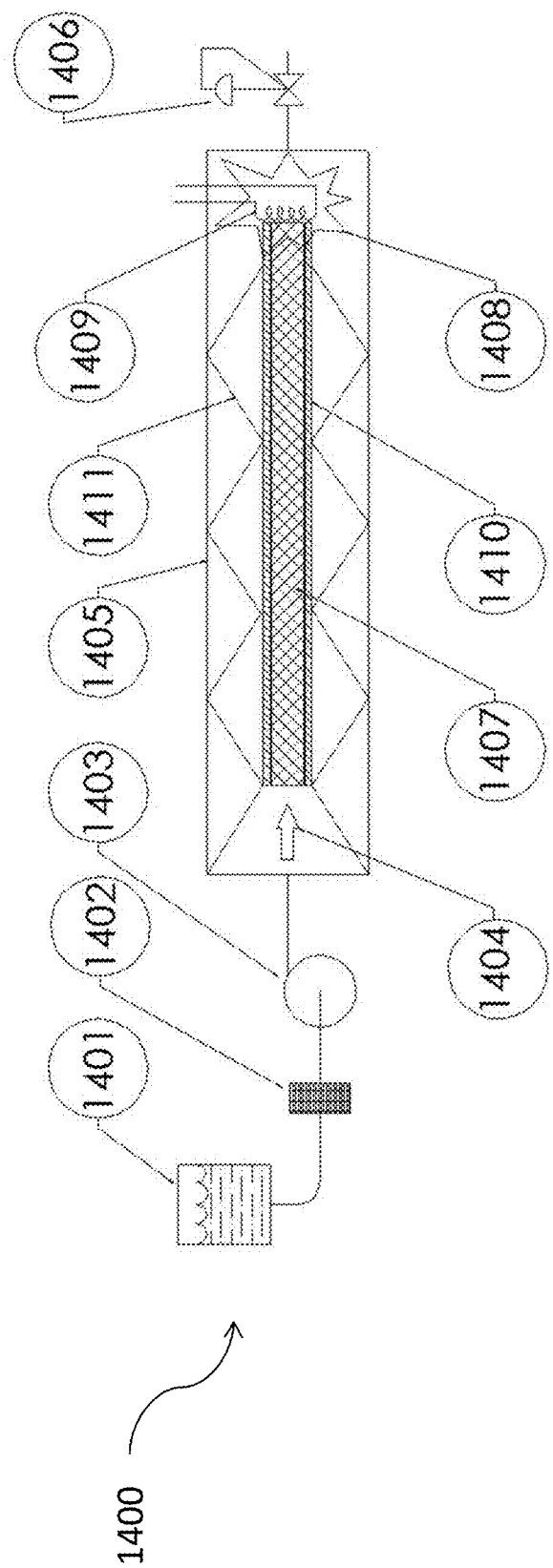
FIG. 14 shows a schematic of a liquid inflation of a composite/illumination tube, in accordance with some embodiments of the present disclosure.

FIG. 14 shows a schematic 1400 of a composite/illumination tube assembly, in accordance with some embodiments of the present disclosure. In some embodiments, a composite tube can be inflated and deployed with a liquid such as water, rather than a gas as described in some embodiments. This allows deployment and rigidization at high ambient pressures of, e.g., about 1, 10, 100 or 1000 atmospheres such as under deep water. Deployment with a liquid can be used with any of the embodiments described in this application. In some embodiments, the combustion element will use solid or gaseous oxidizer and is coated with a waterproof coating which prevents the ingress of water or other liquids into the combustion element. Illumination produced by the combustion element transmitted through a liquid such as water can cure an adjacent photopolymer composite.

The assembly 1400 in FIG. 14 includes a liquid intake and an optional inflation liquid reservoir (1401). Optionally, the reservoir 1402 may be replaced with (or supplemented by) a filter (1402) to scrub ambient water (e.g., any ambient water, salinized or non-salinized) of light blocking particulates. The liquid may be pumped into the composite tube (1405) through a passage (1404) with an electrically or mechanically driven pump (1403). Fluid may be pumped into the interior of the folded composite tube (1405). The combustion element (1407) is supported by and located proximate a deployable scaffold (1411). The combustion element (1407) may be ignited with one or more liquid resistant initiators activated by electrical, chemical, or mechanical means (1409). The combustion element may be sheathed in a coating (1410) that provides impermeability to the liquid medium being used to inflate the tube. The coating (1410) may also provide thermal insulation for the combustion element. Byproducts from the combustion region (1408) may be mixed with inflation liquid (1404) as it exits the composite tube (1405) via a pressure regulator (1406).

In some embodiments, the implementation shown in FIG. 14 may be used for kinetic energy absorbing "crush tubes", construction applications such as: scaffolding, concrete forms, drill bore casing, drill pipe, emergency equipment such as: boat and submarine hull breach repair, emergency medical splints, medical implants for spinal, skeletal, and soft tissue support; water, gas, oil, and sanitary piping, underwater applications or any application where the structure will be deployed within a liquid environment. In some embodiments, the implementation shown in FIG. 14 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers; shielding from projectiles and high velocity debris, high energy radiation or particles, propellers, fuselages, hydrofoils, rotors, and other suitable applications.

In some embodiments, the pump, filtering, and plumbing shown in FIG. 14 can be reused.

Cured or Partially Cured Photopolymer Layer Functioning as Internal Pressure Bladder and/or Outer Protective Layer Some prior art systems require that the adhesive coated fabrics used in inflatable rigidizable structures be sandwiched within layers of polymer films for multiple reasons. First, an inflatable fabric structure generally requires a gas impermeable inflation bladder to accumulate the inflation gases and expand outwards forcing the fabric into its fully deployed configuration; second, an inflatable rigidizable fabric structure generally requires an outer film to prevent the wet adhesive fabric from sticking together when pressed together during its tightly stowed configuration which can lead to very difficult inflation deployment; and third, adhesive soaked fabric is generally difficult to handle in a manufacturing environment as the uncured adhesive is prone to sticking to assembly surfaces, gloves of workers, tools, molds and any other equipment that the cloth may come into contact with. The uncured fabric can be structurally very weak and these mishaps can stretch, distort and tear the fabric rendering it unsuitable for use.

Drawbacks to these separate films can be that the polymer film has different optical properties than the underlying light activated adhesive and can absorb/block some of the light intended to be absorbed by the photoinitiators in the adhesive. In addition, conforming flat films to shapes with complex curves can be exceptionally difficult or impossible without significant creasing and trapped air bubbles between the film and the photopolymer. Creasing and trapped air bubbles may cause numerous reflective and refractive optical impediments to the limited light generated with a combustion process. The curing of some photocuring adhesives such as acrylics may be hindered by the presence of oxygen which is another reason to reduce trapped air. Further, the constraining behavior of well fitted sandwiching layers generally provides necessary stability and shape control to the photocomposite layer between the deployment and curing stages.

In some embodiments, it is proposed to cure a thin layer of the photopolymer adhesive such that it hardens to a "skin" on the top surface. In some embodiments, this may be done in the manufacturing environment with conventional electric curing lamp technology in which the intensity and total radiant energy is tightly controlled. In some embodiments, the skin's thickness would be on the order of the separate polyfilm that it is replacing (e.g., between about 0.1 mm to about 10 mm). In some embodiments, the skin thickness may be thin enough to be flexible and the depth of cure would not encapsulate any fibers in a manner that prevents the fabric from flexing easily. In some embodiments, the skin is thick and tough enough to allow handling and assembly without damaging the skin.

In some embodiments, the top surface of a photopolymer typically cures first when it is struck by energetic photons. Under additional photon radiation, this zone of curing travels from the outside surface towards the center of the photopolymer. In some embodiments, by carefully controlling this curing process, a thin cured photopolymer layer can be deposited on top of an uncured liquid photopolymer substrate. In some embodiments, this cured layer can be substituted for separate optically transparent polymer films.

As shown in FIG. 3 above, the inner and outer surfaces of the photopolymer structural composite (302) are covered with a separate polymer film (301 and 303 in FIG. 3) to function as an internal inflation bladder and to protect the uncured surface from damage through handling, storage and harsh environments in use. In some embodiments, by eliminating the polymer films (e.g., by eliminating elements 301 and 303 in FIG. 3) that sandwich the composite material in the implementation shown in FIG. 3, the overall design can be simplified and optical transmission can be increased. In some embodiments, the cured photopolymer layer is not intended to function as an exterior light blocking layer. Instead, that protection may be provided by a separate polymer layer or a metalized coating.

Figure 15:
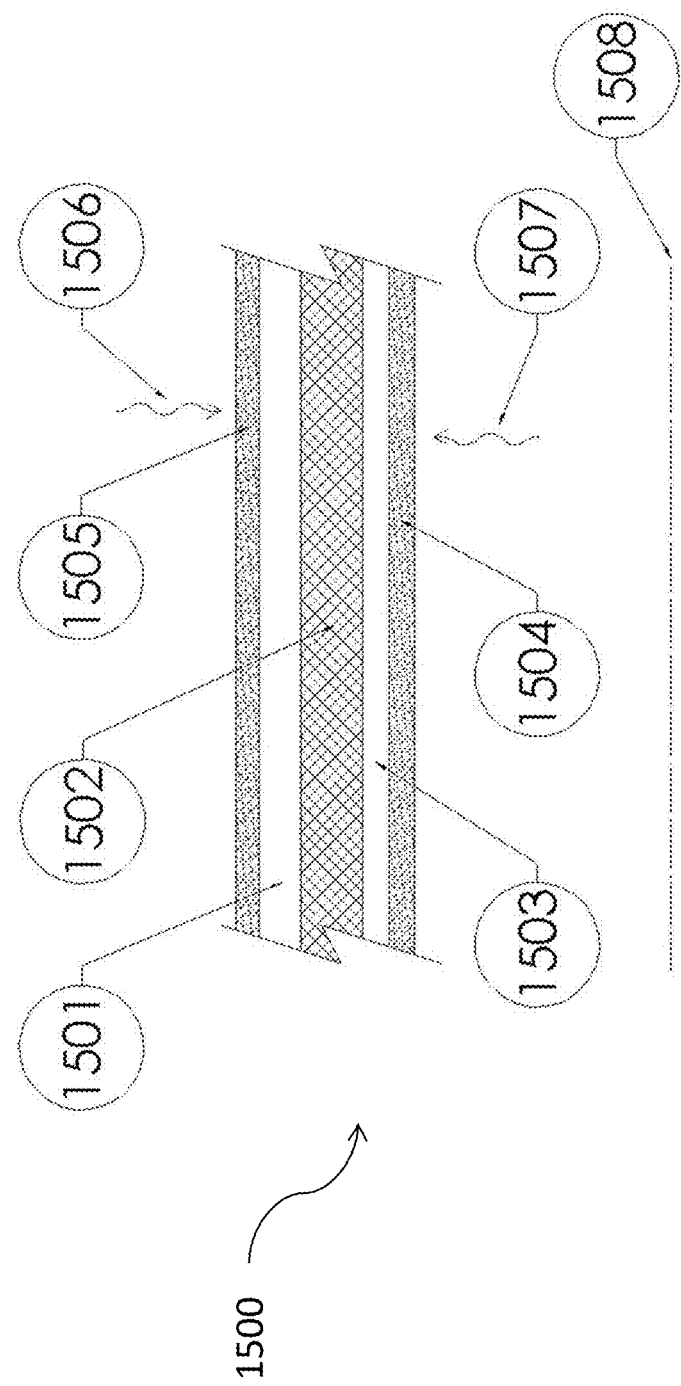
FIG. 15 shows a schematic of a pre-cured photopolymer membrane, in accordance with some embodiments of the present disclosure.

FIG. 15 shows a pre-cured photopolymer membrane 1500, in accordance with some embodiments described herein. In some embodiments, the deployable composite tube eliminates the separate pressure membrane used as an inflation bladder (e.g., eliminates element 301 in FIG. 3). In some embodiments, a film of fully or partially cured photopolymer adhesive (1501) is used instead of the inflation bladder (e.g., instead of element 301 in FIG. 3). The existing layer of photopolymer adhesive (1501 and 1503) surrounding the structural fiber (1502) is exposed to UV, visible, or another type of photoactive radiation (1507 and 1506) either from a pulsed or from a continuous light source in quantities that are sufficient to cure a thin portion of the adhesive layer (1504 and 1505) closest to the light source (1507 and 1506). The curing process is intended to cure the exposed layer enough to form a thin flexible and gas permeable membrane while leaving the underlying photopolymer adhesive in liquid form (1503 and 1501) surrounding the structural fibers (1502) without curing enough to stiffen the structure beyond its ability to be tightly folded into its compact form.

In some embodiments, this partial curing process can be used to produce a thin solid exterior layer (1505) in order to eliminate the separate outer polymer film (e.g., layer 303 in FIG. 3) that is required for protecting the uncured photopolymer liquid from the surrounding environment. As described above, in some embodiments, the curing process is intended to cure the exposed layer enough to form a thin, flexible, easily handled/non-tacky and gas permeable membrane while leaving the underlying adhesive surrounding the structural fibers without enough cure to stiffen the structure beyond its ability to be easily folded into a very tight configuration without kinking or stretching the composite.

In some embodiments, the implementation shown in FIG. 15 may be used for space satellite solar sails, instrument booms and trusses, satellite solar panels, satellite telescopes, occulting disks and other optical devices; atmospheric reentry heatshields, support structures for hypersonic, supersonic and subsonic parachutes and "ballutes"; booms for servicing existing space satellites, aerobraking surfaces for the deorbiting of retired space satellites, aerodynamic devices such as wings, fins, spoilers and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil and sanitary piping, towers, underwater applications or any application where the structure will be deployed within a liquid environment. In some embodiments, the implementation shown in FIG. 15 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

Manufacture/assembly: The interior gas impermeable surface "skin" (1504) can be manufactured by traversing a light source such as a flash tube or continuous wave lamp along the center axis (1508) of the assembly 1500. The radiated light exposure can be controlled by adjusting the flash pulse intensity and duration or by varying the linear traverse speed of the continuous wave lamp. The outer surface "skin" (1505) can be manufactured in a similar fashion as the inner surface but may use a ring shaped light source that is scanned along the outer surface or an array of lamps statically arranged around the outer surface.

Metal Powder Based Combustion Element

Figure 16:
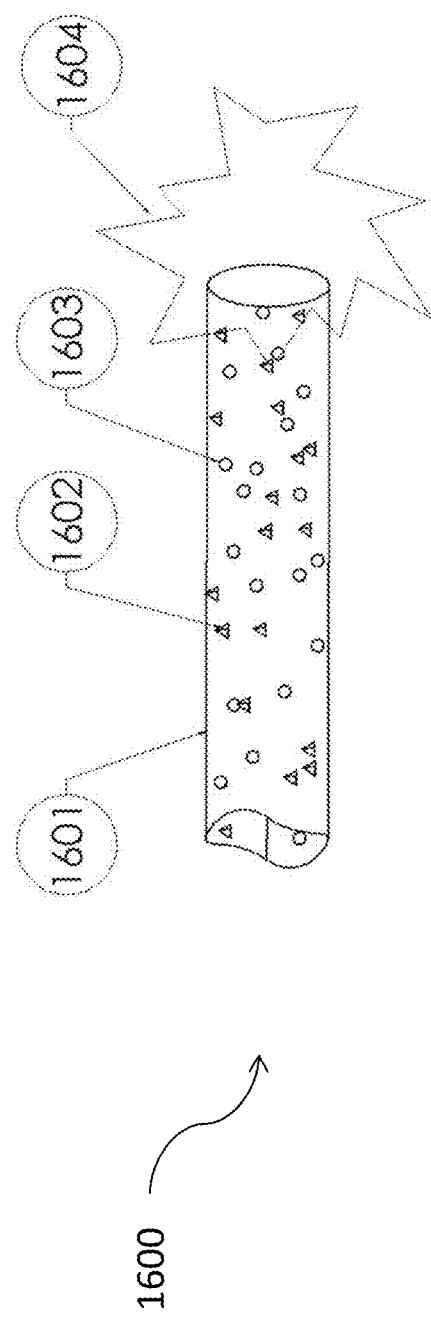
FIG. 16 shows a flexible element embedded with solid fuel and solid oxidizer particles, in accordance with some embodiments of the present disclosure.

Referring to FIG. 16, a flexible combustion element (1600) embedded with discrete solid fuel and solid oxidizer particles is shown. The flexible combustion element (1600) can include powdered combustible metals including, but not limited to, magnesium, aluminum, iron, zirconium, titanium, lithium, sodium, potassium, etc., and any combination thereof, either in pure or alloy form (1603 in FIG. 16). The combustible powder is encapsulated within a flexible polymer resin binder (1601). The flexible combustion element (1600) is a linear device that travels the length of the composite material. A powdered solid oxidizer including, but not limited to, sodium or potassium perchlorate, sodium or potassium chlorate, ammonium perchlorate, sodium or potassium nitrate and any combination thereof (1602) may also be mixed into the flexible resin binder (1601) such that the fuel has sufficient oxidizer for complete combustion. The flexible resin binder (1601) will be consumed in the combustion reaction (1604). In some embodiments, the metal powder is dispersed within the flexible resin binder (1601) network.

In some embodiments, the implementation shown in FIG. 16 may be used for space satellite solar sails, instrument booms and trusses, satellite solar panels, satellite telescopes, occulting disks and other optical devices; atmospheric reentry heatshields, support structures for hypersonic, supersonic and subsonic parachutes and "ballutes"; booms for servicing existing space satellites, aerobraking surfaces for the deorbiting of retired space satellites, aerodynamic devices such as wings, fins, spoilers and aerobraking surfaces for rocket booster, satellite and cargo return to earth or other planetary bodies; kinetic energy absorbing "crush tubes", structures for meteor/asteroid harnessing, manipulation, and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementation shown in FIG. 16 may be used for pipelines, including undersea pipelines, undersea construction, salvage and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

Manufacture/assembly: The combustion element shown in FIG. 16 may be manufactured by mixing the powdered/granular combustible metal particles (1603) with powdered/granular oxidizer particles (1602) into a slurry of liquefied polymer matrix. In some embodiments, the matrix may include: asphalt, phenolic resin, polystyrene, synthetic rubbers, urea-aldehydes, and/or vinyl polymers. A solvent such as alcohol, ether, or acetone may be added to improve flow characteristics. The fuel, oxidizer, polymer, and solvents are mixed with an industrial mixer. The mixture is then cast or extruded into the long element shape as shown in FIG. 16. A drying process is then used to remove any solvents.

Figure 17:
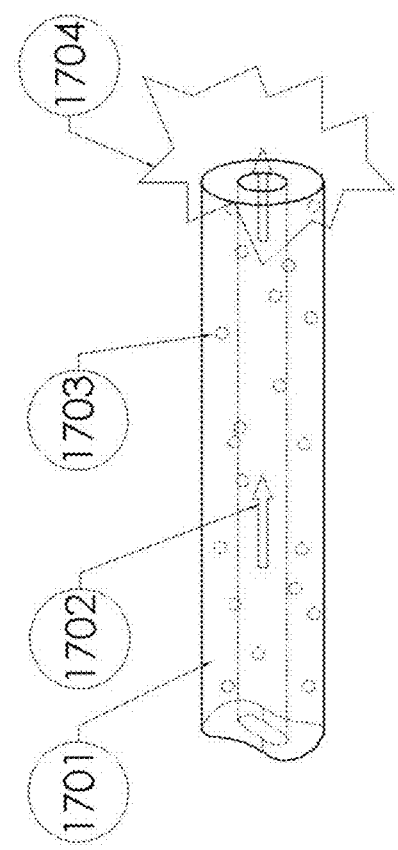
FIG. 17 shows a flexible element embedded with solid fuel particles with passage for gaseous oxidizer, in accordance with some embodiments of the present disclosure.

Referring now to FIG. 17, a schematic of an assembly 1700 for a flexible polymer resin element embedded with solid fuel particles with passage(s) for gaseous oxidizer is shown. In some embodiments, the flexible polymer resin element (1701) can be formed with one or more hollow internal fluid carrying channel(s) (1702) such that a gaseous oxidizer stored elsewhere (e.g., externally to the flexible polymer resin element 1701) can travel through those channel(s) (1702) to be introduced to the metal powder (1703) near and in the combustion region (1704) in a manner that allows for sufficiently complete combustion (e.g., sufficient combustion to release enough light to cure the photocomposite) of the metal particles and the flexible polymer resin element (1701).

In some embodiments, the implementation shown in FIG. 17 may be used for space satellite solar sails, instrument booms and trusses, satellite solar panels, satellite telescopes, occulting disks, and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite, and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil and sanitary piping, towers, underwater applications or any application where the structure will be deployed within a liquid environment. In some embodiments, the implementation shown in FIG. 17 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

Gaseous Fuel Based Combustion Element

Figure 18:
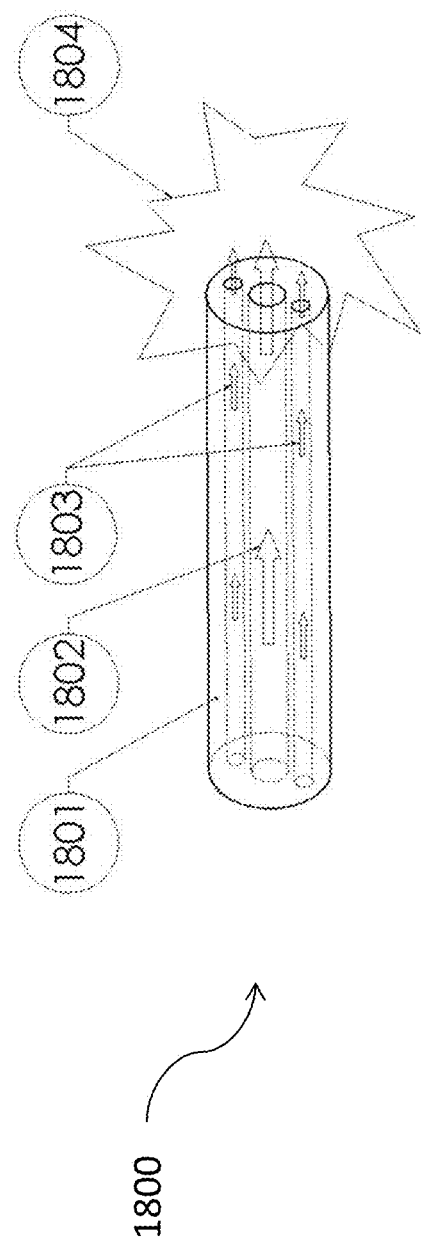
FIG. 18 shows a flexible element with passages for gaseous fuel and gaseous oxidizer, in accordance with some embodiments of the present disclosure.

Referring now to FIG. 18, a schematic of an assembly 1800 for a flexible element 1801 embedded with passage(s) for gaseous fuel and gaseous oxidizer is shown. In some embodiments, e.g., as shown in FIG. 18, photochemically active illumination is generated using combustion of gaseous fuel with a gaseous oxidizer. A flexible combustion element assembly 1800 that functions to mix a gaseous fuel including, but not limited to, hydrogen, acetylene, methane, propane, butane, ethylene or propylene with an oxidizer that is in gaseous form is shown in FIG. 18. The flexible combustion element assembly 1800 may include a flexible tubular device (1801) that includes one or more internal fluid carrying channels which serve to separately duct the gaseous fuel and oxidizer to the region of combustion (1804). The combustion region (1804) is located where the ejected gaseous fuel (1802) and gaseous oxidizer (1803) are sufficiently mixed to allow for adequate combustion. The flexible tubular device (1801) may be made of a polymer material that is consumed during combustion at a predetermined linear rate. In some embodiments, this allows the combustion region (1804) to progressively travel along the flexible tubular device (1801) at the rate needed for effective exposure of the adjacent photopolymer to the combustion generated illumination.

Figure 19:
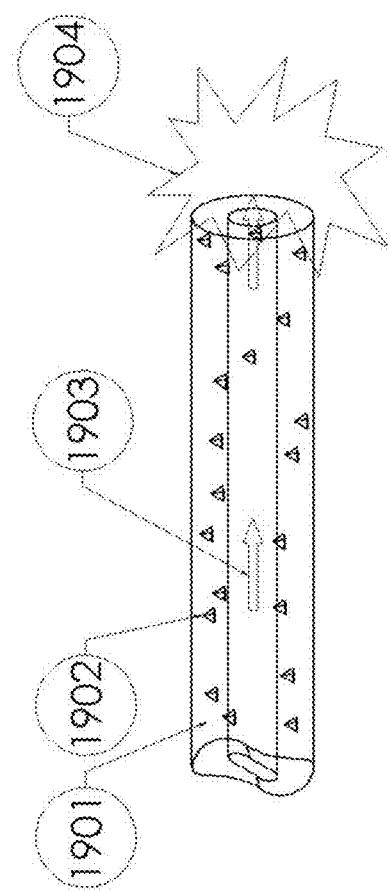
FIG. 19 shows a flexible element embedded with solid oxidizer particles and including one or more channels for gaseous fuel, in accordance with some embodiments of the present disclosure.
Figure 19:
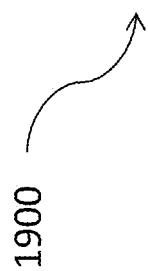

Referring now to FIG. 19, a schematic of an assembly 1900 for a flexible element 1901 embedded with solid oxidizer particles and including one or more channels for gaseous fuel is shown. In some embodiments, e.g., as shown in FIG. 19, photochemically active illumination is generated using combustion of gaseous fuel with a solid oxidizer. In another variation, the flexible element (1901) contains one or more fluid carrying channels (manufactured, e.g., by extrusion) that duct gaseous fuel (1903) to the region of combustion (1904). In some embodiments, the one or more fluid carrying channels is/are extruded. In some embodiments, the number of fluid carrying channels is determined based on a particular application. In some embodiments, the flexible element (1901) is made of a polymer resin, which encapsulates solid particles of oxidizer (1902), which are introduced to the combustion region (1904) as the polymer decomposes during combustion.

In some embodiments, the implementation shown in FIG. 19 may be used for space satellite solar sails, instrument booms and trusses, satellite solar panels, satellite telescope, occulting disks and other optical devices; atmospheric reentry heatshields, support structures for hypersonic, supersonic and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementation shown in FIGS. 18 and 19 may be used for pipelines, including undersea pipelines, undersea construction, salvage and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

In some embodiments, the compressed gas bottle (as shown, e.g., in FIGS. 1 and 7-8), valving (as shown, e.g., in FIGS. 1 and 7-8), and plumbing (as shown, e.g., in FIGS. 1 and 7-8) may be used with the implementation shown in FIGS. 17-19 and can also be reused.

Manufacture/assembly: In some embodiments, the combustion element shown in FIGS. 17-19 may be manufactured by mixing the powdered/granular combustible metal particles into a slurry of liquefied polymer matrix. In some embodiments, the matrix may include: asphalt, phenolic resin, polystyrene, synthetic rubbers, urea-aldehydes and/or vinyl polymers. A solvent such as alcohol, ether or acetone may be added to improve flow characteristics. The fuel, polymer, and solvents are mixed with an industrial mixer. The mixture is then extruded into the long element shape. A drying process is then used to remove any solvents.

Directionally Selective Curing

Figure 20A:
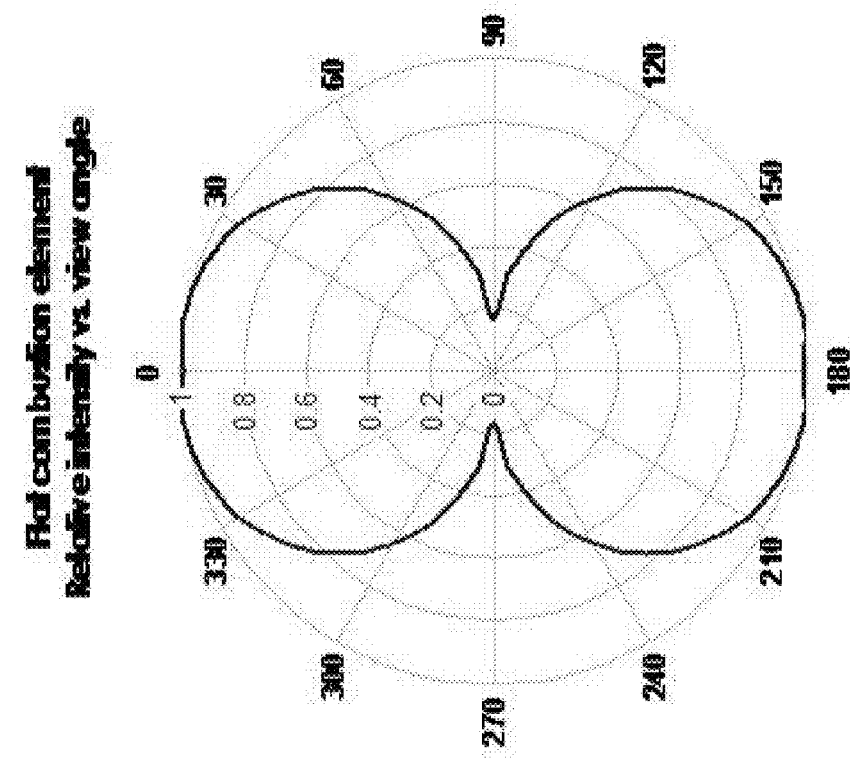
FIGS. 20A-20B show a plot of emission intensity versus angle for a flat combustion element, in accordance with some embodiments of the present disclosure.
Figure 20A:
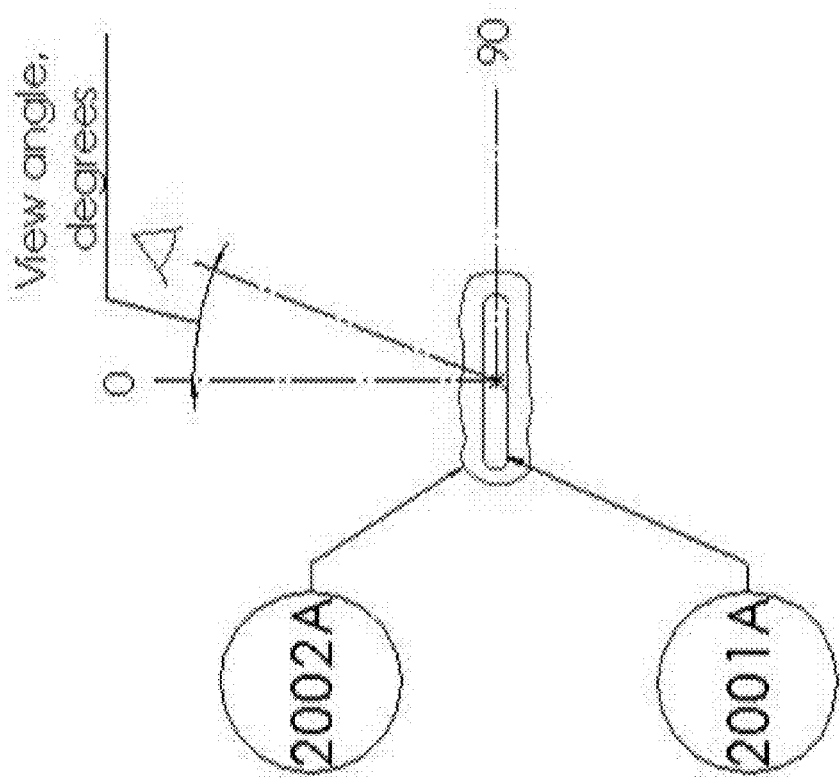
Figure 20B:
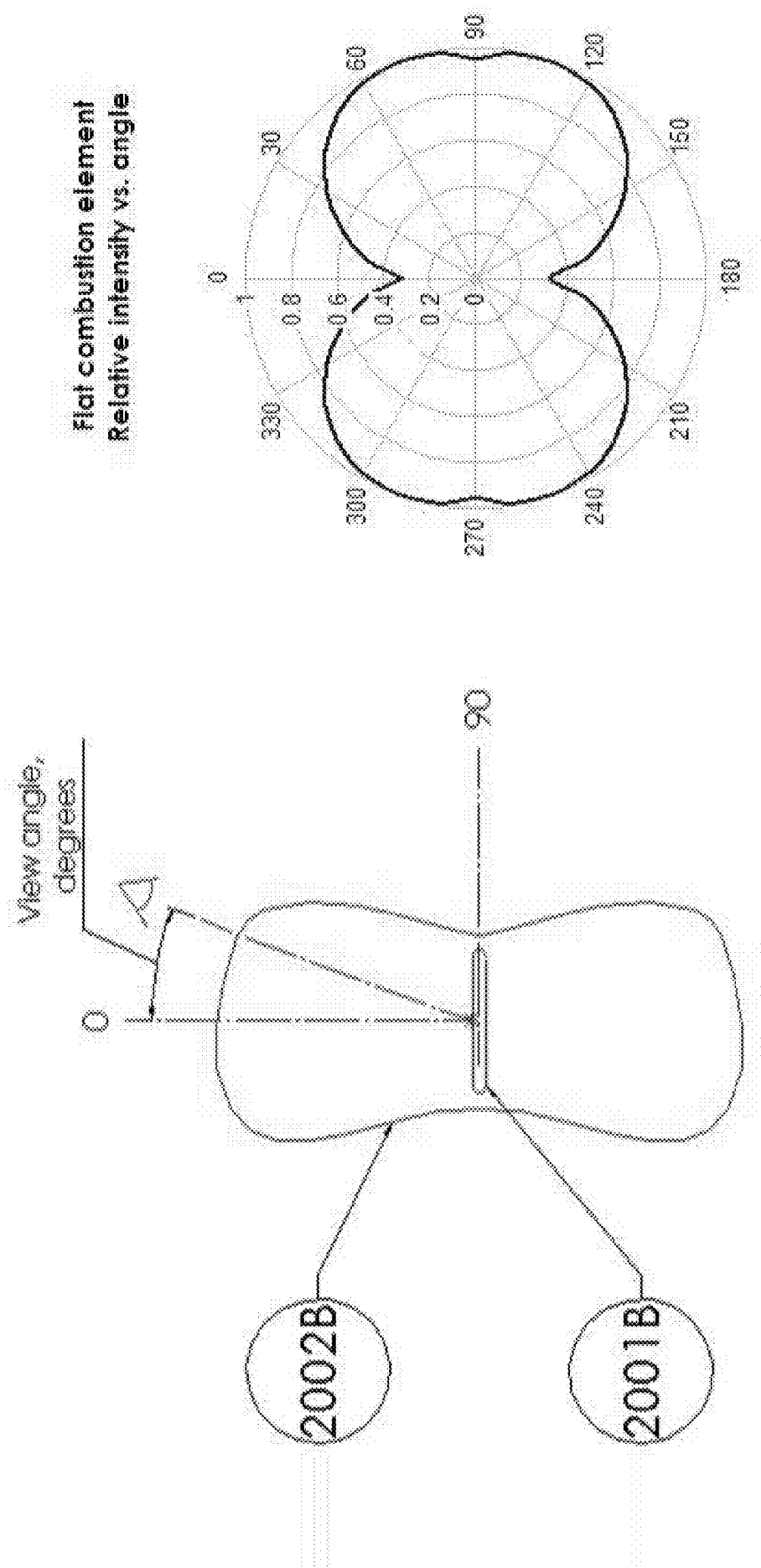

In some embodiments, structural photocomposite beams may be circular in cross-section. In some embodiments, structural beams can be non-uniform in cross-section, e.g., in order to support certain loading scenarios more optimally than a uniform cylinder can. For example, an I-beam, elliptical or oval sectioned beam may be ideal for certain applications, for example, for supporting loading forces from a single direction rather than from many directions. A deployable I-beam, elliptical or oval sectioned beam can be realized with a variation of the deployable circular beam design. In some embodiments, the light intensity (2002A and 2002B) emitting from a flat combustion element (2001A and 2001B) varies based on the position of the angle around its center axis (e.g. as shown, for example, in FIG. 20A). The intensity is highest when viewed perpendicularly to its flat surface (0 and 180 degrees in FIG. 20A) and the intensity is lowest when viewing it along its edge (90 and 270 degrees in FIG. 20A). In some embodiments the flat combustion element can be tailored to create a flame that protrudes perpendicularly from its surface. In some embodiments the flame may extend about 2×, about 5×, about 10× the width of the combustion element. This phenomenon results in a reversal to the intensity with respect to the viewing angle where light intensity is highest at 90 and 270 degrees and lowest at 0 and 180 degrees (FIG. 20B).

By taking advantage of this variability in intensity, in some embodiments, a photocuring composite beam in the shape of a modified I-beam, ellipse, or oval can be cured using less combustible (or consumable) material than when using a combustion element having a round cross-section.

The inside circumferential surface of a circular cross-sectioned deployable tube surrounding a combustion element located along its center axis is subjected to uniform light intensity since the entirety of its inside surface is equidistant to the combustion element.

A non-circular deployable photo curing structural composite beam or panel such as an I-beam or C-channel has surfaces that vary both in distance from combustion element and angle from perpendicular to the light rays being emitted from the combustion element. In the case of a cylindrical combustion element, which generates illumination with equal intensity at all angles from its axis, this arrangement results in portions of the beam surface that receive greater light intensity than necessary for curing and portions of the beam surface that receive less light intensity than necessary for curing. Simply increasing the light intensity to cure the most distant portions of beam surface can result in overheating of the beam material nearest the combustion element. Therefore, a combustion element that can generate a non-uniform angular emission profile (variation of light intensity with respect to angle) is more optimal.

A combustion element with a flat cross-section will project higher light intensity across its widest area of combustion and lower intensity across its narrowest area of combustion. This angular emission profile can be represented by the bidirectional polar pattern (FIGS. 20A & 20B). By orienting the angle of the element such that its widest combustion area faces the most distant composite surfaces, and its narrowest combustion area faces the nearest composite surfaces, the curing requirements of the composite can be more closely matched to the emission of the combustion element. This will minimize the overheating of nearby surfaces or under-curing of distant, angled surfaces.

The angular emission profile of flattened combustion elements can be tailored by varying the height of flame from the surface of the element. Flame height can be increased by increasing the reactive surface area of the metallic fuel. In addition, a solid oxidizer may be intentionally used in concert with a high surface area combustion element to create a flame jet if there is sufficient clearance within the cross-section to avoid thermal damage of composite.

Figure 21A:
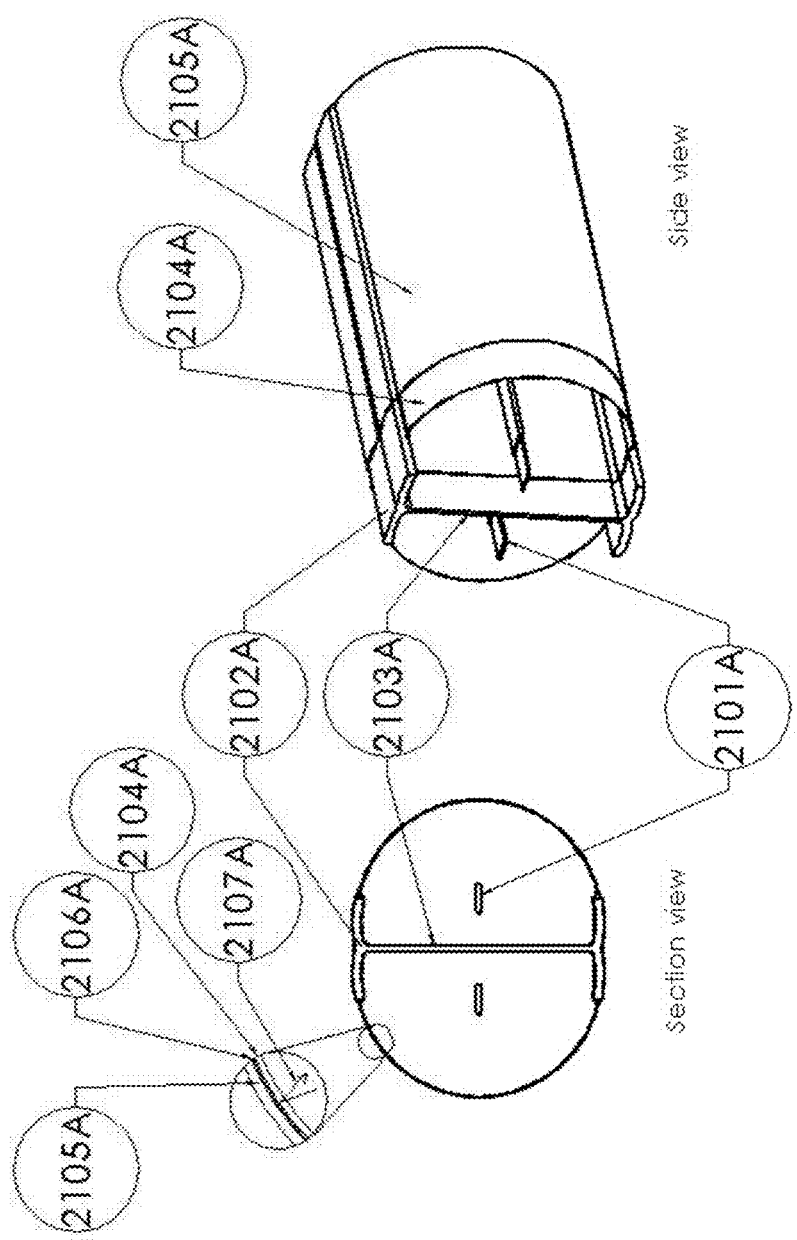
FIGS. 21A-21B show a schematic of a deployable I-beam assembly, in accordance with some embodiments of the present disclosure.

FIG. 21A shows a deployable I-beam assembly 2100A, including a photocuring composite I-beam and two or more flat combustion elements (2101A). The combustion elements extend laterally along the central axis of the beam and are offset from the beam web (2013A) and flange (2102A) surfaces. The flat combustion elements are oriented in a manner that directs light of greater intensity toward the I-beam flanges (2102A) which are at a greater distance from the combustion element and thicker than the I-beam web (2103A) separating the flanges. Two inflation bladders (2104A) may be used to pneumatically deploy and support both sides of the I-beam during the curing process. A single constraining layer (2105A) may encircle the I-beam and bladder (2104A) assembly (2100A) to maintain the beam shape during the curing process. The constraining layer (2105A) may be coated with a reflecting material (2106A) such as vapor deposited metal layer or a separate metal foil to reflect any emitted light (2107A) that would exit the I-beam assembly (2100A) through the bladder (2104A) and constraining layer (2105A) without first striking the beam flanges (2102A) or web surfaces (2103A).

Figure 21B:
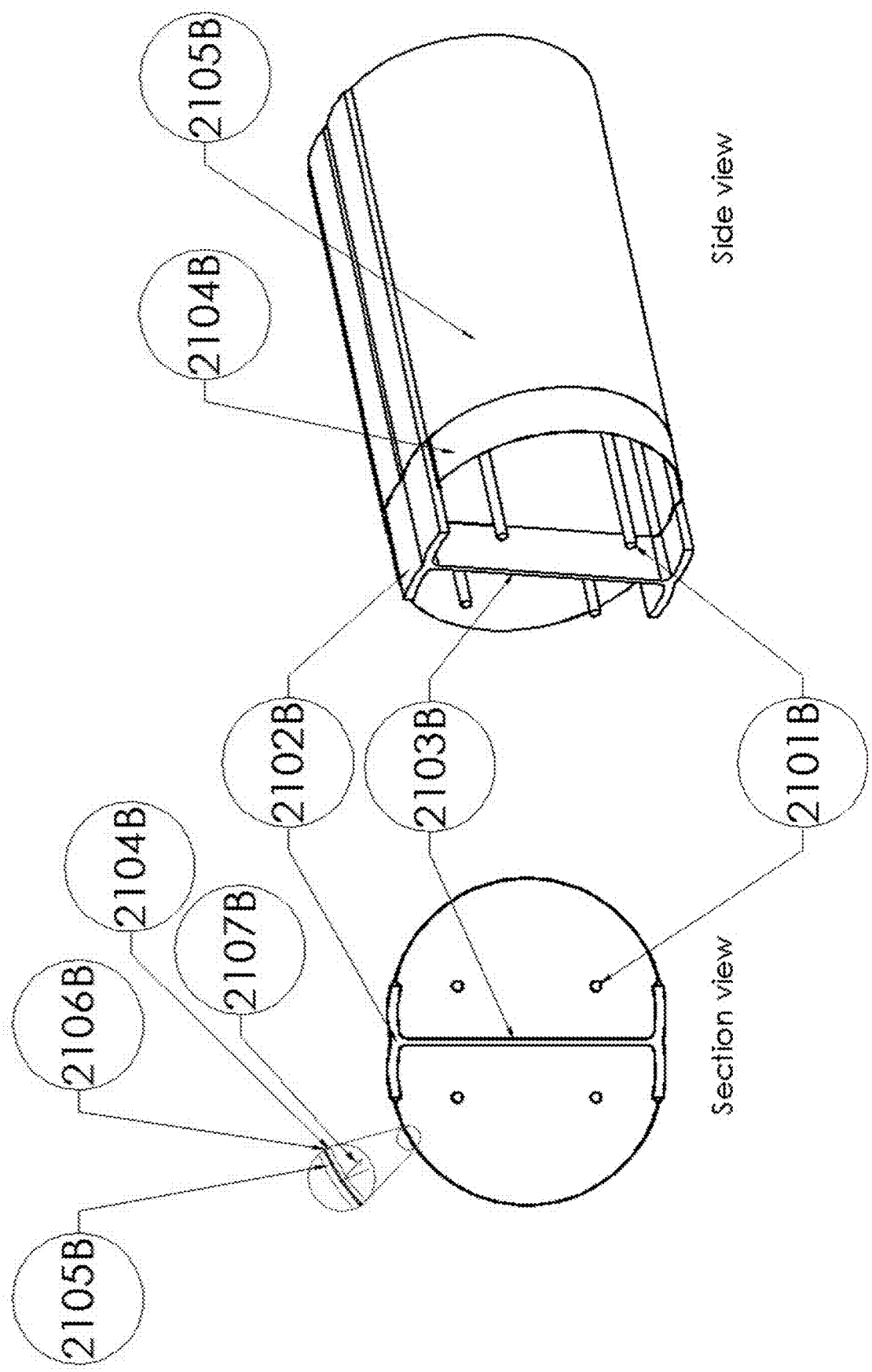

FIG. 21B shows a deployable I-beam assembly 2100B, including a photocuring composite I-beam and a plurality of round combustion elements (2101B). The round combustion elements extend laterally along the central axis of the beam and are offset from the beam web (2103B and flange (2102B) surfaces. By employing a multiple of round combustion elements the intensity of light reaching the photocomposite flanges ((2102B) and photocomposite web (2103B) is more uniform than with a single centrally located round combustion element. Two inflation bladders (2104B) may be used to pneumatically deploy and support both sides of the I-beam during the curing process. A single constraining layer (2105B) may encircle the I-beam and bladder (2104B) assembly (2100B) to maintain the beam shape during the curing process. The constraining sleeve (2105B) may be coated with a reflecting material (2106B) such as vapor deposited metal layer or a separate metal foil to reflect any emitted light (2107B) that would exit the I-beam assembly (2100B) through the bladder (2104B) and constraining layer (2105B) without first striking the beam flanges (2102B) or web surfaces (2103B).

Figure 22:
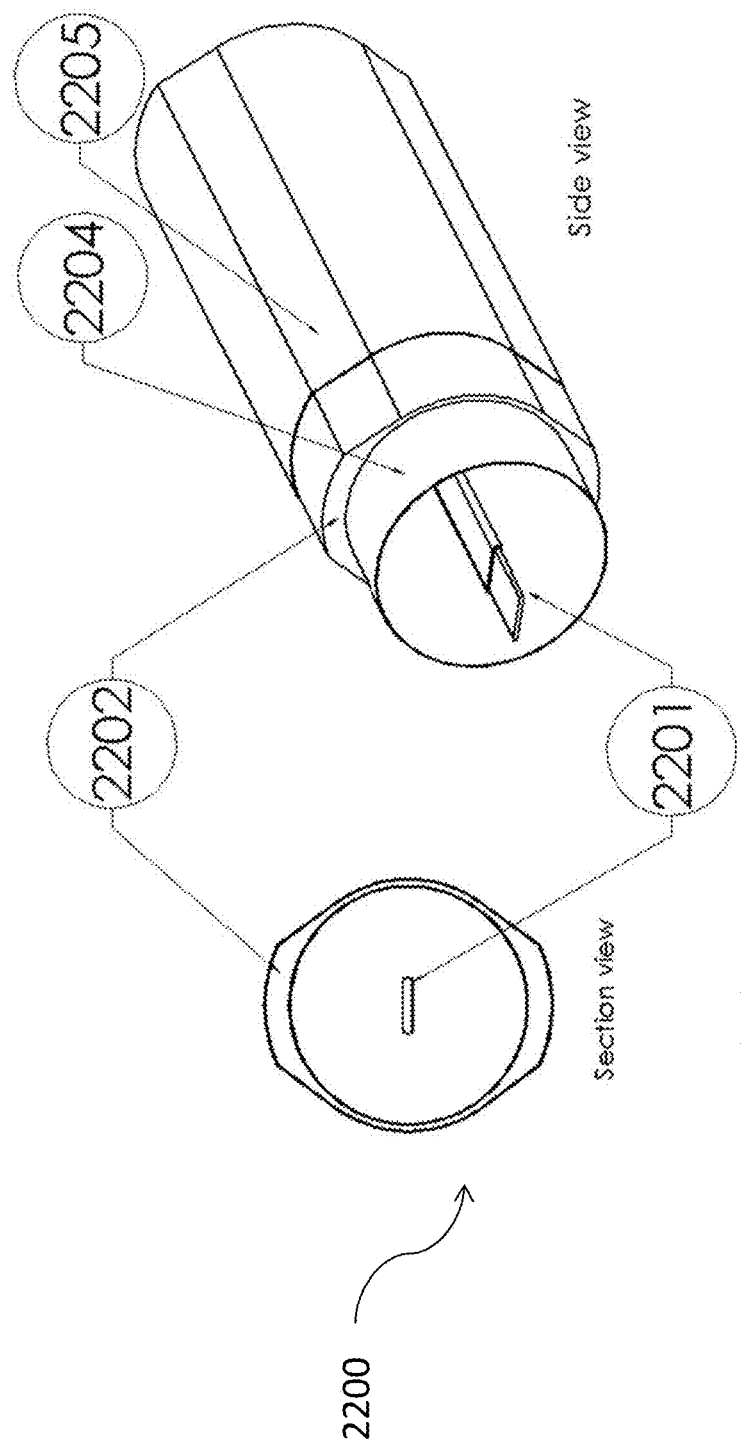
FIG. 22 shows a schematic of a circular tube with a thicker composite flange integrated into top and bottom surfaces, in accordance with some embodiments of the present disclosure.

FIG. 22 shows a circular cross-sectioned tube assembly 2200, including a cylindrical interior cross-section tube that has a thicker load bearing flange spanning the top and bottom surface of the composite tube (2202). The assembly 2200 uses a single flat combustion element (2201) located at or near its centerline. A single constraining layer (2205) may encircle the assembly (2500) to maintain the beam shape during the curing process. An inflation bladder (2204) may be used to pneumatically deploy and support both sides of the tube assembly 2200 during the curing process.

Figure 23:
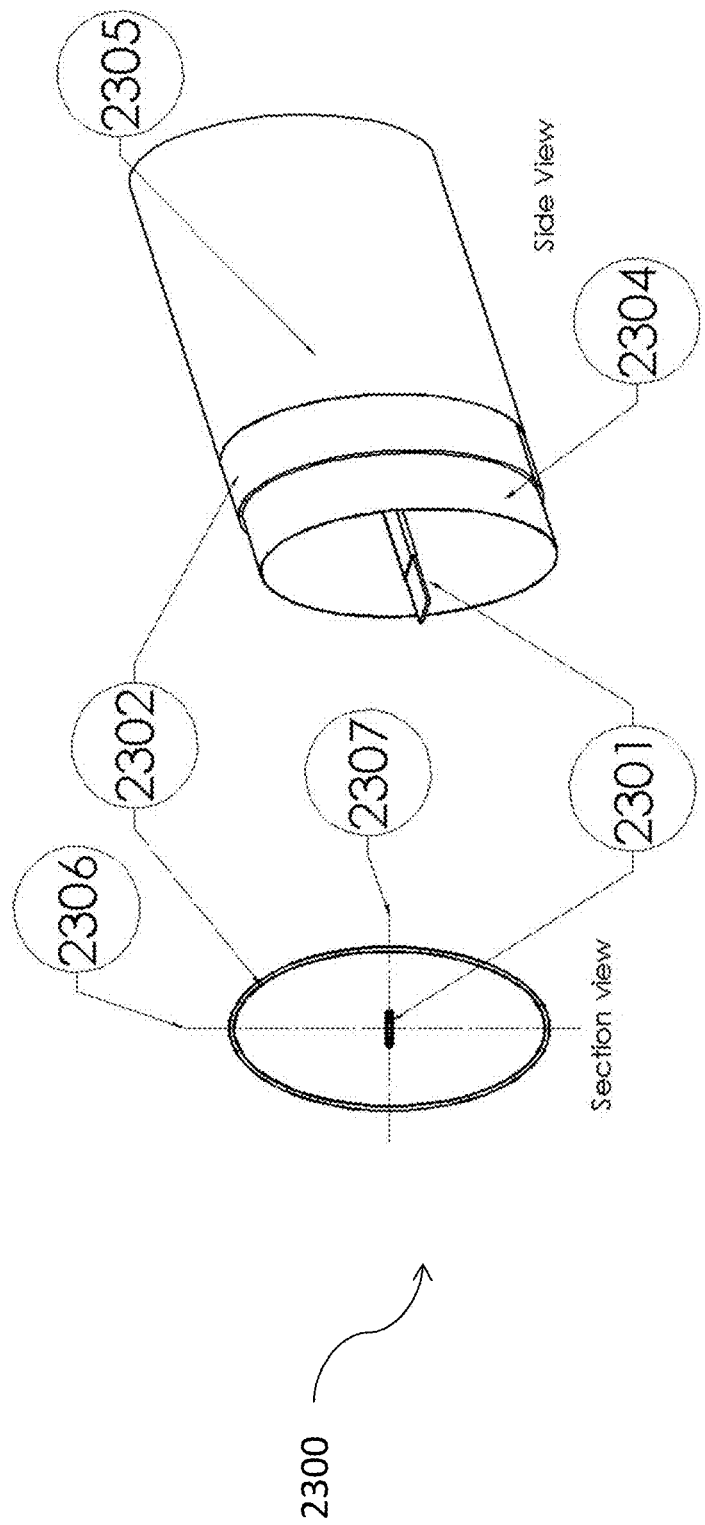
FIG. 23 shows a schematic of an elliptical cross-section tube, in accordance with some embodiments of the present disclosure.

Referring now to FIG. 23, a schematic of an elliptical cross-section tube assembly 2300 of uniform wall thickness is shown. An elliptical cross-section tube with uniform wall thickness has greater bending stiffness along its major axis cross-section (2306) in comparison to its minor axis cross-section (2307). Therefore, in some embodiments, an elliptical cross-sectioned tube of uniform wall thickness can be used more efficiently than a round cross-sectioned tube of uniform wall thickness where mechanical loading is primarily directed along a single axis. A single constraining sleeve (2305) may encircle the assembly (2300) to maintain the beam shape during the curing process. An inflation bladder (2304) may be used to pneumatically deploy and support both sides of the tube assembly 2300 during the curing process. 2302 is the composite tube. 2301 is the combustion element.

Figure 24:
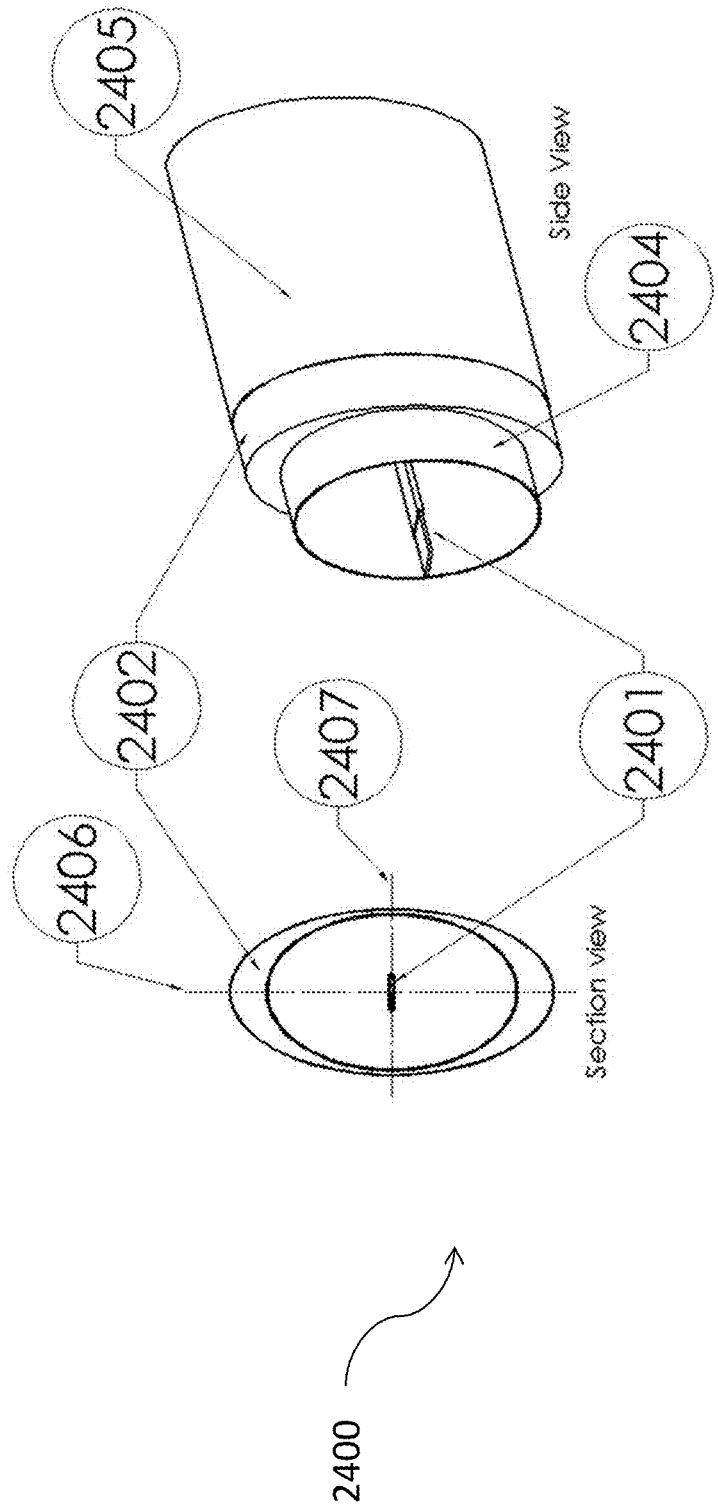
FIG. 24 shows a schematic of an elliptic cross-section tube with variable wall thickness, in accordance with some embodiments of the present disclosure.

Referring now to FIG. 24, a schematic of a tube assembly 2400 featuring an elliptical cross-section tube with a variable wall thickness is shown. In some embodiments, an elliptical cross-section tube of variable wall thickness not only has greater bending stiffness along its major cross-section (2406) in comparison to its minor cross-section (2407), but it provides an additional advantage over an elliptical cross-section tube of uniform wall thickness in that it has additional resistance (e.g., about 2×, about 4×, about 6×, about 8×, about 10×, about 20×, about 50×, about 100×) against wall buckling when withstanding high bending deflections. The cross-section is designed in a manner that places greater wall thickness in the locations that undergo the highest stress during bending resulting in uniform strain throughout the tube wall which allows all of the material in the wall cross-section to evenly contribute to supporting the mechanical load. Therefore, in some embodiments, an elliptical cross-sectioned tube with variable wall thickness can be used more efficiently than an elliptical cross-sectioned tube with uniform wall thickness where mechanical loading is primarily directed along a single axis. 2402 is the composite tube. 2401 is the combustion element. 2404 is the inflation bladder. 2405 is the constraining sleeve.

In some embodiments, the implementations shown in FIGS. 21-24 may be used for space satellite solar sails, instrument booms and trusses, satellite solar panels, satellite telescope, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil and sanitary piping, towers, underwater applications or any application where the structure will be deployed within a liquid environment. In some embodiments, the implementations shown in FIG. 21-24 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications In some embodiments, the configurations shown in FIGS. 14-19 and 21-24 may be deployed in about a fraction of a second, several seconds (e.g., about 1-60 seconds), several minutes (e.g., about 1-60 minutes), several hours (e.g., about 1-5 hours, 3-10 hours, 5-15 hours, 10-24 hours, etc.), or several days (e.g., 1-5 days, 3-10 days, etc.). In some embodiments, the deployment time is fully customizable depending on the particular application or need.

In some embodiments, an inflation gas bottle (as shown, e.g., in FIGS. 1, 7 and 8), valving (as shown, e.g., in FIGS. 1, 7, 8, 11, 14), and plumbing (as shown, e.g., in FIGS. 1, 7, 8, 11, and 14) can be used with the implementations shown in FIGS. 21-24.

Manufacture/assembly: In some embodiments, the I-beam assemblies shown in FIGS. 21-24 can be manufactured by the "wet-layup" method in which layers of structural fabric are soaked with the photopolymer adhesive and manually placed over a two piece mold which is designed in a manner that shapes the web and flange portions of the beam. The mold will be first laminated with the inner bladder layer followed by the wet composite. Two identical molds will be sandwiched together to form both sides of the I-Beam followed by applying the constraint film layer over the mold/wet-layup composite fabric assembly. The bladder/wet-layup/constraint film layer will then be slid off the mold to be loaded with the combustion element/scaffold assembly. Finally, the completed assembly will be tightly folded into its compact storage configuration.

In some embodiments, the I-beam (2102A and 2103A shown in FIG. 21A) can also be manufactured by the continuous "Pultrusion" process where filaments of the structural composite fabric are soaked with the photopolymer adhesive and pulled through a die that has an "I" shaped cross-section. As the fabric exits the die, it will be flanked on either side with the bladder film layers (2104A) followed by applying the constraint film layer (2105A). In some embodiments, the pultrusion process may be used to manufacture the I-beams in FIGS. 22A-24A.

Visible Light Curing

Using a combustion based light source for the curing of photopolymers can result in a risk of thermal damage to the adjacent polymer materials. In some embodiments, maximizing the efficiency of the photocuring system is a priority in order to reduce the required combustion material, thereby reducing the potentially damaging thermal products of combustion. In some embodiments, the spectrum that photopolymer adhesives react to is typically determined by the types photoinitiators present in the photopolymer. In some embodiments, the combustion of magnesium generates visible light in addition to UV light. In some embodiments, the photocuring process can be improved upon if the visible portion of the combustion spectrum can be used as well as the UV. In some embodiments, by adding one or more photoinitiators such as Eosin Yellow or Fluorescein which are photoactive to illumination ranging from about 400 nm to 525 nm to the adhesive, mixture it may be possible to cure the adhesive while using less combustion material.

In some embodiments, adhesives discussed herein are cured with ultraviolet spectrum light (which may be produced, e.g., when combusting magnesium). In some embodiments, adhesives discussed herein, with structures of the figures shown herein, are cured with visible light (e.g., all embodiments discussed herein can include adhesives that may be cured with visible light). In some embodiments, adhesives discussed herein are cured with visible light and any UV light that may be generated during the combustion process (e.g., when combusting magnesium).

In some embodiments, the adhesives used herein can be cured with visible (about 400-900 nm) spectrum light. In some embodiments, an advantage of using visible spectrum adhesives is that the emission spectrum of the combustion of magnesium metal is largely in the visible spectrum.

The use of UV and/or visible wavelength curing photopolymers may be used for space satellite solar sails, instrument booms and trusses, satellite solar panels, satellite telescope, occulting disks and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers, and aerobraking surfaces for rocket booster, satellite, and cargo return to earth or other planetary bodies; kinetic energy absorbing "crush tubes", structures for meteor/asteroid harnessing, manipulation, and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications, or any application where the structure will be deployed within a liquid environment. In some embodiments, the implementation shown using UV and/or visible wavelength curing photopolymers may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

Combustion Element Support

In some embodiments, the scaffold is made of non-combustible materials, such as metals. In some embodiments, the non-combustible materials may be utilized in wire, sheet, foil, or sponge form. Examples of metals that may be used include, for example, steel, stainless steel, aluminum and aluminum alloys, titanium and titanium alloys, copper and copper alloys, tungsten and tungsten alloys, nickel and nickel alloys, platinum and platinum alloys, and any combination thereof.

In some embodiments, the scaffold is made of non-combustible materials, such as non-metals. In some embodiments, the scaffold is made of non-combustible materials such as ceramic, asbestos, and other refractory materials, and any combination thereof. In some embodiments, the non-combustible materials such as ceramic, asbestos, and other refractory materials may be utilized in wire, sheet, rod or sponge form. In some embodiments, some of these metal oxide refractory materials such as alumina ($Al_2O_3$), magnesia (MgO), zirconia ($ZrO_2$), silica ($SiO_2$), chromia ($Cr_2O_3$), calcium oxide (CaO), tungsten carbide (CW), silicon carbide (CSi), graphite (C), hafnium carbide (HfC), boron nitride (BN), tantalum hafnium carbide ($Ta_4HfC_5$), and any combination thereof.

Flexible Combustion Element Support

Figure 25:
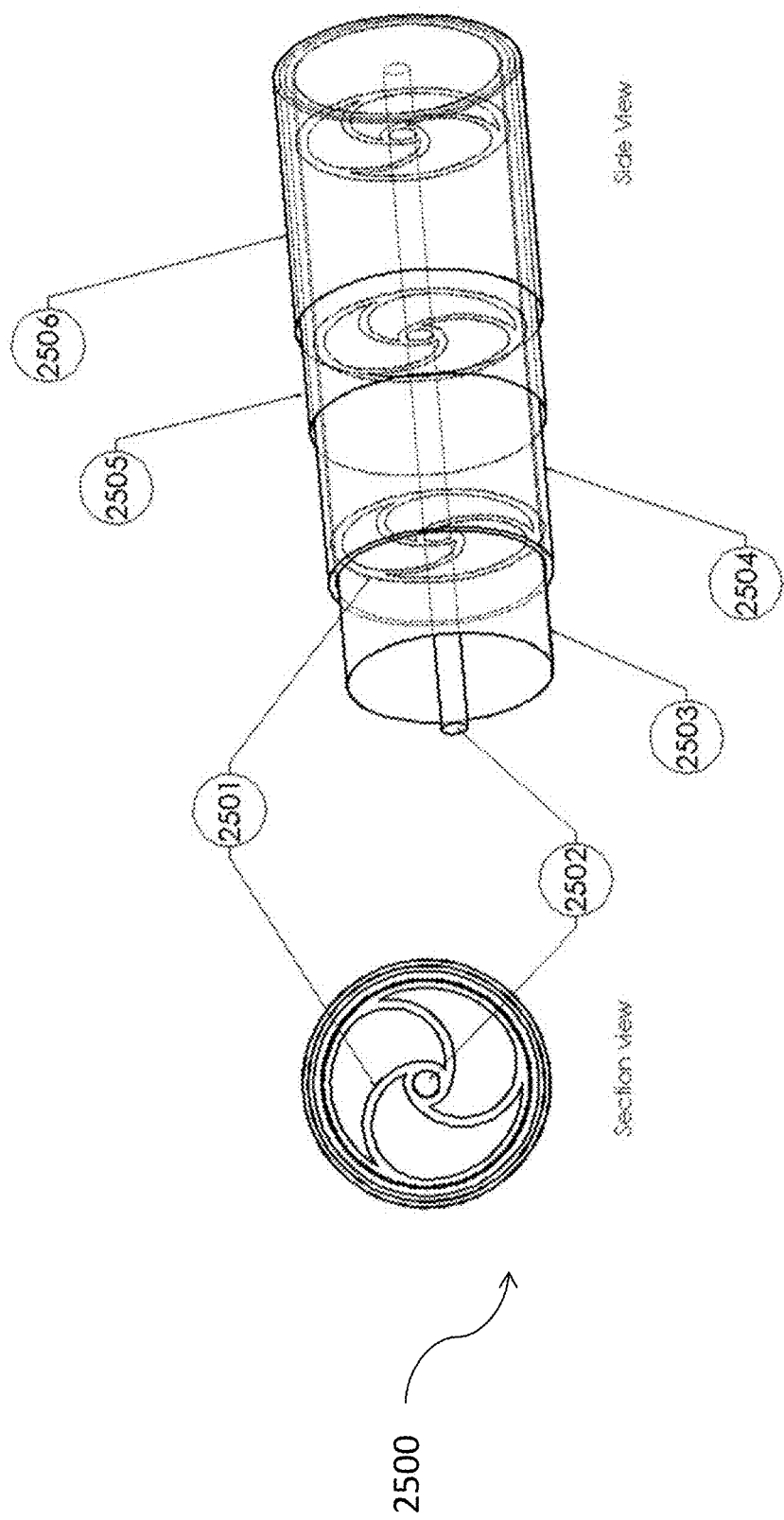
FIG. 25 shows a schematic of a flexible combustion element supported by a plurality of discrete flexures, in accordance with some embodiments of the present disclosure.

FIG. 25 shows a flexible combustion element support assembly 2500. In some embodiments, the combustion element (2502) is supported by a plurality of discrete flexible combustion element supports (2501). The outer periphery of the flexible combustion element support (2501) is attached to the pressure bladder (2503) or the composite tube (2504). The inner periphery of the flexible combustion element support (2501) is attached to the combustion element (2503). The flexible combustion element supports (2501) are elastically deformable in order to accommodate mechanical deformation occurring as the combustion element assembly (2500) is folded into its stowed configuration. The flexible combustion element supports (2501) spring back to their original shape and support the combustion element (2502) at or near the center axis of the composite tube or illuminator tube assembly as it is unfolded during deployment. 2505 is the constraint layer and 2506 is an outer protective layer to protect against chafing and mechanical damage, against external light from curing the photocomposite and as thermal insulation.

The flexible combustion element supports can be made from combustible or non-combustible materials. Examples of combustible materials include, for example, paper, plant fibers, polyester, polycarbonate, polyimide, polyethylene terephthalate, and any combination thereof. Examples of non-combustible materials include, for example, metals such as steel, stainless steel, aluminum and aluminum alloys, titanium and titanium alloys, copper and copper alloys, tungsten and tungsten alloys, nickel and nickel alloys, platinum and platinum alloys. Metal oxide refractory materials such as alumina ($Al_2O_3$), magnesia (MgO), zirconia ($ZrO_2$), silica ($SiO_2$), chromia ($Cr_2O_3$), calcium oxide (CaO), tungsten carbide (CW), silicon carbide (CSi), graphite (C), hafnium carbide (HfC), boron nitride (BN), tantalum hafnium carbide ($Ta_4HfC_5$), and any combination thereof.

In some embodiments, discrete flexible combustion element supports distributed down the length of the assembly (2500) are used, rather than a continuous scaffold.

Flexible combustion element supports can be made from a thin sheet of material by a stamping process, lithographic or laser etching.

Tensioned "Drop-Stitch" Thread or Wire Combustion Element Support

Figure 26:
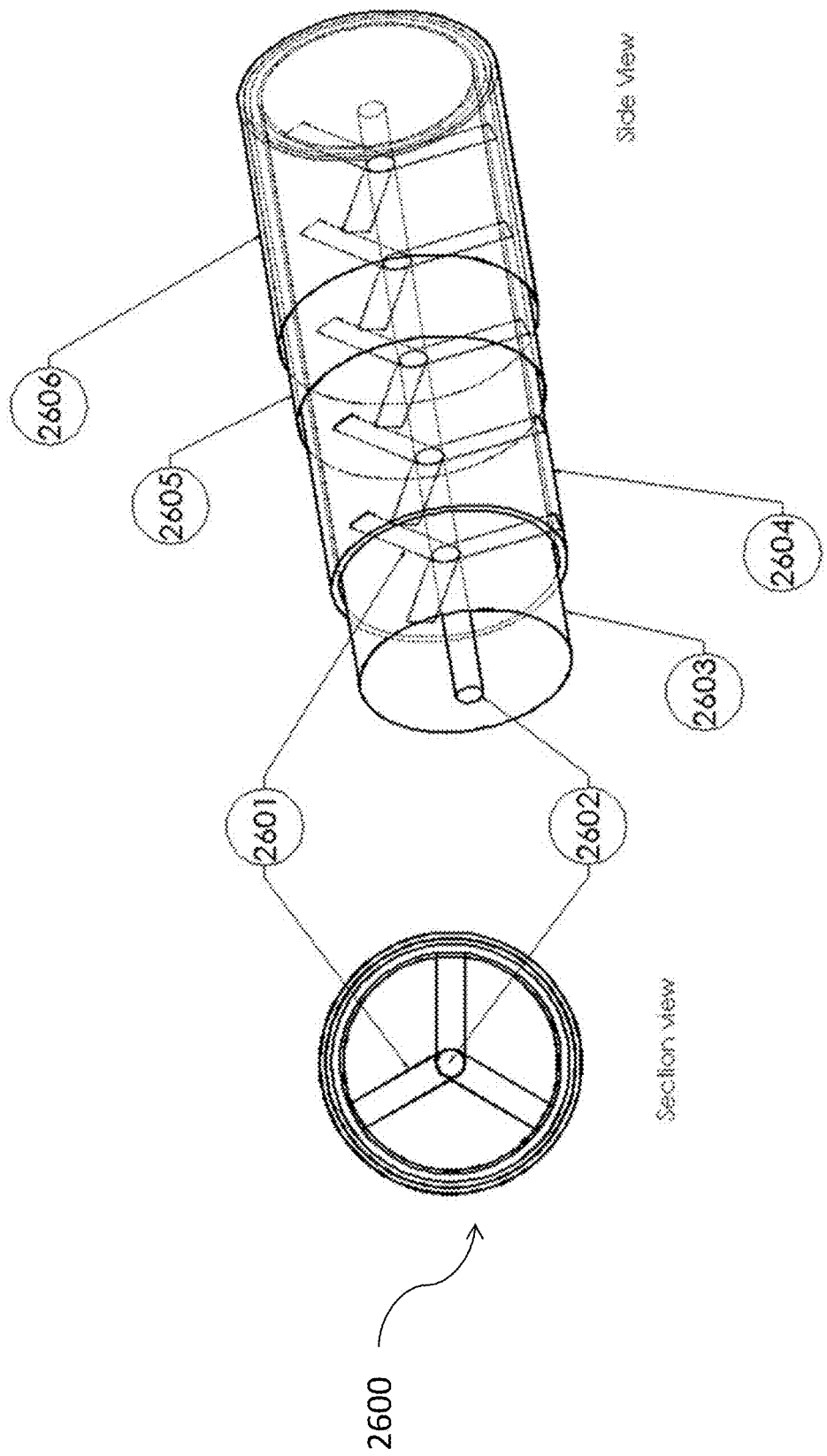
FIG. 26 shows a schematic of a flexible combustion element supported by a plurality of thread or wire loops, in accordance with some embodiments of the present disclosure.

Referring now to FIG. 26, a thread or wire combustion element support assembly 2600 is shown. In some embodiments, the combustion element (2602) is supported by a plurality of flexible thread or flexible wire loops (2601). The thread or flexible wire loops (2601) are passed through perforations in the wall of the pressure bladder (2603) and composite surface (2602). The thread or wire loops (2601) are encircled around the combustion element (2602) and support the combustion element (2602) in tension such that when the composite tube or illuminator tube assembly (2600) is inflated into its cylindrical configuration during deployment, the combustion element (2602) is pulled into its required location near the center axis of the tube. 2604 is the photocomposite material. 2605 is the constraint layer, 2606 is an outer protective layer to protect against chafing and mechanical damage, against external light from curing the photocomposite and as thermal insulation.

In some embodiments, the drop stitch material can include one or more of the combustible or non-combustible materials described below. Examples of combustible materials include, for example, paper, plant fibers, polyester, polycarbonate, polyimide, polyethylene terephthalate, and any combination thereof. Examples of non-combustible materials include, for example, metals such as steel, stainless steel, aluminum and aluminum alloys, titanium and titanium alloys, copper and copper alloys, tungsten and tungsten alloys, nickel and nickel alloys, platinum and platinum alloys. Metal oxide refractory materials such as alumina ($Al_2O_3$), magnesia (MgO), zirconia ($ZrO_2$), silica ($SiO_2$), chromia ($Cr_2O_3$), calcium oxide (CaO), tungsten carbide (CW), silicon carbide (CSi), graphite (C), hafnium carbide (HfC), boron nitride (BN), tantalum hafnium carbide ($Ta_4HfC_5$), and any combination thereof can be used.

The drop stitch method in accordance with some embodiments discussed herein is different from conventional systems using a polymer scaffold because the polymer scaffold uses compression to hold the combustion element in place, whereas the drop stitch method uses tension to hold the combustion element. By using tension, in some embodiments, the thread or wire loops (e.g., 2601) can be much thinner (e.g., 75%, 50%, 25%, 10%, 5% as thick) and be spaced more sparsely (e.g., 80%, 60%, 40%, 20% of the required sparsity) than the thicker plastic scaffold. Therefore, the thread loop support will block less light from the combustion element. Also, due to their necessary stiffness, polymer scaffolds are more likely to suffer from permanent bending while being tightly folded up in storage for years. In some embodiments, threads or sufficiently small diameter wires of most materials are not affected by being tightly folded in storage. In some embodiments, the drop stitch is a textile process that uses continuous thread and can be automated to produce tube assemblies of infinite length.

Suspension-Type Element Support

Figure 27:
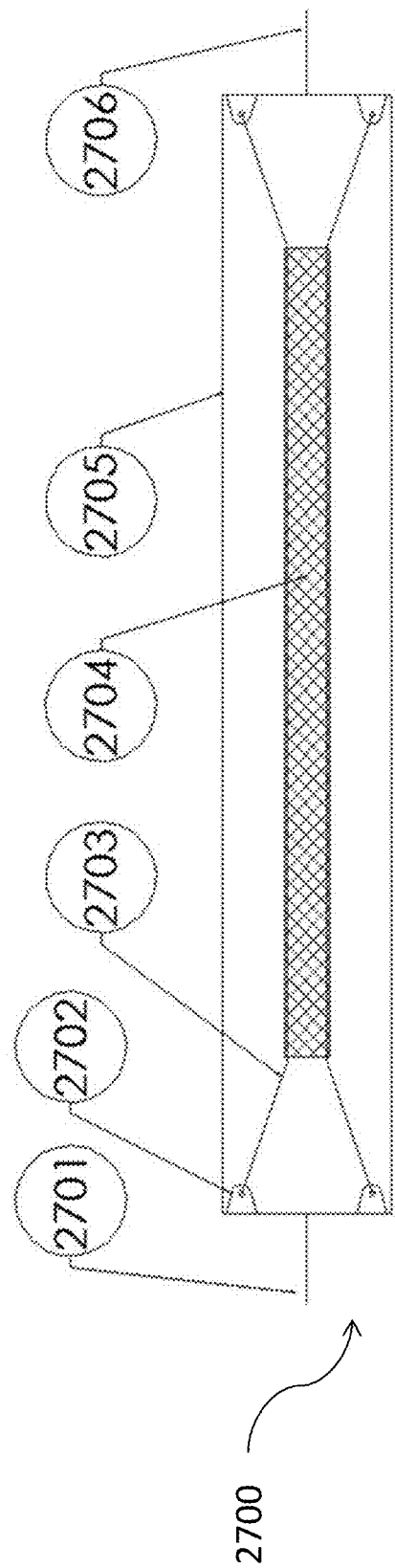
FIG. 27 shows a schematic of a suspension-type element support, in accordance with some embodiments of the present disclosure.

Referring now to FIG. 27, in some embodiments a scaffold material that is both non-combustible and non-consumable in the thermal environment experienced in the region of combustion can be arranged in a suspension type device that supports the combustion element in tension. Examples of suitable non-combustible materials include, for example, metals such as stainless steel, titanium and titanium alloys, tungsten and tungsten alloys, nickel and nickel alloys, platinum and platinum alloys. Metal oxide refractory materials such as alumina ($Al_2O_3$), magnesia (MgO), zirconia ($ZrO_2$), silica ($SiO_2$), chromia ($Cr_2O_3$), calcium oxide (CaO), tungsten carbide (CW), silicon carbide (CSi), graphite (C), hafnium carbide (HfC), boron nitride (BN), tantalum hafnium carbide ($Ta_4HfC_5$), and any combination thereof can be used.

The deployable composite tube (2705) shown in FIG. 27 has an inflation gas inlet (2701) and outlet (2706). The scaffold suspension (2703) wires are fixed to the combustion element (2704) and are mounted to anchors (2702) at both ends rather than at multiple locations along the tube wall as in some other embodiments.

The embodiments shown in FIGS. 25-27 may be used for space satellite solar sails, instrument booms and trusses, satellite solar panels, satellite telescopes, occulting disks, and other optical devices; atmospheric reentry heatshields, support structures for hypersonic, supersonic, and subsonic parachutes and "ballutes"; booms for servicing existing space satellites, aerobraking surfaces for the deorbiting of retired space satellites, aerodynamic devices such as wings, fins, spoilers and aerobraking surfaces for rocket booster, satellite and cargo return to earth or other planetary bodies; kinetic energy absorbing "crush tubes", structures for meteor/asteroid harnessing, manipulation and controlled delivery to earth or other planetary bodies; UAV aircraft wings, construction applications such as: scaffolding, concrete forms, drill bore casing, drill pipe, trenchless pipelining; emergency equipment such as: life rafts, boat, and submarine hull breach repair, medical tents, rescue hoists, expeditionary structures, emergency medical splints, field medical stretchers; medical implants for spinal, skeletal, and soft tissue support; water, gas, oil, and sanitary piping, towers, underwater applications or any application where the structure will be deployed within a liquid environment. In some embodiments, the implementations shown in FIG. 25-27 may be used for pipelines, including undersea pipelines, undersea construction, salvage, and rescue, support structures for offshore wind turbines, oil/gas/water drilling rigs, walls, barriers, gas, liquid slurry or granular/powdered solid storage containers, habitation structures on earth, underwater or in space and other planetary bodies; shielding from projectiles and high velocity debris, high energy radiation or particles, radar domes, propellers, fuselages, helicopter rotors, wind turbine blades, boat hulls, and other suitable applications.

Illustrative Film Characteristics:

Bladder layer: in some embodiments, the bladder layer serves as an inner mechanical barrier to prevent the soft uncured liquid photopolymer composite from contacting and sticking to the combustion element, scaffold and opposite photopolymer composite. In some embodiments, the bladder layer also serves as a gas impermeable membrane to pneumatically inflate and deploy the photopolymer composite tube assembly. In some embodiments, the bladder layer needs to be transparent to the wavelengths of light that will activate the photoinitiator (about 400 nm through about 700 nm). In some embodiments, the bladder layer needs to be thermally resistant to the high temperatures generated by the combustion of the adjacent combustion element such as about 100° C., 200° C., 300° C. and remain pliable at low temperatures such as, for example, about 0° C., −40° C., −100° C., −200° C., −250° C. In some embodiments, materials of construction for the bladder layer can include polytetrafluoroethylene (TEFLON™), polyester, polycarbonate, polyethylene, polyethylene terephthalate, and any combination thereof.

In some embodiments, an optional external assembly/handling layer that contains and protects the soft liquid uncured photopolymer composite from damage during assembly is included. In some embodiments, materials of construction for the external assembly/handling layer can include acrylic, polyester, polycarbonate, polyethylene, polyethylene terephthalate, polyimide, nylon, polytetrafluoroethylene (TEFLON™), paper, and any combination thereof.

In some embodiments, an external light block layer is located on the exterior surface of the photopolymer composite. In some embodiments, the external light block layer serves as a barrier to external light, thus preventing the photopolymer composite from being activated during storage, transportation, deployment, etc. In some embodiments, materials of construction for the external light block layer can include polyester, polycarbonate, polyethylene, polyethylene terephthalate, polyimide, nylon, polytetrafluoroethylene (TEFLON™), paper, and any combination thereof.

In some embodiments, an external pressure constraint layer is located on the exterior surface of the photopolymer composite. In some embodiments, the external pressure constraint layer serves as a means to contain the pressure of the pneumatic inflation and serves to maintain the cylindrical, elliptical or other cross-sectional shape. In some embodiments, materials of construction for the external pressure constraint layer can include polyester, polycarbonate, polyethylene, polyethylene terephthalate, polyimide, nylon, polytetrafluoroethylene (TEFLON™), paper, and any combination thereof.

In some embodiments, an optional mechanical abrasion layer is included and is located on the outermost layer. In some embodiments, the mechanical abrasion layer serves to prevent mechanical abrasion from damaging the underlying layers. In some embodiments, the mechanical abrasion layer may be a film or a woven or braided fiber. In some embodiments, materials of construction for the external pressure constraint layer can include, for example, polyester, polycarbonate, polyethylene, polyethylene terephthalate, polyimide, nylon, polytetrafluoroethylene (TEFLON™), cotton, wool, silk, acrylic, silicone, glass fiber, carbon fiber, NOMEX® (e.g., heat and flame-resistant fibers), natural or synthetic rubber, paper, and any combination thereof.

Illustrative Oxidizer Characteristics:

Solid oxidizer: in some embodiments, the solid oxidizer serves to provide oxygen atoms to the fuel in order for the combustion reaction to occur. In some embodiments, an ideal or a preferred oxidizer provides greater than stoichiometric ratio for complete combustion of all fuel. In some embodiments, oxidizers may include sodium perchlorate, potassium perchlorate, ammonium perchlorate, sodium chlorate, potassium chlorate, sodium nitrate, potassium nitrate, ammonium nitrate, potassium permanganate, and any combination thereof Gaseous oxidizer: in some embodiments, the gaseous oxidizer performs the same function as the solid oxidizer above. In some embodiments, gaseous oxidizers may include oxygen, nitrous oxide, fluorine, bromine, chlorine, and any combination thereof.

Liquid oxidizer: in some embodiments, the liquid oxidizer performs the same function as the solid and gaseous oxidizer discussed above. In some embodiments, liquid oxidizers may include hydrogen peroxide, cryogenic oxygen, and any combination thereof.

Fuel:

Gaseous fuel: in some embodiments, photochemically active illumination is generated using combustion of gaseous fuel. In some embodiments, gaseous fuel may include hydrogen, acetylene, ethylene, or propylene, or other suitable fuels.

Solid fuel: in some embodiments, photochemically active illumination is generated using combustion of solid fuel or solid fuel particles. In some embodiments, the solid fuel is metallic. In some embodiments, the solid fuel is selected from metals including, but not limited to, magnesium, aluminum, iron, zirconium, titanium, lithium, sodium, potassium, etc., and any combination thereof, either in pure or alloy form.

Illustrative Light Source Characteristics:

In some embodiments, the light source serves to generate sufficient photochemically active light radiation to activate the photoinitiator(s) in the photopolymer composite to allow sufficient polymerization/crosslinking to rigidize the composite to required stiffness. In some embodiments, the emission wavelength ranges from about 400 nm to 700 nm. In some embodiments, the light source may be the combustion of a metal in the presence of an oxidizer or may be the combustion of a gas in the presence of an oxidizer. In some embodiments, metal fuels may include, but are not limited to: magnesium, aluminum, iron, zirconium, titanium, lithium, sodium, potassium, etc., and any combination thereof, either in pure or alloy form. In some embodiments, fuel gases may include, but are not limited to: hydrogen, acetylene, ethylene or propylene, or any combination thereof. In some embodiments, the light source is sufficiently flexible such that it can be tightly folded up within the flexible uncured composite fabric without requiring additional storage volume due to excessive bending radii. In some embodiments, the light source is able to withstand being tightly folded during prolonged storage (e.g., at least about 1-10 years) and still retain the ability to unfold itself using its internal stored elastic energy. In some embodiments, the light source is chemically stable to withstand at least about 1 to 10 years of storage at elevated temperatures as high as about 80° C. In some embodiments, the light source is a structure that is being unfolded by the scaffold. In some embodiments, the light source is attached to the scaffold.

Illustrative Scaffold Characteristics:

In some embodiments, the scaffold serves to support the combustion element within an appropriate distance from the photopolymer composite layer. In some embodiments, "appropriate distance" is defined as: close enough to provide sufficiently high radiation intensity but far enough to prevent enough thermal damage that can compromise the structural integrity of the composite structure. In some embodiments, the scaffold is concentric to the composite structure. In some embodiments, the scaffold is non-concentric to the composite structure. In some embodiments, the combustion element is roughly near the center of the tube when it is combusting. In some embodiments, the combustion element provides mostly uniform light distribution to the surrounding photopolymer composite material. In some embodiments, the scaffold is made from thin elements that are widely spaced for minimal blocking of generated light and minimal obstruction to the inflation gases. In some embodiments, materials of construction for the external pressure constraint layer can include polyester, polycarbonate, polyethylene, polyethylene terephthalate, polyimide, nylon, polytetrafluoroethylene (TEFLON™), cotton, wool, silk, acrylic, silicone, glass fiber, carbon fiber, NOMEX® (e.g., heat and flame-resistant fibers), natural or synthetic rubber, cellulose, paper, and any combination thereof.

In some embodiments, the scaffold is sufficiently flexible such that it can be tightly folded up within the flexible uncured composite fabric without requiring additional storage volume due to excessive bending radii. In some embodiments, the scaffold is able to withstand being tightly folded during prolonged storage (e.g., at least about 1-10 years) and still retain the ability to unfold itself using its internal stored elastic energy. In some embodiments, the scaffold is chemically stable to withstand at least about 1 to 10 years of storage at elevated temperatures as high as about 80° C. In some embodiments, the scaffold is designed to be the device that unfolds both itself and the light source as the composite tube unfolds.

In some embodiments, the photopolymer has a long shelf life (e.g., about 2-20 years) under thermal conditions of from about −100 to +80° C. In some embodiments, the photopolymer remains a fluid at temperatures as low as about −50° C. In some embodiments, the photopolymer absorbs and cures to wavelengths of light that are matched to the wavelengths produced by the combustion element. In some embodiments, the photopolymer has high viscosity to minimize migration due to thermal or inertial effects. In some embodiments, the photopolymer has high viscosity to minimize migration to the composite fibers that are surrounded by a layer of the initially uncured liquid photopolymer due to thermal or inertial effects.

In some embodiments, using visible wavelength adhesives is particularly advantageous when the adhesive is irradiated with the photoemission from the combustion of magnesium metal. In particular, one of the main advantages of using such an adhesive is that the amount of combustible material may be minimized. Since the by-product of combustion is heat, and since heat can be thermally damaging to the surrounding structure, it is advantageous to minimize the amount of the combustible material.

In some embodiments, using gaseous oxygen as the oxidizing agent for the combustion of magnesium metal is advantageous.

In some embodiments, the system may employ a metallic plus oxidizer combustion element housed in a transparent polymer film outer tube.

In some embodiments, the deployable illumination tube is stored in a folded configuration and is pneumatically unfolded to its final cylindrical configuration.

In some embodiments, the inflation gas for deploying the illumination tube is stored in a pressurized vessel or gas generator.

In some embodiments, the inflation gas is carbon dioxide, nitrogen, air, argon, or helium.

In some embodiments, the metallic combustion element is co-axial to a transparent polymer tube which can be made of one or more of polyester, polyethylene, or polyethylene terephthalate. In some embodiments, the transparent polymer tube forms a hermetic enclosure which surrounds the combustion element. In some embodiments, the hermetic tubular enclosure has an inlet and outlet port for gases and combustion products. In some embodiments, the outlet port contains a pressure regulating device. In some embodiments, the inflation gas pressure is controlled by a pressure regulating device. In some embodiments, the pressure regulating device is controlled using closed-loop control. In some embodiments, the pressure regulating device is controlled using open-loop control.

In some embodiments, the system includes a deployable light reflecting system that comprises a stretched reflective membrane, one or more deployable light source tubes and interconnecting link members. In some embodiments, the reflective membrane can be made of one or more of polyester, polycarbonate, Teflon, silicone, polyethylene terephthalate, or polyimide. In some embodiments, the reflective membrane comprises a metalized coating, a painted coating, a separate reflective foil layer or a separate reflective layer. In some embodiments, the metalized coating may be made of one or more of aluminum, silver, gold, tantalum, copper, iridium, platinum, tin, titanium, or nickel.

In some embodiments, the reflective membrane may include a foil layer that made be made of one or more of aluminum, silver, gold, tantalum, copper, tin, titanium, stainless steel, or nickel.

In some embodiments, the reflective membrane may include a painted coating may contain pigments of a group consisting essentially of: aluminum oxide, titanium dioxide, magnesium oxide, lead oxide, lead carbonate, zinc oxide, barium sulphate, antimony oxide, or zinc sulphide.

In some embodiments, the reflective membrane has a stowed configuration and a deployed configuration In some embodiments, the deployable light source serves to pull the reflector sheet out of its stowed configuration via pneumatic inflation. In some embodiments, the pneumatically inflated deployable light source serves to hold the reflector sheet in its deployed configuration. In some embodiments, the pneumatically inflated deployable light source serves to hold the reflector sheet in its deployed configuration. In some embodiments, the deployed reflector sheet is held in a state of geometric curvature such as a parabola or ellipse that has or approximates a focal point, focal axis, or focal plane. In some embodiments, the deployed reflector sheet and deployable light source project light onto an adjacent photo-composite surface.

Certain implementations of the invention set forth above use pneumatic pressure to inflate various elements of the systems and apparatuses. For example, pneumatic pressure is used to inflate and expand the deployable structures, panels, illumination tubes, and used to inflate various chambers. In other embodiments, hydraulic pressure is substituted for pneumatic pressure while other aspects of the embodiments and implementations remain unchanged. Thus, one of skill in the art would understand that pneumatic pressure and hydraulic pressure, and the subsystems used to produce those pressures, are interchangeable in the above-described embodiments, and all remain within the scope of the invention.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Various modifications to the disclosed embodiments will be apparent to those skilled in the art, and the general principals set forth herein may be applied to other embodiments and applications. Thus, the present invention is not intended to be limited to the embodiments shown or described herein. The terminology used herein is for the purpose of describing particular embodiments and is not intended to be limiting of exemplary embodiments. As used herein, singular forms, such as "a" and "an," are intended to include the plural forms as well, unless the context indicates otherwise.

The invention claimed is:

1. A rapid deployment structure system comprising:
   a photo-curing structural composite material having a collapsed configuration and an expanded configuration;
   a plurality of structural elements, wherein the photo-curing structural composite material is operably linked to at least two structural elements;
   at least one inflation chamber, wherein the at least one inflation chamber is adapted to force the structural elements apart when the at least one inflation chamber is filled with a fluid thereby stretching the photo-curing structural composite material to its expanded configuration, and wherein the structural elements define the expanded configuration of the photo-curing structural composite material; and
   a light-generating component adapted to generate light via a combustion reaction, wherein the light-generating component includes at least one combustion element.

2. The rapid deployment structure system of claim 1 wherein the photo-curing structural composite material comprises one or more photo-curing structural composite material panels.

3. The rapid deployment structure system of claim 2, wherein the one or more photo-curing structural composite material panels are uncured panels which are deployed into a fixed position and are cured by a non-uniform light emission pattern.

4. The rapid deployment structure system of claim 2, wherein the structural elements comprise one or more mounting surfaces, wherein the one or more photo-curing structural composite material panels are operably linked to the one or more of the mounting surfaces.

5. The rapid deployment structure system of claim 4, wherein the at least one inflation chamber comprises one or more illumination tubes.

6. The rapid deployment structure system of claim 5 wherein the at least one combustion element is located within the illumination tubes.

7. The rapid deployment structure system of claim 4, further comprising one or more fluid inflatable deployment tubes, wherein the mounting surfaces are further held apart via the one or more fluid inflatable deployment tubes.

8. The rapid deployment structure system of claim 7, wherein the at least one combustion element is located external to the fluid inflatable deployment tubes but within the inflation chamber.

9. The rapid deployment structure system of claim 4, wherein at least one of the mounting surfaces comprises a perimeter profile, and wherein the perimeter profile of the at least one mounting surface defines a cross-sectional profile of the one or more photo-curing structural composite material panels.

10. The rapid deployment structure system of claim 9, wherein the perimeter profile of the at least one mounting surface is one or more of flat, convex, concave or any combination thereof.

11. The rapid deployment structure system of claim 9, wherein the one or more photo-curing structural composite material panels are operably linked to a perimeter edge of the mounting surfaces.

12. The rapid deployment structure system of claim 4, wherein the mounting surfaces are rigid.

13. The rapid deployment structure system of claim 4, wherein the photo-curing structural composite material panels are flat or curved when cured.

14. The rapid deployment structure system of claim 13, wherein the flat or curved photo-curing structural composite material panels are operably linked to a portion of the periphery of the mounting surfaces.

15. The rapid deployment structure system of claim 13, wherein the flat or curved photo-curing structural composite material panels are operably linked to the entire periphery of the mounting surfaces.

16. The rapid deployment structure system of claim 1 wherein the at least one combustion element comprises a solid fuel.

17. The rapid deployment structure system of claim 16 wherein the solid fuel comprises one or more of metallic magnesium, aluminum, barium, titanium, lithium, potassium or zirconium.

18. The rapid deployment structure system of claim 16 wherein the at least one combustion element is formed from the solid fuel by the braiding or crocheting of a ribbon or a wire, or the perforation or stamping of a metal sheet or the sintering or printing of a metal powder.

19. The rapid deployment structure system of claim 1, wherein the at least one combustion element comprises a solid fuel and a solid oxidizer.

20. The rapid deployment structure system of claim 19, wherein the solid fuel and solid oxidizer are enrobed in a protective jacket.

21. The rapid deployment structure system of claim 20, wherein the protective jacket comprises one or more of polyester, polyimide, polyethylene, polyethylene terephthalate, silicone, polycarbonate, polypropylene, cellophane, butyl rubber, latex rubber, paper, or polytetrafluoroethylene.

22. The rapid deployment structure system of claim 19, the solid oxidizer comprises one or more of sodium nitrate, sodium chlorate, sodium permanganate, sodium perchlorate, ammonium nitrate, ammonium perchlorate, potassium, nitrate, potassium chlorate, potassium perchlorate, or potassium permanganate.

23. The rapid deployment structure system of claim 19, wherein the solid oxidizer is in powdered, granulated, cast-in, pelletized or extruded form.

24. The rapid deployment structure system of claim 19, wherein the solid oxidizer is stabilized by a binder comprising one or more of gum Arabic, red gum, asphalt, polysulphide rubber, neoprene, latex, butyl, silicone, or buna.

* * * * *